US006057503A

United States Patent [19]

Shinsky

[11] Patent Number: 6,057,503

[45] Date of Patent: May 2, 2000

[54] FIXED-LOCATION METHOD OF COMPOSING AND PERFORMING AND A MUSICAL INSTRUMENT

[76] Inventor: Jeff K. Shinsky, 15531 Mira Monte, Houston, Tex. 77083

[21] Appl. No.: 09/252,328

[22] Filed: Feb. 18, 1999

Related U.S. Application Data

[63] Continuation-in-part of application No. 09/119,870, Jul. 21, 1998, and a continuation-in-part of application No. 08/898,613, Jul. 22, 1997, Pat. No. 5,783,767, and a continuation-in-part of application No. 08/531,786, Sep. 21, 1995, Pat. No. 5,650,584.

[60] Provisional application No. 60/020,457, Aug. 28, 1995.

[51] Int. Cl.[7] .............................. G10H 5/00; H02M 5/00

[52] U.S. Cl. ................................ 84/657; 84/613; 84/619; 84/669

[58] Field of Search ............................ 84/613, 619, 637, 84/650, 657, 669

[56] References Cited

U.S. PATENT DOCUMENTS

| | | | |
|---|---|---|---|
| 5,003,860 | 4/1991 | Minamitaka | 84/669 X |
| 5,078,040 | 1/1992 | Shibukawa | 84/657 X |
| 5,083,493 | 1/1992 | Heo | 84/657 X |
| 5,099,738 | 3/1992 | Hotz | 84/645 X |
| 5,153,361 | 10/1992 | Kozuki | 84/637 X |
| 5,266,735 | 11/1993 | Shaffer et al. | 84/609 |
| 5,619,003 | 4/1997 | Hotz | 84/645 X |

*Primary Examiner*—Jeffrey Donels
*Attorney, Agent, or Firm*—Harrison & Egbert

[57] ABSTRACT

A method and apparatus for composing and performing music on an electronic instrument in which individual chord progression chords can be triggered in real-time, while simultaneously making the individual notes of the chord, and/or possible scale and non-scale notes to play along with the chord, available for playing in separate fixed-locations on the instrument. The method of composition involves the designation of a chord progression section on the instrument, then assigning chords or individual chord notes to this chord progression section according to the defined customary scale or customary scale equivalent of a song key. Further, as each chord is played in the chord progression section, the individual notes of the currently triggered chords are simultaneously made available for playing in separate fixed locations on the instrument. Fundamental and alternate notes of each chord may be made available for playing in separate fixed locations for composing purposes. Possible scale and/or non-scale notes to play along with the currently triggered chord, may also be simultaneously made available for playing in separate fixed locations on the instrument. All composition data can be stored in memory or on a storage device, and can later be retrieved and performed by a user from a fixed location on the instrument. The composition data may also be performed from a reduced number of input controllers. Further, multiple instruments of the present invention can be utilized together to allow interaction among multiple users during composition and/or performance, with no knowledge of music theory required.

41 Claims, 55 Drawing Sheets

Set Current chord to type X with fundamental Y

16-80 16-82 16-84

| Weedout Table | | |
|---|---|---|
| Index | Corrected Note Off | New Note On |
| 0 | 76 (82)(55)(1) | 74 (82)(55)(1) |
| 1 | 79 (82)(55)(1) | 77 (82)(55)(1) |
| 2 | | 83 (82)(55)(1) |
| 3 | 83 (95)(55)(1) | 82 (95)(55)(1) |

16-86

16-88

Figure 16B

FIXED-LOCATION METHOD OF COMPOSING AND PERFORMING AND A MUSICAL INSTRUMENT

This is a continuation in part of application Ser. No. 09/119,870 filed Jul. 21, 1998, which is a continuation in part of application Ser. No. 08/898,613, filed Jul. 22, 1997, U.S. Pat. No. 5,783,767, which is a continuation in part of application Ser. No. 08/531,786, filed Sep. 21, 1995, U.S. Pat. No. 5,650,584, which claims the benefit of Provisional Application No. 60/020,457 filed Aug. 28, 1995.

FIELD OF THE INVENTION

The present invention relates generally to a method of composing and performing music on an electronic instrument. This invention relates more particularly to a method and an instrument for composing in which individual chords and/or chord notes in a chord progression can be triggered in real-time. Simultaneously, other notes and/or note groups, such as individual notes of the chord, scale notes, and non-scale notes are made available for playing in separate fixed locations on the instrument. All composition data can later be retrieved and performed from a fixed location on the instrument on a reduced number of keys. Further, multiple instruments of the present invention can be utilized together to allow interaction among multiple users during composition and/or performance, with no knowledge of music theory required.

BACKGROUND OF THE INVENTION

A complete electronic musical system should have both a means of composing professional music with little or no training, and a means of performing music, whether live or along with a previously recorded track, with little or no training, while still maintaining the highest levels of creativity and interaction in both composition and performance.

Methods of composing music on an electronic instrument are known, and may be classified in either of two ways: (1) a method in which automatic chord progressions are generated by depression of a key or keys (for example, Cotton Jr., et al., U.S. Pat. No. 4,449,437), or by generating a suitable chord progression after a melody is given by a user (for example, Minamitaka, U.S. Pat. No. 5,218,153); (2) a method in which a plurality of note tables is used for MIDI note-identifying information, and is selected in response to a user command (for example, Hotz, U.S. Pat. No. 5,099,738); and (3) a method in which one-finger chords can be produced in real-time (for example, Aoki, U.S. Pat. No. 4,419,916).

The first method of composition involves generating pre-sequenced or preprogrammed accompaniment. This automatic method of composition lacks the creativity necessary to compose music with the freedom and expression of a trained musician. This method dictates a preprogrammed accompaniment without user selectable modifications in real-time, either during composition or performance.

The second method of composition does not allow for all of the various note groups and/or features needed to initiate professional performance, with little or no training. The present invention allows any and all needed performance notes and/or note groups to be generated on-the-fly, providing many advantages. Any note or group of notes can be auto-corrected during performance according to specific note data or note group data, thus preventing incorrect notes from playing over the various chord and/or scale changes. Every possible combination of harmonies, non-scale note groups, scale note groups, combined scale note groups, chord groups, chord inversions/voicings, note ordering, note group setups, and instrument setups are accessible at any time, using only the current trigger status message, and/or other current triggers described herein, such as those which can be used for experimentation with chord and/or scale changes. This allows any new part to be added at any time, and musical data can be transferred between various instruments for unlimited compatibility and flexibility during composition and/or performance. The present invention also allows musically-correct one-finger chords, as well as individual chord notes, to be triggered with full expression from the chord progression section while providing a user with indicators for playing specific chord progressions, in a variety of song keys.

The third method of composition allows a user to trigger one-finger chords in real-time, thus allowing a user some creative control over which chord progression is actually formed. Although this method has the potential to become an adequate method of composition, it currently falls short in several aspects. There are five distinct needs which must be met, before a person with little or no musical training can effectively compose a complete piece of music with total creative control, just as a trained musician would. Any series of notes and/or note groups can be provided to a user as needed, utilizing only one set of triggers. This allows for unlimited system flexibility during composition and/or performance:

(1) A means is needed for assigning a particular section of a musical instrument as a chord progression section in which individual chords and/or chord notes can be triggered in real-time with one or more fingers. Further, the instrument should provide a means for dividing this chord progression section into particular song keys, and providing indicators so that a user understands the relative position of the chord in the predetermined song key. For example a song in the key of E Major defines a chord progression 1-4-5, as described more fully below.

Shimaya, U.S. Pat. No. 5,322,966, teaches a designated chord progression section, but the chord progression section disclosed in Shimaya follows the chromatic progression of the keyboard, from C to B. Shimaya provides no allowance for dividing this chord progression section into particular song keys and scales. One of the most basic tools of a composer is the freedom to compose in a selected key. Another basic tool allows a musician to compose using specific chord progressions based on song key. As in the previous example, when composing a song in the key of E Major, the musician should be permitted to play a chord progression of 1-4-5-6-2-7-3, or any other progression chosen by the musician. The indicators provided by the present invention may also indicate relative positions in the customary scale and/or customary scale equivalent of a selected song key, thus eliminating the confusion between major song keys and their relative minor equivalents.

In our culture's music, there are thousands of songs based on a simple 1-4-5 chord progression. Yet, most people with little or no musical training, and using known systems and methods, have no concept of the meaning of a musical key or a chord progression. The present invention also allows for the use of chromatics at the discretion of a user. The inexperienced composer who uses the present invention is made fully aware at all times of what he is actually playing, therefore allowing "non-scale" chromatic chords to be added by choice, not just added unknowingly.

(2) There also remains a need for a musical instrument that provides a user the option to play chords with one or more fingers in the chord progression section as previously described, while the individual notes of the currently triggered chord are simultaneously made available for playing in separate fixed chord locations on the instrument. Individual notes can be sounded in different octaves when played. Regardless of the different chords which are being played in the chord progression section, the individual notes of each currently triggered chord can be made available for playing in these same fixed chord location(s) on the instrument in real-time. The fundamental note and the alternate note of the chord can be made available in their own fixed locations for composing purposes, and chord notes can be reconfigured in any way in real-time for unlimited system flexibility.

This fixed chord location feature of the present invention allows a user with little or no musical training to properly compose a complete music piece. For example, by specifying this fixed chord location, and identifying or indicating the fundamental note and alternate note locations of each chord, a user can easily compose entire basslines, arpeggios, and specific chord harmonies with no musical training, while maintaining complete creative control.

(3) There also remains a need for a way to trigger chords with one or more fingers in the chord progression section, while scale notes and/or non-scale notes are simultaneously made available for playing in separate fixed locations on the instrument. These scale notes and/or non-scale notes can also be played in different octaves. This method of malting scale and/or non-scale notes available for playing from fixed locations on the instrument allows unlimited real-time system flexibility, during both composition and/or re-performance playback.

(4) There also remains a need for a way to trigger chords with one or more fingers in the chord progression section, while the entire chord is simultaneously made available for playing from one or more keys in a separate fixed location, and can be sounded in different octaves when played. This feature allows a user to play right hand chords, inversions, the root position of a chord, and popular voicing of a chord at any time a user chooses and with dramatically reduced physical skill, yet retains the creativity and flexibility of a trained musician.

(5) Finally, there needs to be a means for adding to or modifying a composition once a basic progression and melody are decided upon and recorded by a user. A user with little or no musical training is thus able to add additional musically correct parts and/or non-scale parts to the composition, to remove portions of the composition that were previously recorded, or to simply modify the composition in accordance with the taste of the musician. The methods of the present invention allow any note, series of notes, harmonies, note groups, chord voicings, inversions, instrument configurations, etc. to be accessible at any time by a user to achieve professional composition and/or re-performance results.

Techniques for automating the performance of music on an electronic instrument are well known. They primarily involve the use of indication systems. These indication systems display to a user the notes to play on an instrument in order to achieve the desired performance. These techniques are primarily used as teaching aids of traditional music theory and performance (e.g., Shaffer et al., U.S. Pat. No. 5,266,735). These current methods provide high tech "cheat sheets". A user must follow along to an indication system and play all chords, notes, and scales just as a trained musician would. These methods do nothing to actually reduce the demanding physical skills required to perform the music, while still allowing the user to maintain creative control. Other performance techniques known in the art allow a song to be "stepped through" by pressing one or more input controllers multiple times. These are unduly limited in the fact that very little user interaction is achieved. Others allow a song to be stepped through with no means of reducing the complexity of the performance, or allowing the levels of creative control as described herein. These techniques are unduly limited and do not take into account the need for improvisational ability, system flexibility, and multiple skill levels in a given performance. All of the previously said needs must be met in order to provide professional performance results. The present invention takes into account these needs. The present invention allows a given performance to be effected using a varied number of input controllers, meaning that the given performance may be effected from any of a variety of different input controller pluralities. Indications are utilized to accomplish this. The methods of the present invention allow a user to improvise in a given performance with complete creative control, and with no training required. Different skill levels may be utilized to provide different levels of user interaction. A user may control a performance based on the rate at which a user performs one or more indicated notes and/or chords. This provides complete creative control over a given performance. Indications may also be displayed at a designated tempo. The fixed location methods of the present invention allow all appropriate notes, note groups, one-finger chords, and harmonies to be made available to a user from fixed locations on the instrument. This reduces the amount of physical skill needed to perform music. A user with little or no musical training can effectively perform music while maintaining the high level of creativity and interaction of a trained musician. Increased system flexibility is also provided due to all of the various notes, note groups, setup configurations, harmonies, etc. that are accessible to a user at any time.

It is a further object of the present invention to complete the system by allowing multiple instruments of the present invention to be effectively utilized together. This will allow interactive composition and/or performance among multiple users, with no need for knowledge of music theory. The highest levels of creativity and flexibility are maintained. Users may perform together utilizing instruments connected directly into one other, connected through the use of an external processor or processors, connected over a network, or through various combinations of these. Multiple users may each select a specific performance part or parts to perform, in order to cumulatively effect an entire performance simultaneously.

SUMMARY OF THE INVENTION

There currently exists no such adequate means of composing and performing music with little or no musical training. It is therefore an object of the present invention to allow individuals to compose and perform music with reduced physical skill requirements and no need for knowledge of music theory, while still maintaining the highest levels of creativity and flexibility that a trained musician would have. The fixed location methods of the present invention solves these problems while still allowing a user to maintain creative control.

These and other features of the present invention will be apparent to those of skill in the art from a review of the following detailed description, along with the accompanying drawings.

BRIEF DESCRIPTION OF DRAWINGS

FIG. 16B is an illustrative table depicting note event data used in the weedout function.

DETAILED DESCRIPTION OF A PREFERRED EMBODIMENT

The present invention is primarily software based and the software is in large part a responsibility driven object oriented design. The software is a collection of collaborating software objects, where each object is responsible for a certain function.

Figure 1A:
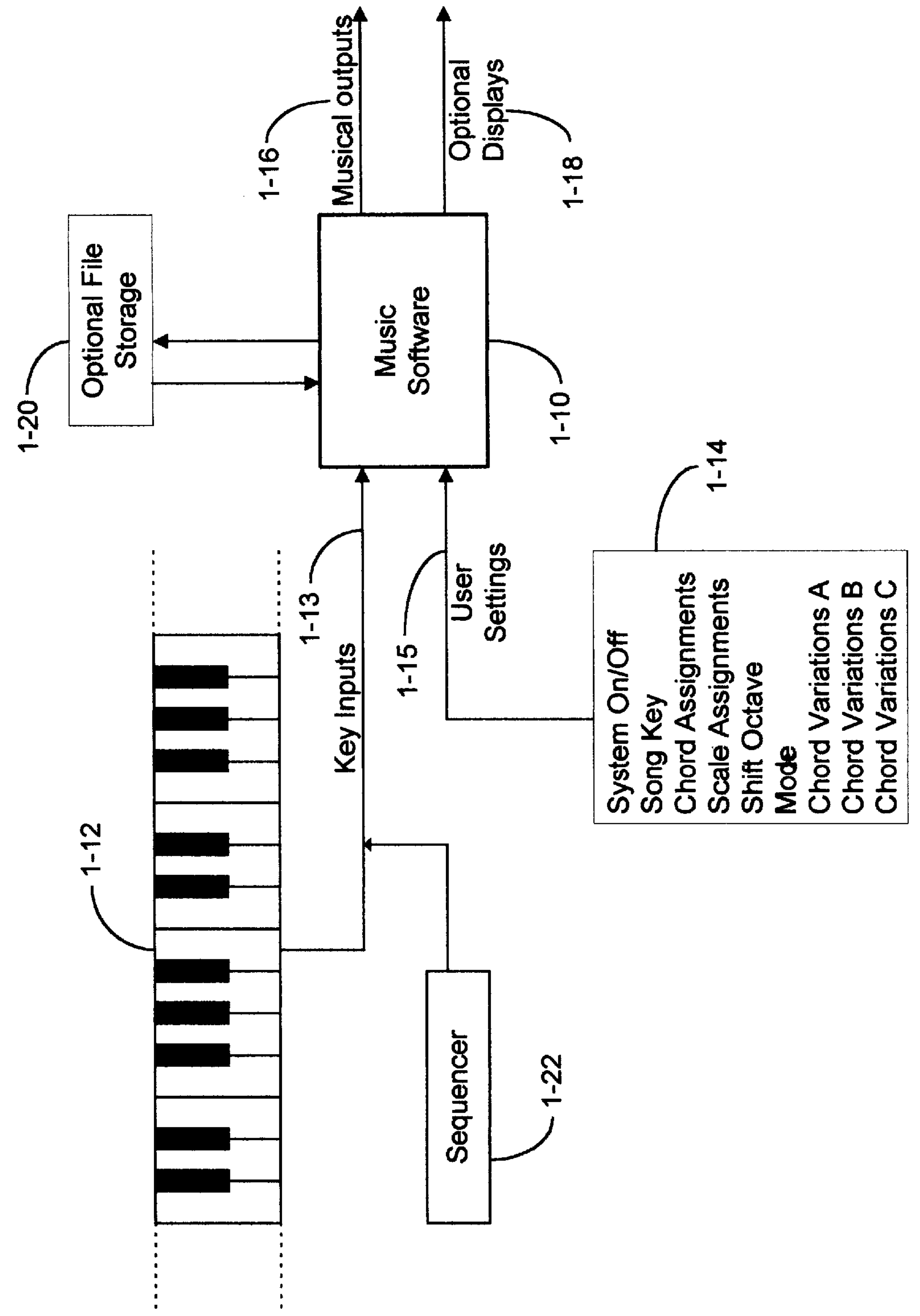
FIG. 1A is a schematic diagram of a composition and performance instrument of the present invention.
Figure 1B:
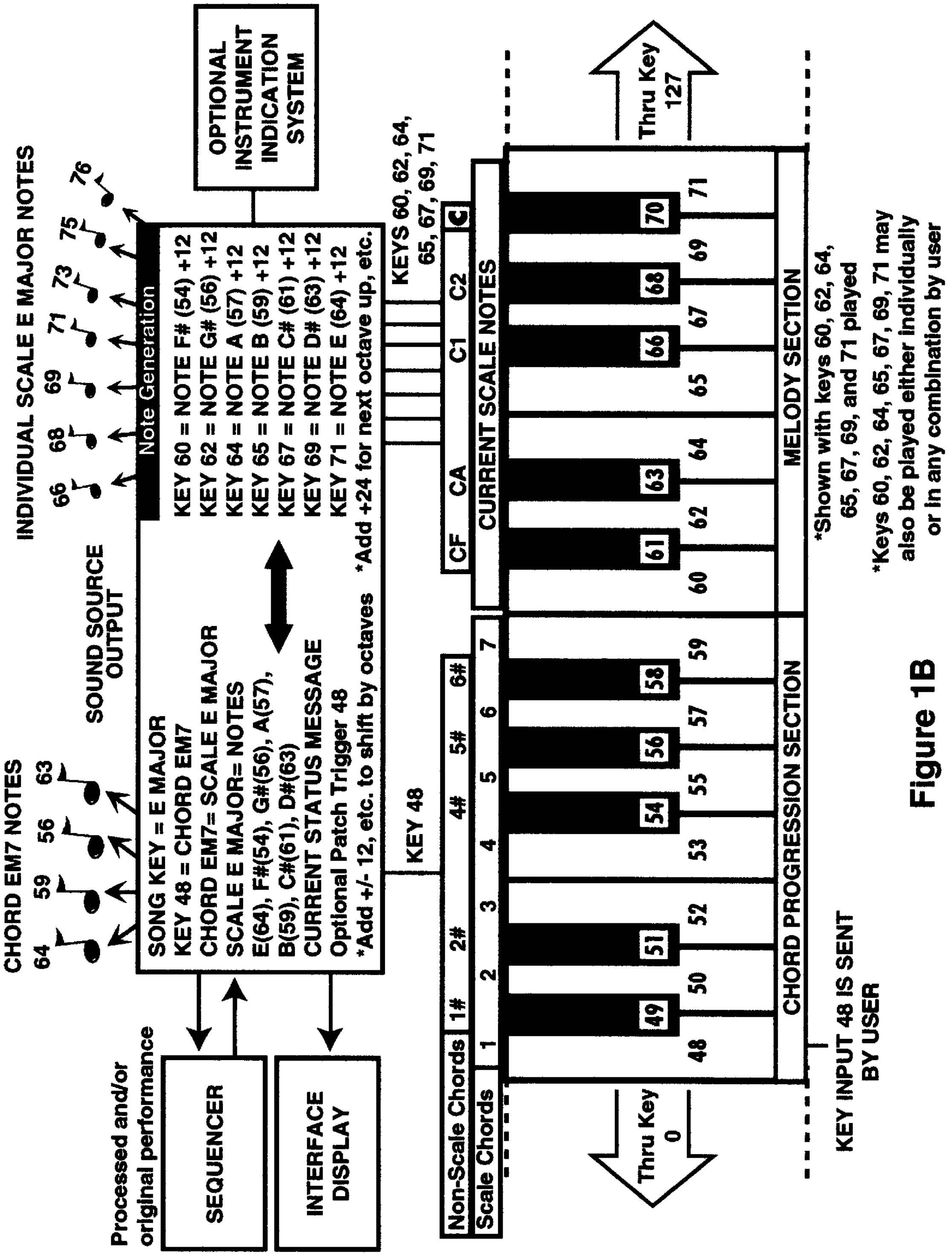
FIG. 1B is a general overview of the chord progression method and the fixed scale location method.
Figure 1C:
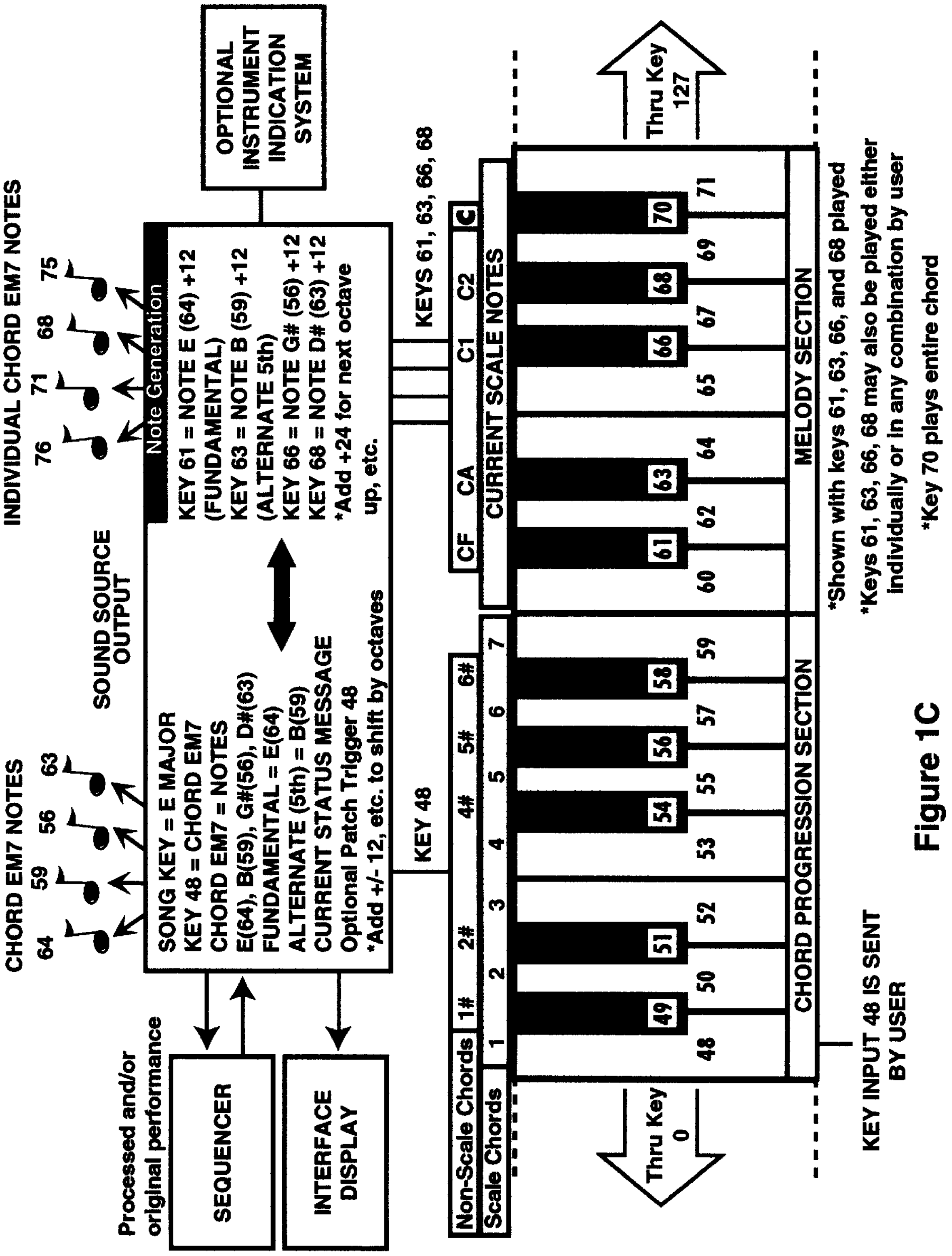
FIG. 1C is a general overview of the chord progression method and the fixed chord location method.
Figure 1D:
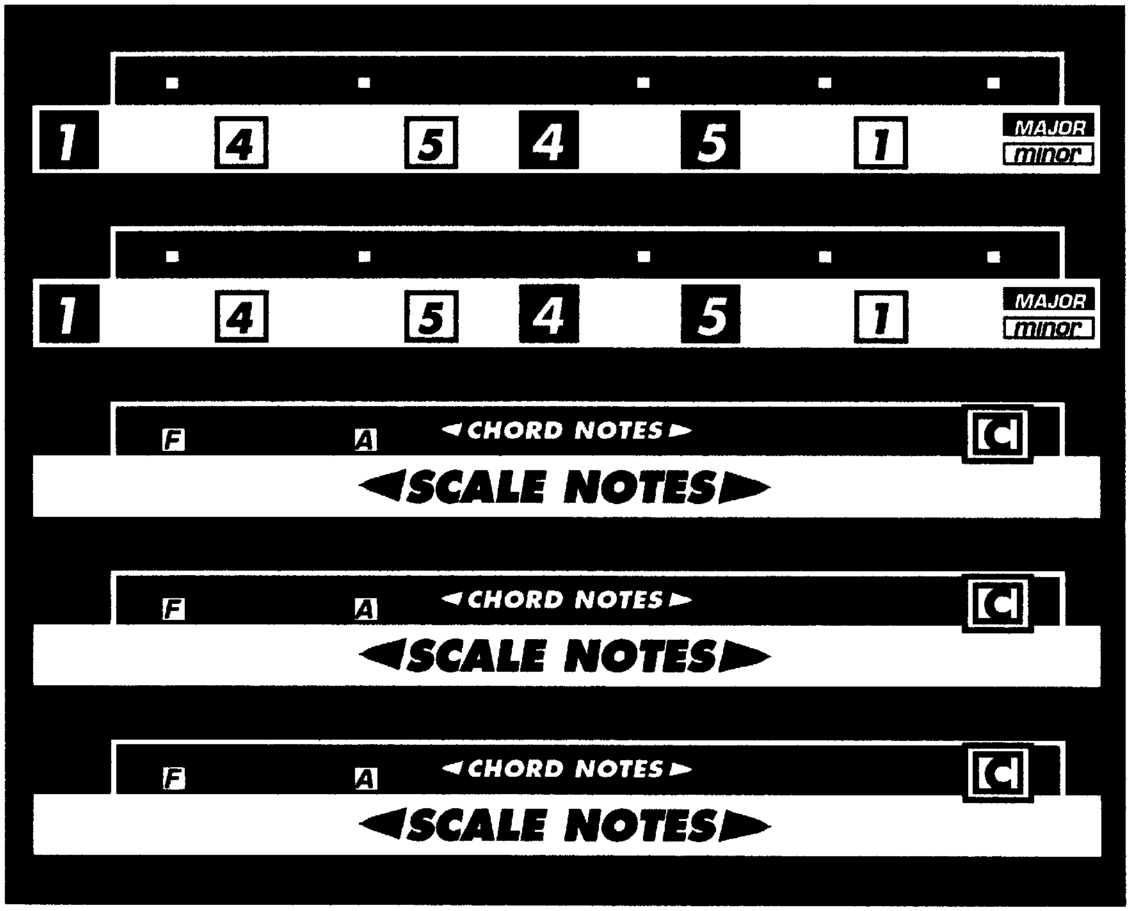
FIG. 1D is one sample of a printed indicator system which can be attached to or placed on the instrument.
Figure 2:
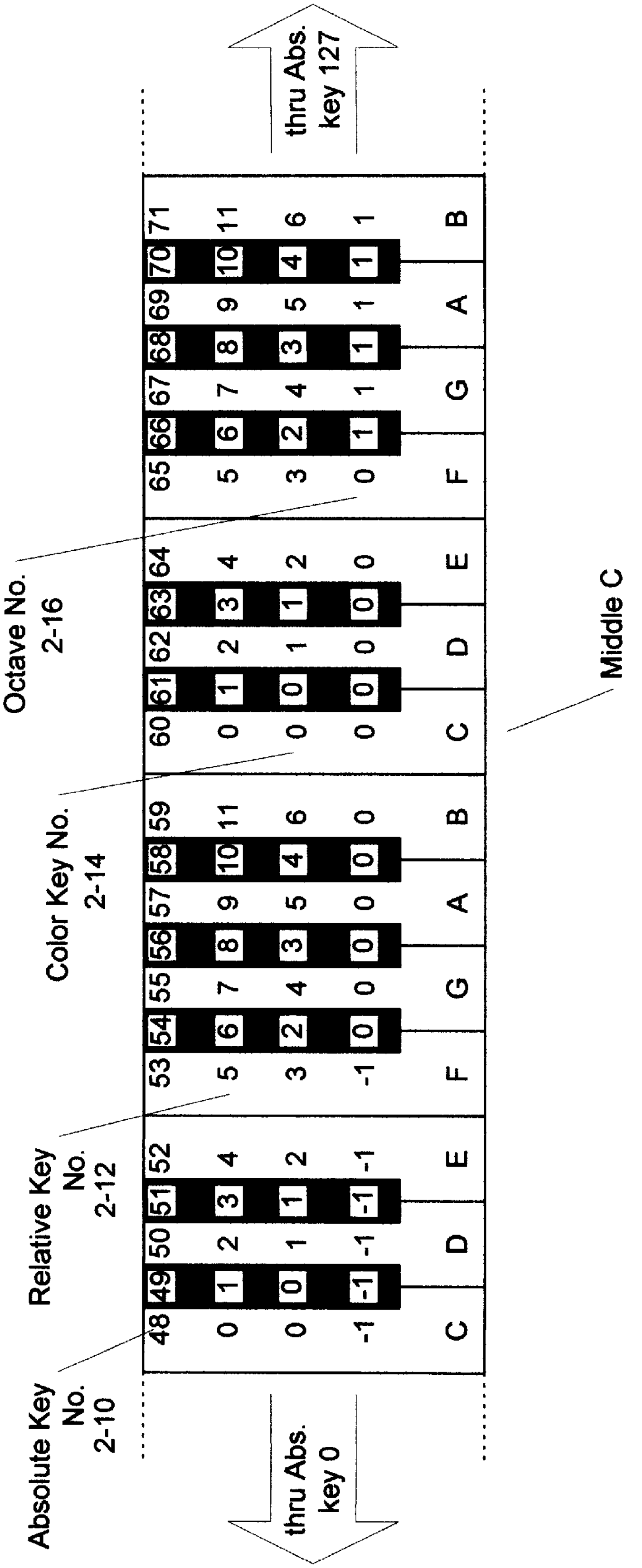
FIG. 2 is a detail drawing of a keyboard of the present invention defining key elements.
Figure 3:
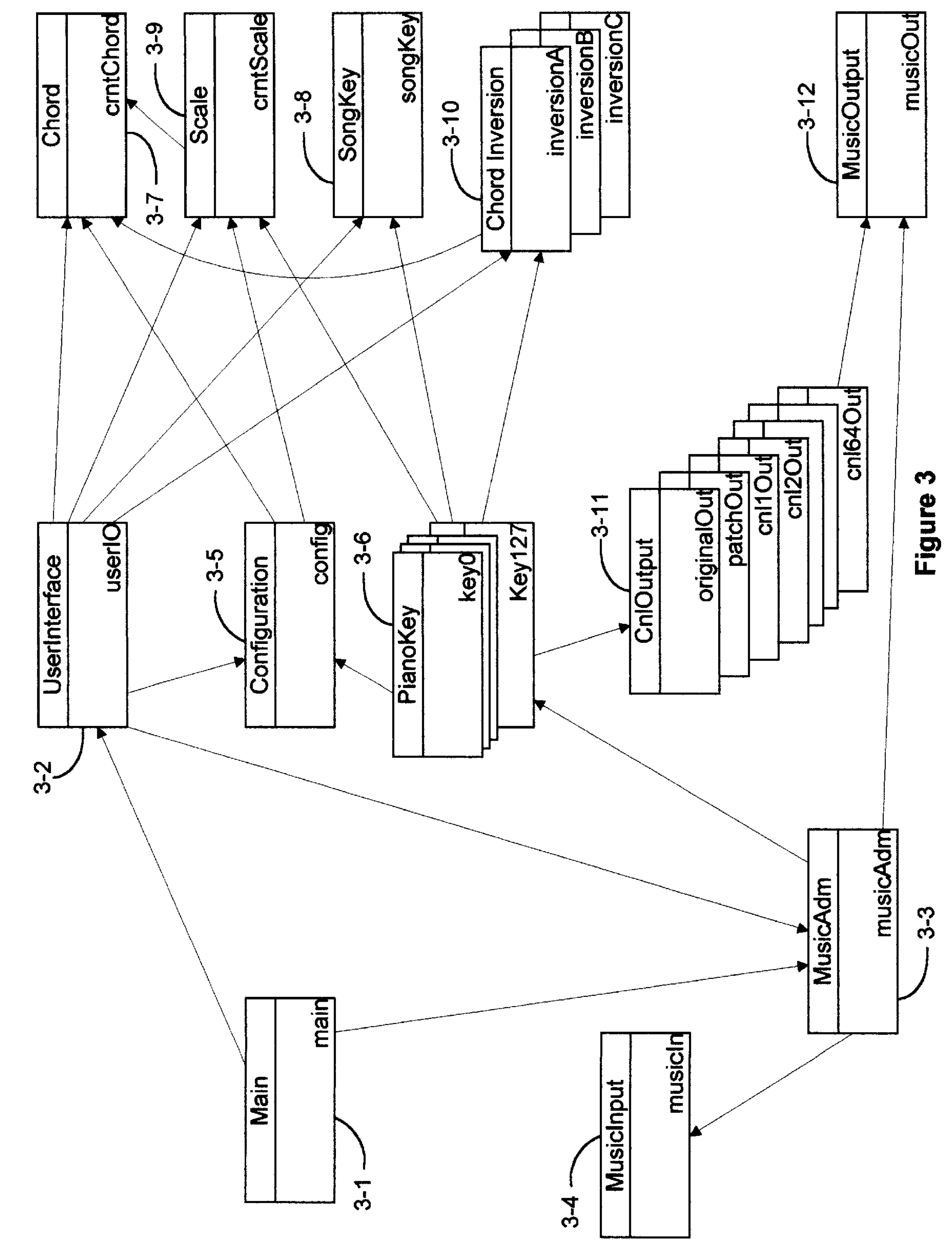
FIG. 3 is an overall logic flow block diagram of the system of the present invention.

For a more complete understanding of a preferred embodiment of the present invention, the following detailed description is divided to (1) show a context diagram of the software domain (FIG. 1A); (2) describe the nature of the musical key inputs to the software (FIG. 2); (3) show a diagram of the major objects (FIG. 3); (3) identify the responsibility of each major object; (4) list and describe the attributes of each major object; (5) list and describe the services or methods of each object including flow diagrams for those methods that are key contributors to the present invention; and (6) describe the collaboration between each of the main objects.

Referring first to FIG. 1A, a computer 1-10 memory and processing elements in the usual manner. The computer 1-10 preferably has the music software program installed thereon. The music software program comprises an off-the-shelf program, and provides computer assisted musical composition and performance software. This program accepts inputs from a keyboard 1-12 or other user interface element and a user-selectable set of settings 1-14. The keyboard 1-12 develops a set of key inputs 1-13 and the settings 1-14 provides a user settings input group 1-15

It should be appreciated that the keyboard may comprise a standard style keyboard, or it may include a computer keyboard or other custom-made input device, as desired. For example, gloves are gaining in popularity as input devices for electronic instruments. The computer 1-10 sends outputs to musical outputs 1-16 for tone generation or other optional displays 1-18. The optional displays 1-18 provide a user with information which includes the present configuration, chords, scales and notes being played (output).

The music software in the computer 1-10 takes key inputs and translates them into musical note outputs. This software and/or program may exist separately from its inputs and outputs such as in a personal computer and/or other processing device. The software and/or program may also be incorporated along with its inputs and outputs as any one of its inputs or outputs, or in combination with any or all of its inputs or outputs. It is also possible to have a combination of these methods. All of these, whether utilized separately or together in any combination may be used to create the "instrument" as described herein.

The User settings input group 1-14 contains settings and configurations specified by a user that influence the way the software interprets the Key inputs 1-13 and translates these into musical notes at the musical outputs 1-16. The user settings 1-15 may be input through a computer keyboard, push buttons, hand operated switches, foot operated switches, or any combination of such devices. Some or all of these settings may also be input from the Key inputs 1-13. The user settings 1-15 include a System on/off setting, a song key setting, chord assignments, scale assignments, and various modes of operation.

The key inputs 1-13 are the principle musical inputs to the music software. The key inputs 1-13 contain musical chord requests, scale requests, melodic note requests, chord note requests and configuration requests and settings. These inputs are described in more detail in FIG. 2. The preferred source of the key inputs and/or input controllers is a digital electronic (piano) keyboard that is readily available from numerous vendors. This provides a user with the most familiar and conventional way of inputting musical requests to the software. The music software in the computer 1-10, however, may accept inputs 1-13 from other sources such as computer keyboards, or any other input controllers comprising various switching devices, which may or may not be velocity sensitive. A sequencer 1-22 or other device may simultaneously provide pre-recorded input to the computer 1-10, allowing a user to add another "voice" to a composition, and/or for performance.

The system may also include an optional non-volatile file storage device 1-20. The storage device 1-20 may be used to store and later retrieve the settings and configurations. This convenience allows a user to quickly and easily configure the system to a variety of different configurations. The storage device 1-20 may comprise a magnetic disk, tape, or other device commonly found on personal computers and other digital electronic devices. These configurations may also be stored in memory to provide real-time setups from an input controller, user interface, etc.

The musical outputs 1-16 provide the main output of the system. The outputs 1-16 contain the notes, or note-identifying information representative of the notes, that a user intends to be sounded (heard) as well as other information, or musical data, relating to how notes are sounded (loudness, etc.). In addition, other data such as configuration and key inputs 1-13 are encoded into the output stream to facilitate iteratively playing back and refining the results. The present invention can be used to generate sounds by coupling intended output with a sound source, such as a computer sound card, external sound source, internal sound source, software-based sound source, etc. which are all known in the art. The sound source described herein may be a single sound source, or multiple sound sources acting as a unit to generate sounds of any or all of the various notes or note groups described herein. An original performance can also be output (unheard) along with the processed performance (heard), and recorded for purposes of re-performance, substitutions, etc. MIDI is an acronym that stands for Musical Instrument Digital Interface, an international standard. Even though the preferred embodiment is described using the specifications of MIDI, any adequate protocol could be used. This can be done by simply carrying out all processing relative to the desired protocol. Therefore, the disclosed invention is not limited to MIDI only.

FIG. 2 shows how the system parses key inputs 1-13. Only two octaves are shown in FIG. 2, but the pattern repeats for all other lower and higher octaves. Each key input 1-13 has a unique absolute key number 2-10, shown on the top row of numbers in FIG. 2. The present invention may use a MIDI keyboard and, in such a case, the absolute key numbers are the same as the MIDI note numbers as described in the MIDI specification. The absolute key number 2-10 (or note number), along with velocity, is input to the computer for manipulation by the software. The software assigns other identifying numbers to each key as shown in rows 2 through 4 in FIG. 2. The software assigns to each key a relative key number 2-12 as shown in row 2. This is the key number relative to a C chromatic scale and ranges from 0–11 for the 12 notes of the scale. For example, every 'F' key on the keyboard is identified with relative number 5. Each key is also assigned a color (black or white) key number 2-14. Each white key is numbered 0–6 (7 keys) and each black key is numbered 0–4 (5 keys). For example, every 'F' key is identified as color (white) key number 3 (the 4th white key) and every 'F#' as color (black) key number 2 (the 3rd black key). The color key number is also relative to the C scale. The 4th row shown on FIG. 2 is the octave number 2-16. This number identifies which octave on the keyboard a given key is in The octave number 0 is assigned to absolute key numbers 54 through 65. Lower keys are assigned negative octave numbers and higher keys are assigned positive octave numbers. The logic flow description that follows will refer to all 4 key identifying numbers.

FIG. 3 is a block diagram of the structure of the software showing the major objects. Each object has its own memory for storing its variables or attributes. Each object provides a set of services or methods (subroutines) which are utilized by other objects. A particular service for a given object is invoked by sending a message to that object. This is tantamount to calling a given subroutine within that object. This concept of message sending is described in numerous text books on software engineering and is well known in the art. The lines with arrows in FIG. 3 represent the collaborations between the objects. The lines point from the caller to the receiver.

Each object forms a part of the software; the objects work together to achieve the desired result. Below, each of the objects will be described independent of the other objects. Those services which are key to the present invention will include flow diagrams.

Figure 4:
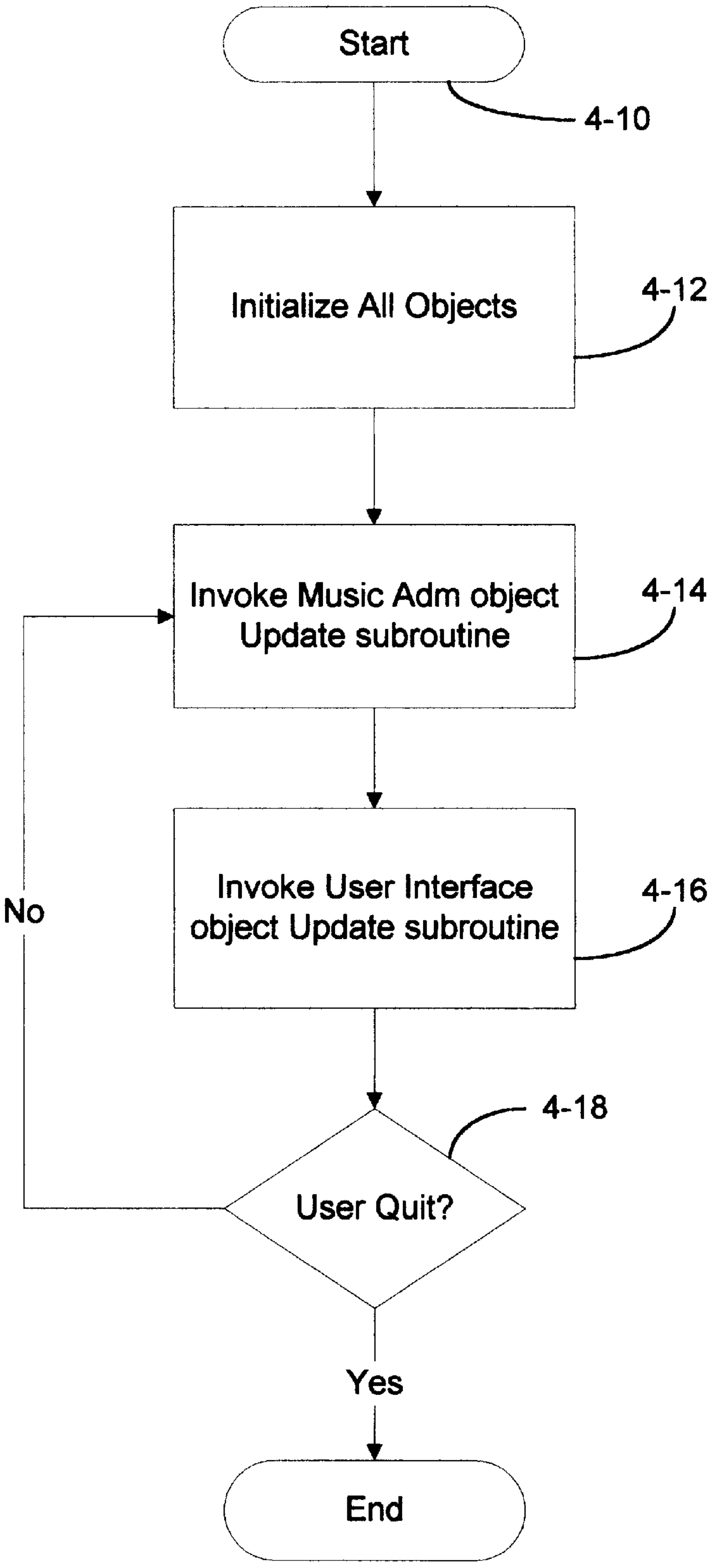
FIG. 4 is a high level logic flow diagram of the system.

The Main block 3-1 is the main or outermost software loop. The Main block 3-1 repeatedly invokes services of other objects. FIG. 4 depicts the logic flow for the Main object 3-1. It starts in step 4-10 and then invokes the initialization service of every object in step 4-12. Steps 4-14 and 4-16 then repeatedly invoke the update services of a Music Administrator object 3-3 and a User Interface object 3-2. The objects 3-3 and 3-2 in turn invoke the services of other objects in response to key (music) inputs 1-13 and user interface inputs. The user interface object 3-2 in step 4-18 determines whether or not a user wants to terminate the program.

Thus, the Main Object 3-1 calls the objects 3-3 and 3-2 to direct the overall action of the system and the lower level action of the dependent objects will now be developed Tables 1 and 2

Among other duties, the User Interface object 3-2 calls up a song key object 3-8. The object 3-8 contains the one current song key and provides services for determining the chord fundamental for each key in the chord progression section. The song key is stored in the attribute songkey and is initialized to C (See Table 2 for a list of song keys). The attribute circleStart (Table 1) holds the starting point (fundamental for relative key number 0) in the circle of 5ths or 4ths. The Get Key and Set Key services return and set the songkey attribute, respectively. The service 'SetMode()' sets the mode attribute. The service SetCircle Start() sets the circle Start attribute.

When mode=normal, the 'Get-Chord Fundamental for relative key number Y' determines the chord fundamental note from Table 2. The relative key number Y is added to the current song key. If this sum is greater than 11, then 11 is subtracted from the sum. The sum becomes the index into Table 2 where the chord fundamental note is located and returned.

The chord fundamentals are stored in Table 2 in such a way as to put the scale chords on the white keys (index values of 0, 2, 4, 5, 7, 9, and 11) and the non-scale chords on the black keys (index values 1, 3, 6, 8, and 10). This is also the preferred method for storing the fundamental for the minor song keys. Optionally the fundamental for the minor keys may be stored using the offset shown in the chord indication row of Table 2. As shown, a single song key actually defines both a customary scale and a customary scale equivalent. This means that a chord assigned to an input controller will represent a specific relative position in either the customary scale or customary scale equivalent of the song key. The song key is defined herein to be one song key regardless of various labels conveyed to a user (i.e. major/minor, minor, major, etc.). Non-traditional song key names may also be used (i.e. red, green, blue, 1, 2, 3, etc.). Regardless of the label used, a selected song key will still define one customary scale and one customary scale equivalent. The song key will be readily apparent during performance due to the fact that the song key has been used over a period of centuries and is well known. It should be noted that all indicators described herein by the present invention may be provided to a user in a variety of ways. Some of these may include through the use of a user interface, LEDs, printing, etching, molding, color-coding, design, decals, description or illustration in literature, provided to or created by a user for placement on the instrument, etc. Those of ordinary skill in the art will recognize that many ways, types, and combinations may be used to provide the indicators of the present invention. Indicators are not limited to the types described herein. It should also be noted that the methods of the present invention may also be used for other forms of music. Other forms of music may utilize different customary scales such as Indian scales, Chinese scales, etc. These scales may be utilized by carrying out all processing described herein relative to the scales.

Sending the message 'Get chord fundamental for relative key number Y' to the song key object calls a function or subroutine within the song key object that takes the relative key number as a parameter and returns the chord fundamental. When mode=circle5 or circle4, the relative key number Y is added to circleStart and the fundamental is found in Table 2 in circle of 5th and circle of 4th rows respectively.

The service 'GetSongKeyLable()' returns the key label for use by the user interface.

The service 'GetIndicationForKey(relativeKeyNumber)' is provided as an added feature to the preferred 'fixed location' method which assigns the first chord of the song key to the first key, the 2nd chord of the song key to the 2nd key etc. As an added feature, instead of reassigning the keys, the chords may be indicated on a computer monitor or above the appropriate keys using an alphanumeric display or other indication system. This indicates to a user where the first chord of the song key is, where the 2nd chord is etc. The service 'GetIndicationForKey(relativeKeyNumber)' returns the alpha-numeric indication that would be displayed. The indicators are in Table 2 in the row labeled 'Chord Indications'. The song key object locates the correct indicator by subtracting the song key from the relative key number. If the difference is less than 0, then 12 is added. This number becomes the table index where the chord indication is found. For example, if the song key is E MAJOR, the service GetIndicationForKey(4) returns indication '1' since 4 (relative key)−4 (song key)=0 (table index). GetIndicationForKey(11) returns '5' since 11 (relative key)−4 (song Key)=7 (table index) and GetIndicationForKey(3) returns '7' since 3(relative key)−4 (song key)+12=11 (table index). If the indication system is used, then the user interface object requests the chord indications for each of the 11 keys each time the song key changed. The chord indication and the key labels can be used together to indicate the chord name as well (D, F#, etc.)

TABLE 1

| SongKey Object Attributes and Services |
|---|
| attributes: |
| 1. songKey |
| 2. mode |
| 3. circleStart |
| Services: |
| 1. SetSongKey(newSongKey); |
| 2. GetSongKey(); songKey |
| 3. GetChordFundamental(relativeKeyNumber): fundamental |
| 4. GetSongKeyLabel(); textLabel |
| 5. GetIndicationForKey(relativeKeyNumber); indication |
| 6. SetMode(newMode); |
| 7. setCircleStart(newStart) |

TABLE 2

Song key and Chord Fundamental

| Table Index | 0 | 1 | 2 | 3 | 4 | 5 | 6 | 7 | 8 | 9 | 10 | 11 |
|---|---|---|---|---|---|---|---|---|---|---|---|---|
| Song Key | C | C# | D | D# | E | F | F# | G | G# | A | A# | B |
| Song Key attribute | 0 | 1 | 2 | 3 | 4 | 5 | 6 | 7 | 8 | 9 | 10 | 11 |
| Chord Fundamental | 60 | 61 | 62 | 63 | 64 | 65 | 54 | 55 | 56 | 57 | 58 | 59 |
| Circle of 5ths | C | G | D | A | E | B | F# | C# | G# | D# | A# | F |
| | (60) | (55) | (62) | (57) | (64) | (59) | (54) | (61) | (56) | (63) | (58) | (65) |
| Circle of 4ths | C | F | Bb | Eb | Ab | Db | Gb | B | E | A | D | G |
| | (60) | (65) | (58) | (63) | (56) | (61) | (54) | (59) | (64) | (57) | (62) | (55) |
| Key Label | C | C# | D | D# | E | F | F# | G | G# | A | A# | B |
| Chord indication | '1' | '1#' | '2' | '2#' | '3' | '4' | '4#' | '5' | '5#' | '6' | '6#' | '7' |
| Relative minor | '3' | '3#' | '4' | '4#' | '5' | '6' | '6#' | '7' | '7#' | '1' | '1#' | '2' |

For example, if the current song key is D Major, then the current song key value is 2. If a message is received requesting the chord fundamental note for relative key number 5, then the song key object returns 55, which is the chord fundamental note for the 7th (2+5) entry in Table 2. This means that in the song key of D, an F piano key should play a G chord, but how the returned chord fundamental is used is entirely up to the object receiving the information. The song key object (3-8) does its part by providing the services shown.

Figure 5:
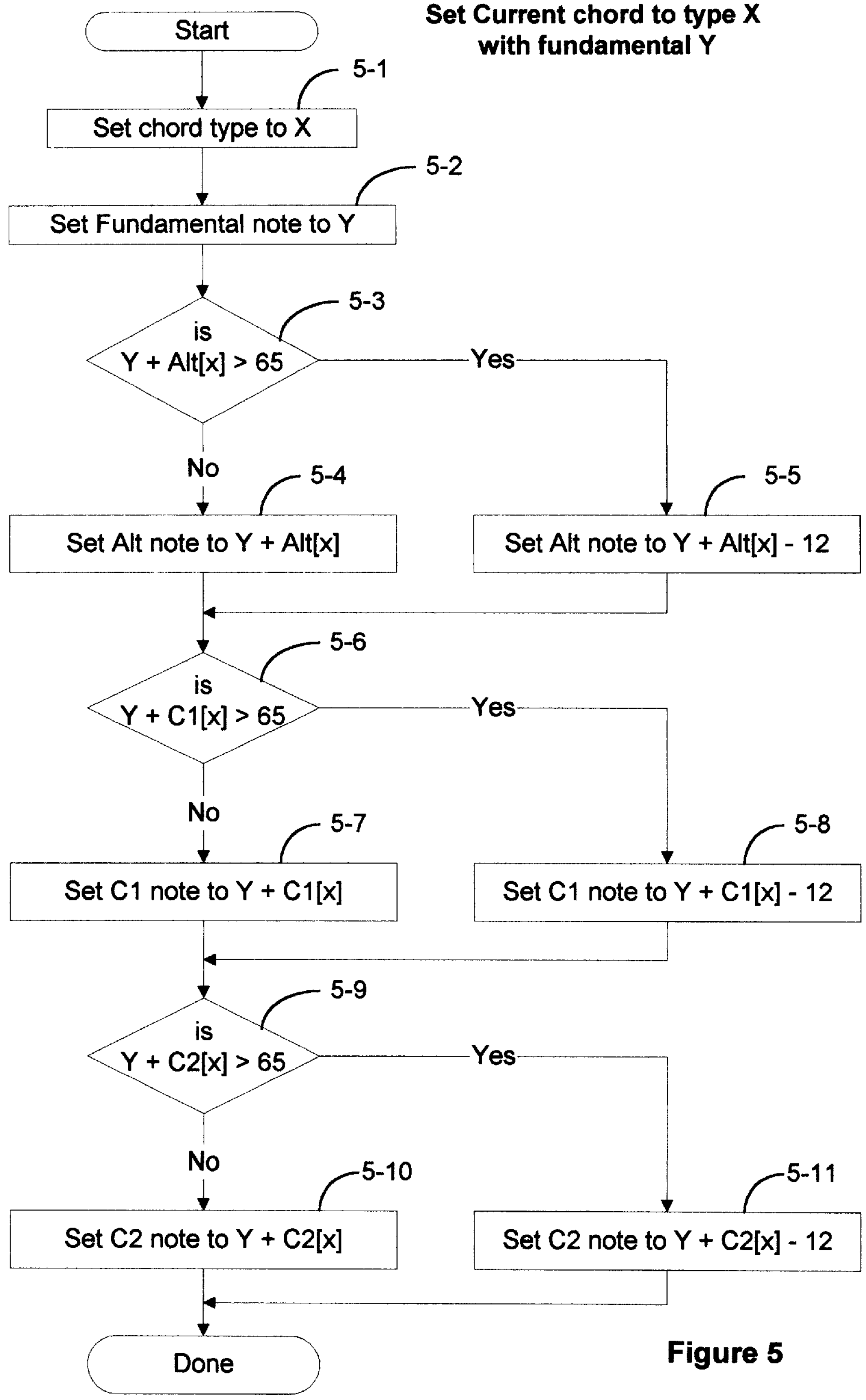
FIG. 5 is a logic flow diagram of chord objects ‘Set Chord’ service.

FIG. 5 and Tables 3 and 4

There is one current chord object 3-7. Table 3 shows the attributes and services of the chord object which include the current chord type and the four notes of the current chord. The current chord object provides nine services.

The 'GetChord()' service returns the current chord type (major, minor, etc.) and chord fundamental note. The 'CopyNotes()' service copies the notes of the chord to a destination specified by the caller. Table 4 shows the possible chord types and the chord formulae used in generating chords. The current chord type is represented by the index in Table 4. For example, if the current chord type is =6, then the current chord type is a suspended 2nd chord.

FIG. 5 shows a flow diagram for the service that generates and sets the current chord. Referring to FIG. 5, this service first sets the chord type to the requested type X in step 5-1. The fundamental note Y is then stored in step 5-2. Generally, all the notes of the current chord will be contained in octave number 0 which includes absolute note numbers 54 through 65 (FIG. 2). Y will always be in this range. The remaining three notes, the Alt note, C1 note, and C2 note of the chord are then generated by adding an offset to the fundamental note. The offset for each of these note is found in Table 4 under the columns labeled Alt, C1 and C2. Four notes are always generated. In the case where a chord has only three notes, the C2 note will be a duplicate of the C1 note.

Referring back to FIG. 5, step 5-3 determines if the sum of the fundamental note and the offset for the Alt note (designated Alt[x]) is less than or equal to 65 (5-3). If so, then the Alt note is set to the sum of the fundamental note plus the offset for the Alt note in step 5-4. If the sum of the fundamental note and the offset for the Alt note is greater than 65, then the Alt note is set to the sum of the fundamental note plus the offset of the Alt note minus 12 in step 5-5. Subtracting 12 yields the same note one octave lower.

Similarly, the C1 and C2 notes are generated in steps 5-6 through 5-11. For example, if this service is called requesting to set the current chord to type D Major (X=0, Y=62), then the current chord type will be equal to 0, the fundamental note will be 62 (D), the Alt note will be 57 (A, 62+7−12), the C1 note will be 54 (F#, 62+4−12) and the C2 note also be 54 (F#, 62+4−12). New chords may also be added simply by extending Table 4, including chords with more than 4 notes. Also, the current chord object can be configured so that the C1 note is always the 3rd note of the chord, etc. or note may be arranged in any order. A mode may be included where the 5th(ALT) is omitted from any chord simply by adding an attribute such as 'drop5th' and adding a service for setting 'drop5th' to be true or false and modifying the SetChordTo() service to ignore the ALT in Table 4 when 'drop5th' is true.

The service 'isNoteInChord(noteNumber)' will scan chordNote[] for noteNumber. If noteNumber is found it will return True (1). If it is not found, it will return False (0).

The remaining services return a specific chord note (fundamental, alternate, etc.) or the chord label.

TABLE 3

Chord Object Attributes and Services

Attributes:

1. chordType
2. chordNote [4]

Services:

1. SetChordTo(ChordType, Fundamental);
2. GetChordType(); chordType
3. CopyChordNotes(destination);
4. GetFundamental(); chordNote[0]
5. GetAlt(); chordNote[1]
6. GetC1(); chordNote[2]
7. GetC2(); chordNote[3]
8. GetChordLabel(); textLabel
9. isNoteInChord(noteNumber); True/False

TABLE 4

Chord Note Generation

| Index | Type | Fund | Alt | C1 | C2 | Label |
|---|---|---|---|---|---|---|
| 0 | Major | 0 | 7 | 4 | 4 | "" |
| 1 | Major seven | 0 | 7 | 4 | 11 | "M7" |
| 2 | minor | 0 | 7 | 3 | 3 | "m" |
| 3 | minor seven | 0 | 7 | 3 | 10 | "m7" |
| 4 | seven | 0 | 7 | 4 | 10 | "7" |
| 5 | six | 0 | 7 | 4 | 9 | "6" |
| 6 | suspended 2nd | 0 | 7 | 2 | 2 | "sus2" |
| 7 | suspended 4th | 0 | 7 | 5 | 5 | "sus4" |
| 8 | Major 7 diminished 5th | 0 | 6 | 4 | 11 | "M7(−5)" |
| 9 | minor six | 0 | 7 | 3 | 9 | "m6" |
| 10 | minor 7 diminished 5th | 0 | 6 | 3 | 10 | "m7(−5)" |
| 11 | minor Major 7 | 0 | 7 | 3 | 11 | "m(M7)" |
| 12 | seven diminished 5 | 0 | 6 | 4 | 10 | "7(−5)" |
| 13 | seven augmented 5 | 0 | 8 | 4 | 10 | "7(+5)" |
| 14 | augmented | 0 | 8 | 4 | 4 | "aug" |
| 15 | diminished | 0 | 6 | 3 | 3 | "dim" |
| 16 | diminished7 | 0 | 6 | 3 | 9 | "dim7" |

Figure 6A:
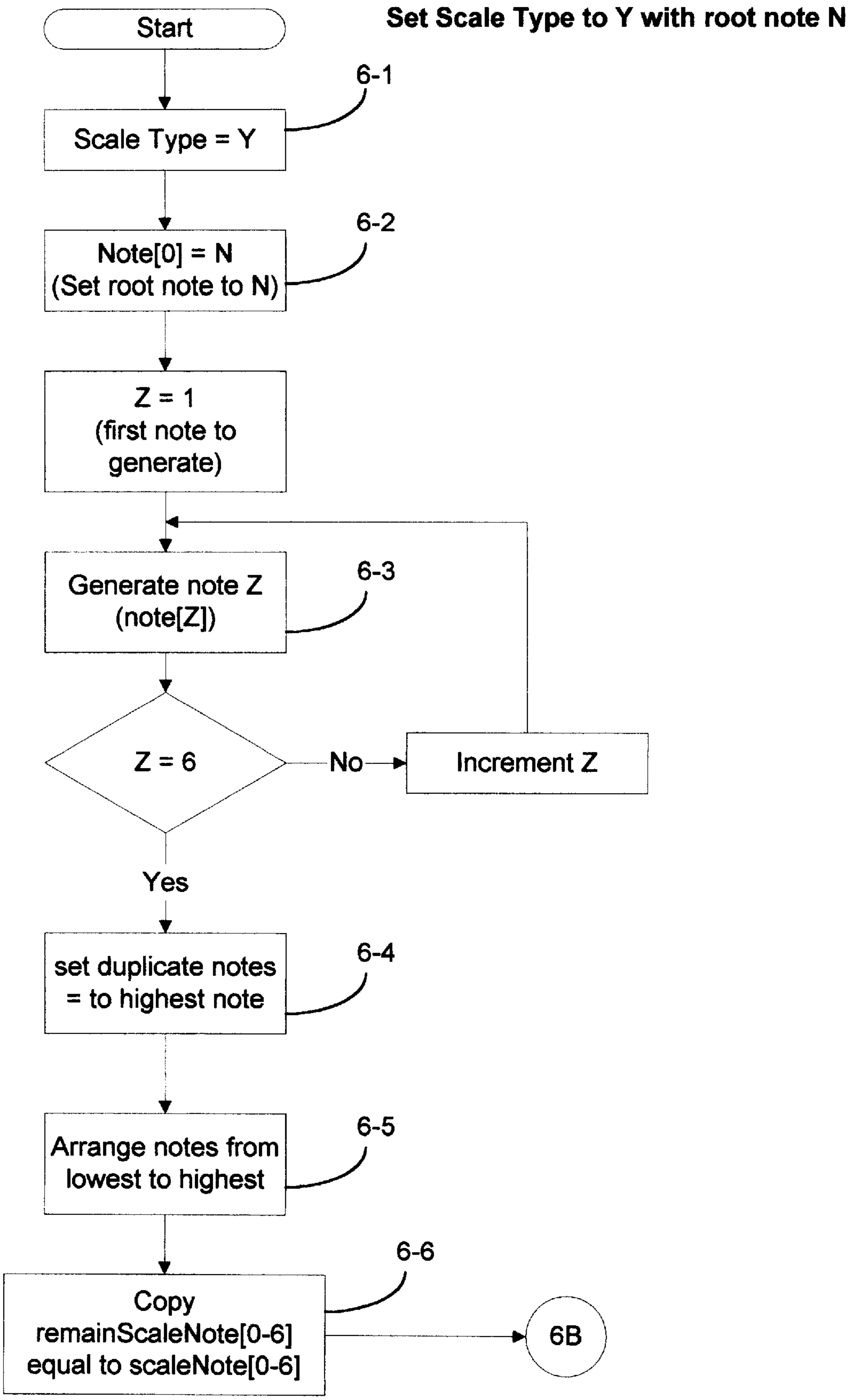
FIGS. 6A and 6B together are a logic flow diagram of scale objects ‘Set scale’ service.
Figure 6B:
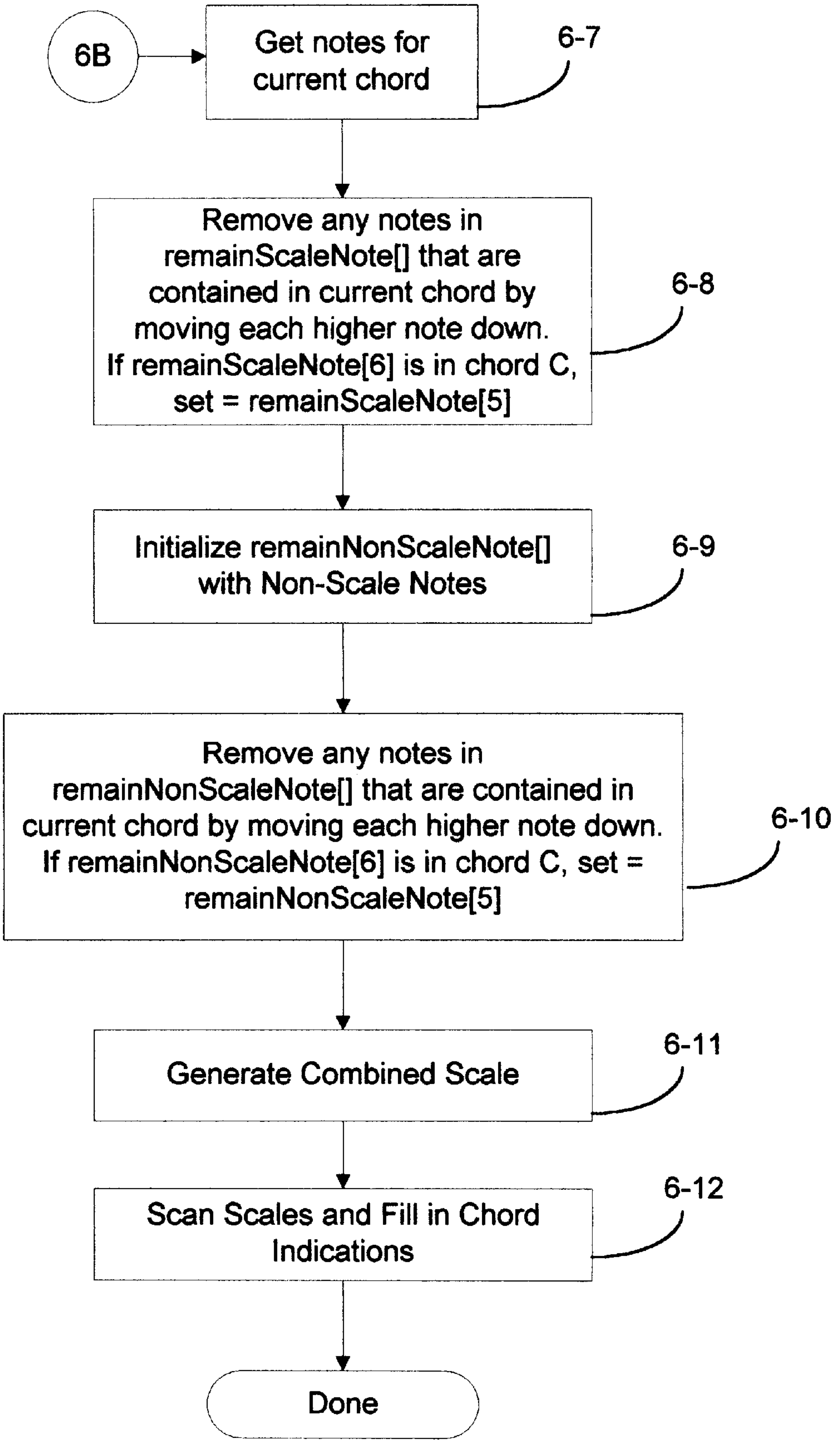

FIGS. 6a and 6b and Tables 5, 6a, 6b, and 7

As shown in FIG. 3, there is one Current Scale object 3-9. This object is responsible for generating the notes of the current scale. It also generates the notes of the current scale with the notes common to the current chord removed It also provides the remaining notes that are not contained in the current scale or the current chord.

Referring to Table 5, the attributes of the current scale include the scale type (Major, pentatonic, etc.), the root note and all other notes in three scales. The scaleNote[7] attribute contains the normal notes of the current scale. The remainScaleNote[7] attributes contains the normal notes of the current scale less the notes contained in the current chord. The remainNonScaleNote[7] attribute contains all remaining notes (of the 12 note chromatic scale) that are not in the current scale or the current chord. The combinedScaleNote[11] attribute combines the normal notes of the current scale (scaleNote[]) with all notes of the current chord that are not in the current scale (if any).

Each note attribute (. . . Note[]) contains two fields, a note number and a note indication (text label). The note number field is simply the value (MIDI note number) of the note to be sounded. The note indication field is provided in the event that an alpha numeric, LED (light emitting diode) or other indication system is available. It may provide a useful indication on a computer monitor as well. This 'indication' system indicates to a user where certain notes of the scale appear on the keyboard. The indications provided for each note include the note name, (A, B, C#, etc.), and note position in the scale (indicated by the numbers 1 through 7). Also, certain notes have additional indications. The root note is indicated with the letter 'R', the fundamental of the current chord is indicated by the letter 'F', the alternate of the current chord is indicated by the letter 'A', and the C1 and C2 notes of the current chord by the letters 'C1' and 'C2', respectively. All non-scale notes (notes not contained in scaleNote[]) have a blank ('') scale position indication. Unless otherwise stated, references to the note attributes refer to the note number field.

The object provides twelve main services. FIGS. 6*a* and 6*b* show a flow diagram for the service that sets the scale type. This service is invoked by sending the message 'Set scale type to Y with root note N' to the scale object. First, the scale type is saved in step 6-1. Next, the root or first note of the scale, designated note[0], is set to N in step 6-2. The remaining notes of the scale are generated in step 6-3 by adding an offset for each note to the root note. The offsets are shown for each scale type in Table 6a. As with the current chord object, all the scale notes will be in octave 0 (FIG. 2). As each note is generated in step 6-3, if the sum of the root note and the offset is greater than 65, then 12, or one octave, is subtracted, forcing the note to be between 54 and 65. As shown in Table 6a, some scales have duplicate offsets. This is because not all scales have 7 different notes. By subtracting 12 from some notes to keep them in octave 0, it is possible that the duplicated notes will not be the highest note of the resulting scale. Note that the value of 'Z' (step 6-3) becomes the position (in the scale) indication for each note, except that duplicate notes will have duplicate position indications.

Step 6-4 then forces the duplicate notes (if any) to be the highest resulting note of the current scale. It is also possible that the generated notes may not be in order from lowest to highest.

Step 6-5, in generating the current scale, rearranges the notes from lowest to highest. As an example, Table 7 shows the values of each attribute of the current scale after each step 6-1 through 6-5 shown in FIG. 6 when the scale is set to C Major Pentatonic. Next, the remaining scales notes are generated in step 6-6. This is done by first copying the normal scale notes to remainScaleNote[] array. Next, the notes of the current chord are fetched from the current chord object in step 6-7.

Then, step 6-8 removes those notes in the scale that are duplicated in the chord. This is done by shifting the scale notes down, replacing the chord note. For example, if remainScaleNote[2] is found in the current chord, then remainScaleNote[2] is set to remainScaleNote[3], remainScaleNote[3] is set to remainScaleNote[4], etc. (remainScaleNote[6] is unchanged). This process is repeated for each note in remainScaleNote[] until all the chord notes have been removed. If remainScaleNote[6] is in the current chord, it will be set equal to remainScaleNote[5]. Thus, the remainScaleNote[] array contains the notes of the scale less the notes of the current chord, arranged from highest to lowest (with possible duplicate notes as the higher notes).

Finally, the remaining non-scale notes (remainNonScaleNote[]) are generated. This is done in a manner similar to the remaining scale notes. First, remainNonScaleNote[] array is filled with all the non-scale notes as determined in step 6-9 from Table 6b in the same manner as the scale notes were determined from Table 6a. The chord notes (if any) are then removed in step 6-10 in the same manner as for remainScaleNotes[]. The combineScaleNote[] attribute is generated in step 6-11. This is done by taking the scaleNote[] attribute and adding any note in the current chord (fundamental, alternate, C1, or C2) that is not already in scaleNote[] (if any). The added notes are inserted in a manner that preserves scale order (lowest to highest).

The additional indications (Fundamental, Alternate, C1 and C2) are then filled in step 6-12. The GetScaleType() service returns the scale type. The service GetScaleNote(n) returns the nth note of the normal scale. Similarly, services GetRemainScaleNote(n) and GetRemainNonScaleNote(n) return the nth note of the remaining scale notes and the remaining non-scale notes respectively. The services, 'GetScaleNoteIndication' and 'GetCombinedNoteIndication', return the indication field of the scaleNote[] and combinedScaleNote[] attribute respectively. The service 'GetScaleLabel() returns the scale label (such as 'C MAJOR' or 'f minor').

The service 'GetScaleThirdBelow(noteNumber)' returns the scale note that is the third scale note below noteNumber. The scale is scanned from scaleNote[0] through scaleNote [6] until noteNumber is found. If it is not found, then combinedScaleNote[] is scanned. If it is still not found, the original note Number is returned (it should always be found as all notes of interest will be either a scale note or a chord note). When found, the note two positions before (where noteNumber was found) is returned as scaleThird. The 2nd position before a given position is determined in a circular fashion, i.e., the position before the first position (scaleNote [0] or combinedScaleNote[0] is the last position (scaleNote [6] or combinedScaleNote[10]. Also, positions with a duplicate of the next lower position are not counted. I.e., if scaleNote[6] is a duplicate of scaleNote[5] and scaleNote[5] is not a duplicate of scaleNote[4], then the position before scaleNote[0] is scaleNote[5]. If scaleThird is higher than noteNumber, it is lowered by one octave (=scaleThird−12) before it is returned. The service 'GetBlockNote(nthNote, noteNumber)' returns the nthNote chord note in the combined scale that is less (lower) than noteNumber. If there is no chord note less than noteNumber, 0 is returned.

The services 'isNoteInScale(noteNumber)' and 'isNoteInCombinedScale(noteNumber)' will scan the scale Note[] and combinedScaleNote[] arrays respectively for noteNumber. If noteNumber is found it will return True (1). If it is not found, it will return False (0).

A configuration object 3-5 collaborates with the scale object 3-9 by calling the SetScaleTo service each time a new chord/scale is required This object 3-9 collaborates with a current chord object 3-7 to determine the notes in the current chord (CopyNotes service). The PianoKey objects 3-6 collaborate with this object by calling the appropriate GetNote service (normal, remaining scale, or remaining non-scale) to get the note(s) to be sounded. If an indication system is used, the user interface object 3-2 calls the appropriate indication service ('Get . . . NoteIndication()') and outputs the results to the alphanumeric display, LED display, or computer monitor.

The present invention has eighteen different scale types (index 0–17), as shown in Table 6a. Additional scale types can be added simply by extending Tables 6a and 6b.

The present invention may also derive one or a combination of 2nds, 4ths, 5ths, 6ths, etc. and raise or lower these derived notes by one or more octaves to produce scalic harmonies.

TABLE 5

| Scale Object Attributes and Services |
|---|
| Attributes: |
| 1. scaleType |
| 2. rootNote |
| 3. scaleNote[7] |
| 4. remainScaleNote[7] |
| 5. remainNonScaleNote[7] |
| 6. combinedScaleNote[11] |

| Services: |
|---|
| 1. SetScaleTo(scaleType, rootNote); |
| 2. GetScaleType(); scaleType |
| 3. GetScaleNote(noteNumber); scaleNote[noteNumber] |
| 4. GetRemainScaleNote(noteNumber); remainScaleNote[noteNumber] |
| 5. GetRemainNonScaleNote(noteNumber); remainNonScaleNote[noteNumber] |
| 6. GetScaleThirdBelow(noteNumber); scaleThird |
| 7. GetBlockNote(nthNote,noteNumber); combinedScaleNote[derivedValue] |
| 8. GetScaleLabel(); textLabel |
| 9. GetScaleNoteIndication(noteNumber); indication |
| 10. GetCombinedScaleNoteIndication(noteNumber); indication |
| 11. isNoteInScale(noteNumber); True/False |
| 12. isNoteInCombinedScale(noteNumber); True/False |

TABLE 6a

Normal Scale Note Generation

| Index | Scale type and label | 2nd note offset | 3rd note offset | 4th note offset | 5th note offset | 6th note offset | 7th note offset |
|---|---|---|---|---|---|---|---|
| 0 | minor | 2 | 3 | 5 | 7 | 8 | 10 |
| 1 | MAJOR | 2 | 4 | 5 | 7 | 9 | 11 |
| 2 | MAJ. PENT. | 2 | 4 | 7 | 9 | 9 | 9 |
| 3 | min. pent | 3 | 5 | 7 | 10 | 10 | 10 |
| 4 | LYDIAN | 2 | 4 | 6 | 7 | 9 | 11 |
| 5 | DORIAN | 2 | 3 | 5 | 7 | 9 | 10 |
| 6 | AEOLIAN | 2 | 3 | 5 | 7 | 8 | 10 |
| 7 | MIXOLYDIAN | 2 | 4 | 5 | 7 | 9 | 10 |
| 8 | MAJ. PENT + 4 | 2 | 4 | 5 | 7 | 9 | 9 |
| 9 | LOCRIAN | 1 | 3 | 5 | 6 | 8 | 10 |
| 10 | mel.minor | 2 | 3 | 5 | 7 | 9 | 11 |
| 11 | WHOLE TONE | 2 | 4 | 6 | 8 | 10 | 10 |
| 12 | DIM.WHOLE | 1 | 3 | 4 | 6 | 8 | 10 |
| 13 | HALF/WHOLE | 1 | 3 | 4 | 7 | 9 | 10 |
| 14 | WHOLE/HALF | 2 | 3 | 5 | 8 | 9 | 11 |
| 15 | BLUES | 3 | 5 | 6 | 7 | 10 | 10 |
| 16 | harm.minor. | 2 | 3 | 5 | 7 | 8 | 11 |
| 17 | PHRYGIAN | 1 | 3 | 5 | 7 | 8 | 10 |

TABLE 6b

Non-Scale Note Generation

| Index | Scale type and label | 1st note offset | 2nd note offset | 3rd note offset | 4th note offset | 5th note offset | 6th note offset | 7th note offset |
|---|---|---|---|---|---|---|---|---|
| 0 | minor | 1 | 4 | 6 | 9 | 11 | 11 | 11 |
| 1 | MAJOR | 1 | 3 | 6 | 8 | 10 | 10 | 10 |
| 2 | MAJ. PENT. | 1 | 3 | 5 | 6 | 8 | 10 | 11 |
| 3 | min. pent. | 1 | 2 | 4 | 6 | 8 | 9 | 11 |
| 4 | LYDIAN | 1 | 3 | 5 | 8 | 10 | 10 | 10 |
| 5 | DORIAN | 1 | 4 | 6 | 8 | 11 | 11 | 11 |
| 6 | AEOLIAN | 1 | 4 | 6 | 9 | 11 | 11 | 11 |

TABLE 6b-continued

Non-Scale Note Generation

| Index | Scale type and label | 1st note offset | 2nd note offset | 3rd note offset | 4th note offset | 5th note offset | 6th note offset | 7th note offset |
|---|---|---|---|---|---|---|---|---|
| 7 | MIXOLYDI-AN | 1 | 3 | 6 | 8 | 11 | 11 | 11 |
| 8 | MAJ. PENT + 4 | 1 | 3 | 6 | 8 | 10 | 11 | 11 |
| 9 | LOCRIAN | 2 | 4 | 7 | 9 | 11 | 11 | 11 |
| 10 | mel. minor | 1 | 4 | 6 | 8 | 10 | 10 | 10 |

TABLE 6b-continued

Non-Scale Note Generation

| Index | Scale type and label | 1st note offset | 2nd note offset | 3rd note offset | 4th note offset | 5th note offset | 6th note offset | 7th note offset |
|---|---|---|---|---|---|---|---|---|
| 11 | WHOLE TONE | 1 | 3 | 5 | 7 | 9 | 11 | 11 |
| 12 | DIM. WHOLE | 2 | 5 | 7 | 9 | 11 | 11 | 11 |
| 13 | HALF/ WHOLE | 2 | 5 | 6 | 8 | 11 | 11 | 11 |
| 14 | WHOLE/ HALF | 1 | 4 | 6 | 7 | 10 | 10 | 10 |
| 15 | BLUES | 1 | 2 | 4 | 8 | 9 | 11 | 11 |
| 16 | harm. minor | 1 | 4 | 6 | 9 | 10 | 10 | 10 |
| 17 | PHRYGIAN | 2 | 4 | 6 | 9 | 11 | 11 | 11 |

For services 2, 3, and 4 of Table 8, note[], the destination for the chord, is passed as a parameter to the service by the caller.

Figure 7A:
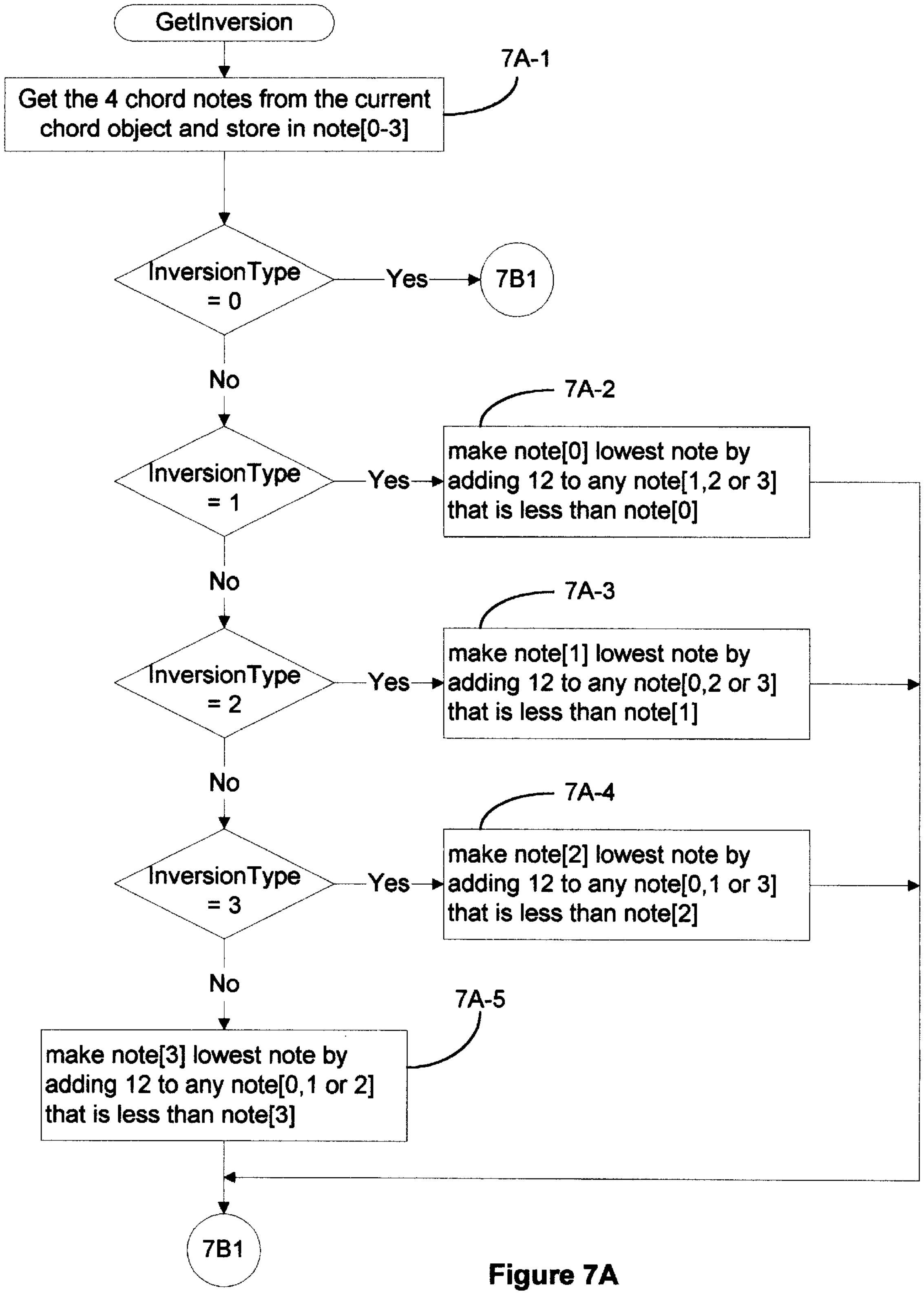
FIGS. 7A, 7B, 7C and 7D together are a logic flow diagram of chord inversion objects.
Figure 7B:
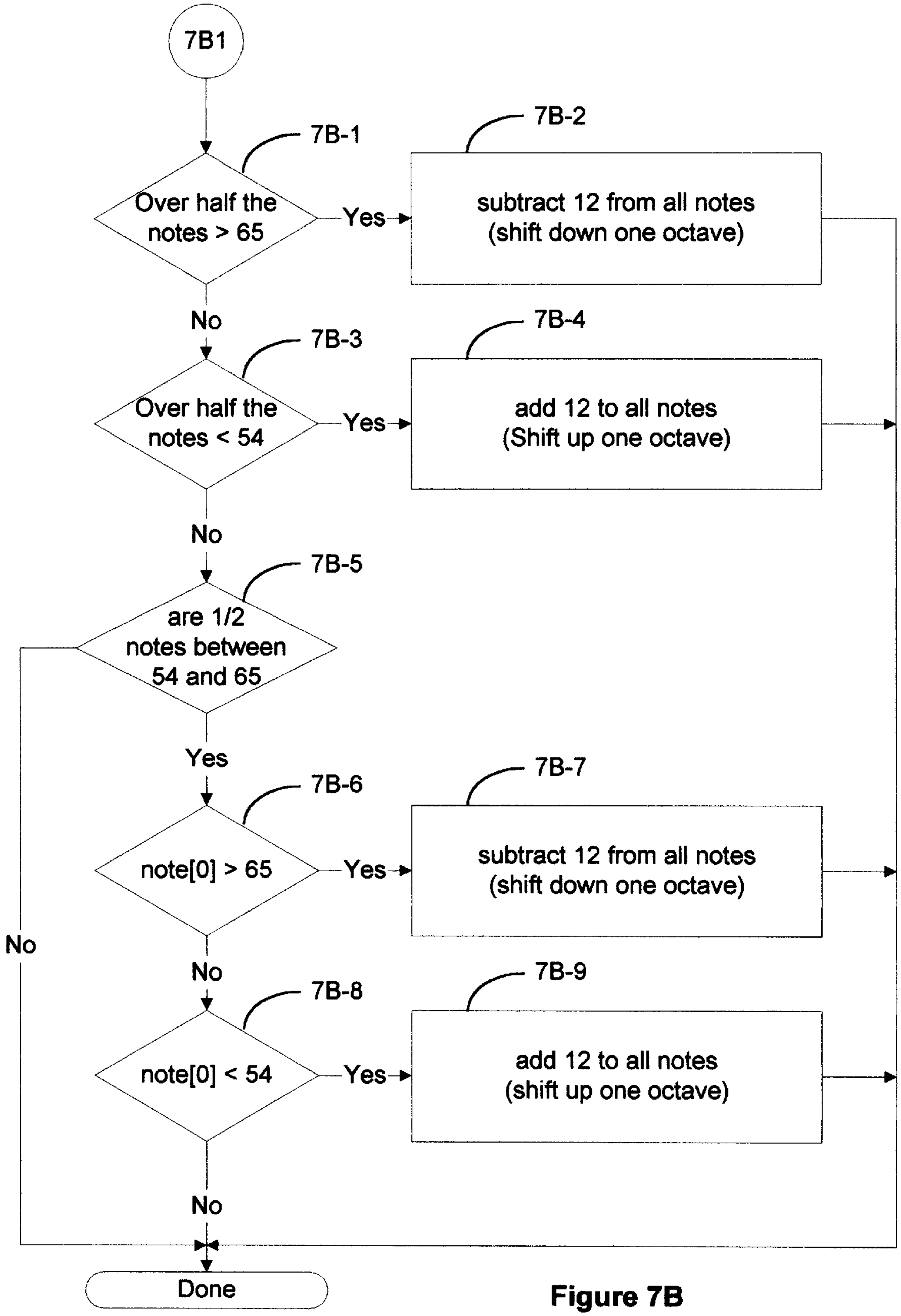

FIGS. 7A, and 7B show a flow diagram for the GetInversion() service. The GetInversion() service first (7A-1) gets all four notes of the current chord from the current chord object (3-7) and stores these in the destination (note[0] through note [3]). At this point, the chord is in inversion 0 where it is known that the fundamental of the chord is in note [0], the alternate is in note [1], the C1 note is in note [2] and C2 is in note [3] and that all of these notes are within one octave (referred to as 'popular voicing)'. If inversionType is 1, then 7A-2 of FIG. 7A will set the fundamental to be the lowest note of the chord. This is done by adding one octave (12) to every other note of the chord that is lower than the fundamental (note[0]). If inversionType is 2, then 7A-3 of FIG. 7A will set the alternate to be the lowest note of the chord. This is done by adding one octave (12) to every other note of the chord that is lower than the alternate (note[1]). If inversionType is 3, then 7A-4 of FIG. 7A will set the C1 note to be the lowest note of the chord. This is done by adding one octave (12) to every other note of the chord that is lower than the C1 note (note[2]). If inversionType is none of the above (then it must be 4) then 7A-5 of FIG. 7A will set the C2 note to be the lowest note of the chord. This is done by adding one octave (12) to every other note of the chord that is lower than the C2 note (note[3]). After the inversion is set then processing continues with FIG. 7B. 7B1 of FIG. 7B checks if over half of the different notes of the chord have a value that is greater than 65. If so, then 7B-2 drops the entire chord one octave by subtracting 12 from every note. If not, 7B-3 checks if over half of the different notes of the chord are less than 54. If so, then 7B-4 raises the entire chord by one octave by adding 12 to every note. If more than half the notes are not outside the range 54–65, then 7B-5 checks to see if exactly half the notes are outside this range. If so, then 7B-6 checks if the fundamental note (note[0]) is greater than 65. If it is, then 7B-7 lowers the entire chord by one octave by subtracting 12 from every note. If the chord fundamental is not greater than 65, then 7B-8 checks to see if it (note[0]) is less than 54. If it is, then 7B-9 raises the entire chord one octave by adding 12 to every note. If preferred, inversions can also be shifted so as to always keep the fundamental note in the 54–65 range.

Figure 7C:
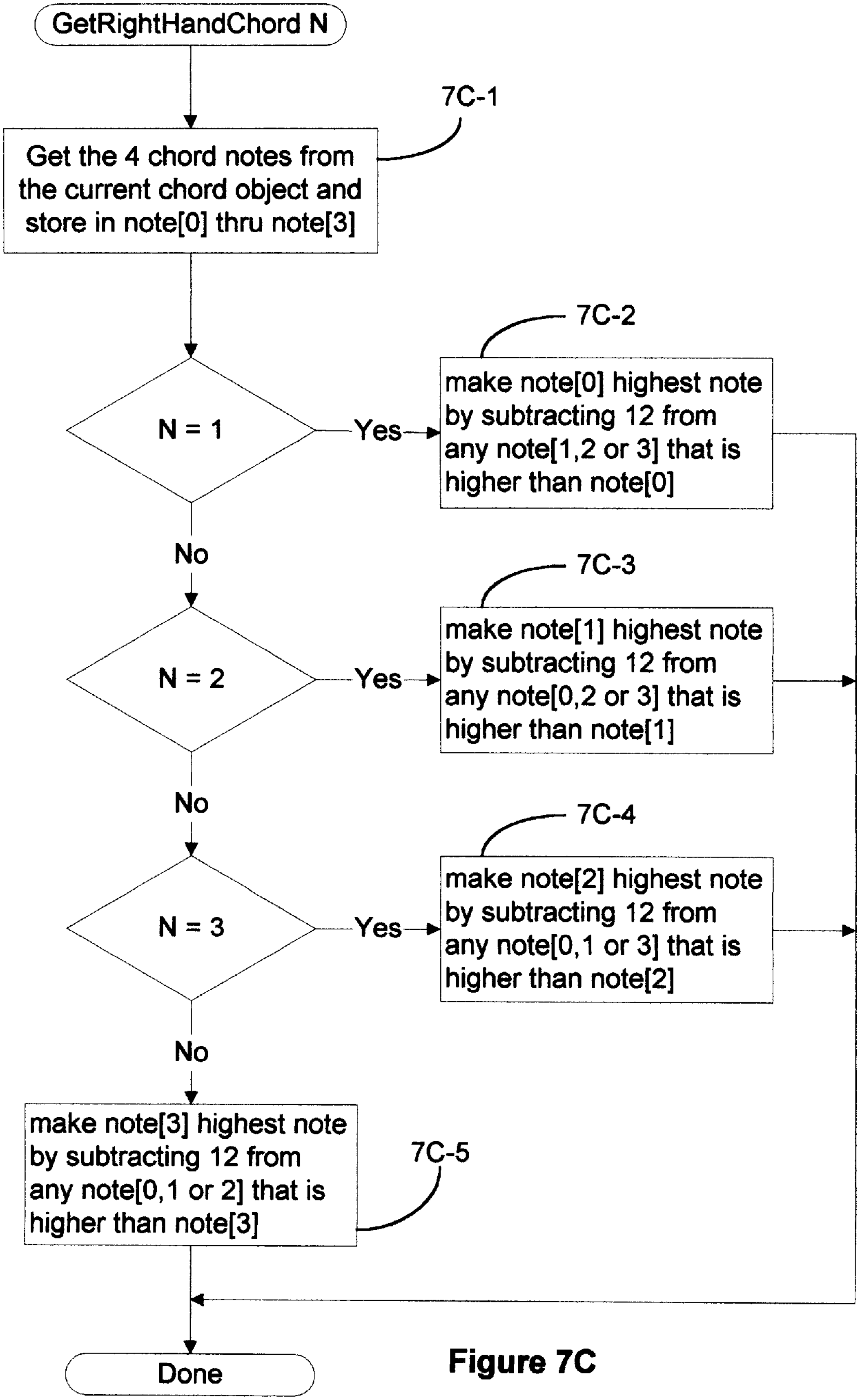

FIG. 7C shows a flow diagram for the service GetRight-Hand Chord(). The right hand chord to get is passed as a parameter (N in FIG. 7C). 7C-1 first gets the current chord from the current chord object. If the right hand chord desired is 1 (N=1), meaning that the fundamental should be the highest note, then 7C-2 subtracts 12 (one octave) from any

TABLE 7

Example Scale Note Generation
Example: Set current scale to type 2 (Major Pentatonic) with root note 60 (C)

| After (see FIG. 6) | Scale Type | note[0] (root) | note[1] | note[2] | note[3] | note[4] | note[5] | note[6] |
|---|---|---|---|---|---|---|---|---|
| 6-1 | 2 | — | — | — | — | — | — | — |
| 6-2 | 2 | 60(C) | — | — | — | — | — | — |
| 6-3 (Z = 1) | 2 | 60(C) | 62(D) | — | — | — | — | — |
| 6-3 (Z = 2) | 2 | 60(C) | 62(D) | 64(E) | — | — | — | — |
| 6-3 (Z = 3) | 2 | 60(C) | 62(D) | 64(E) | 55(G) | — | — | — |
| 6-3 (Z = 4) | 2 | 60(C) | 62(D) | 64(E) | 55(G) | 57(A) | — | — |
| 6-3 (Z = 5) | 2 | 60(C) | 62(D) | 64(E) | 55(G) | 57(A) | 57(A) | — |
| 6-3 (Z = 6) | 2 | 60(C) | 62(D) | 64(E) | 55(G) | 57(A) | 57(A) | 57(A) |
| 6-4 | 2 | 60(C) | 62(D) | 64(E) | 55(G) | 57(A) | 64(E) | 64(E) |
| 6-5 | 2 | 55(G) | 57(A) | 60(C) | 62(D) | 64(E) | 64(E) | 64(E) |

FIGS. 7*a*, 7*b* and 7*c* and Table 8

The present invention further includes three or more Chord Inversion objects 3-10. InversionA is for use by the Chord Progression type of PianoKey objects 3-6. InversionB is for the black melody type piano keys that play single notes 3-6 and inversionC is for the black melody type piano key that plays the whole chord 3-6. These objects simultaneously provide different inversions of the current chord object 3-7. These objects have the "intelligence" to invert chords. Table 8 shows the services and attributes that these objects provide. The single attribute inversionType, holds the inversion to perform and may be 0, 1, 2, 3, or 4.

TABLE 8

| Chord Inversion Object Attributes and Services |
|---|
| Attributes: |
| 1. inversionType |
| Services: |
| 1. SetInversion(newInversionType); |
| 2. GetInversion(note[]); |
| 3. GetRightHandChord(note[], Number); |
| 4. GetRightHandChordWithHighNote(note[],HighNote); |
| 5. GetFundamental(); Fundamental |
| 6. GetAlternate(); Alternate |
| 7. GetC1();C1 |
| 8. GetC2(); C2 |

The SetInversion() service sets the attribute inversionType. It is usually called by the user interface 3-2 in response to keyboard input by a user or by a user pressing a foot switch that changes the current inversion.

other note that is higher than the fundamental (note[0]). If the right hand chord desired is 2, meaning that the alternate should be the highest note, then 7C-3 subtracts 12 (one octave) from any other note that is higher than the alternate (note[1]). If the right hand chord desired is 3, meaning that the C1 note should be the highest note, then 7C-4 subtracts 12 (one octave) from any other note that is higher than the C1 note (note[2]). If the right hand chord desired is not 1, 2 or 3, then it is assumed to be 4, meaning that the C2 note should be the highest note and then 7C-5 subtracts 12 (one octave) from any other note that is higher than the C2 note (note[3]).

Figure 7D:
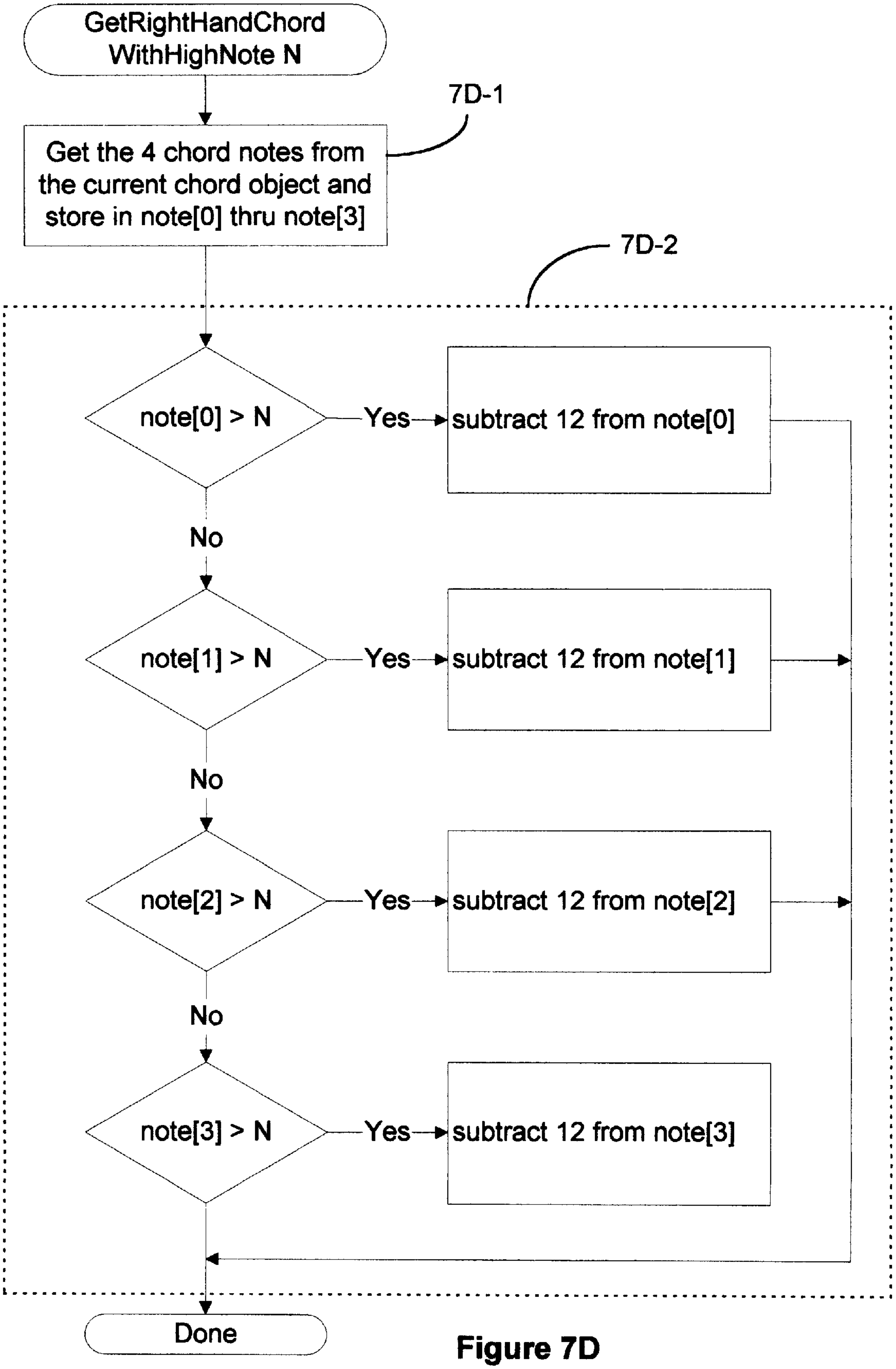

FIG. 7D shows a flow diagram for the service GetRightHandChordWithHighNote(). This service is called by the white melody keys when the scale note they are to play is a chord note the mode calls for a right hand chord. It is desirable to play the scale note as the highest note, regardless of whether it is the fundamental, alternate, etc. This service returns the right hand chord with the specified note as the highest. First, the 4 notes of the chord are fetched from the current chord object (7D-1). The flow diagram of FIG. 7D indicated by 7D-2 checks each note of the chord and lowers it one octave (by subtracting 12) if it is higher than the specified note. This will result in a chord that is the current chord with the desired note as the highest.

Services 5, 6, 7 and 8 of table 8 each return a single note as specified by the service name (fundamental, alternate, etc.). These services first perform the same sequence as in FIG. 7A (7A-1 through 7A-5). This puts the current chord in the inversion specified by the attribute inversionType. These services then return a single note and they differ only in the note they return. GetFundamental() returns the fundamental (note [0]). GetAlternate() returns the alternate (note [1]). Get C1() returns the C1 note (note[2]) and GetC2 returns the C2 note (note [3]).

Table 10

A Main Configuration Memory 3-5 contains one or more sets or banks of chord assignments and scale assignments for each chord progression key. It responds to messages from the user interface 3-2 telling it to assign a chord or scale to a particular key. The Memory 3-5 responds to messages from the piano key objects 3-6 requesting the current chord or scale assignment for a particular key, or to switch to a different assignment set or bank. The response to these messages may result in the configuration memory 3-5 sending messages to other objects, thereby changing the present configuration. The configuration object provides memory storage of settings that may be saved and recalled from a named disk file. These setup configurations may also be stored in memory, such as for providing factory setups, or for allowing real-time switching from a user-selectable input or user interface. They may also be stored on an internal or external storage device such as a CD, etc. The number of storage banks or settings is arbitrary. A user may have several different configurations saved. It is provided as a convenience to a user. The present invention preferably uses the following configuration:

There are two song keys stored in songKey[2]. There are two chord banks, one for each song key called chordTypeBank 1 [60] and chordTypeBank2[60]. These may be expanded to include more of each if preferred. Each chord bank hold sixty chords, one for each chord progression key. There are two scale banks, one for each song key, called scaleBank1 [60][2] and scaleBank2[60][2]. Each scale bank holds 2 scales (root and type) for each of the sixty chord progression keys. The currentChordFundamental attribute holds the current chord fundamental. The attribute currentChordKeyNum holds the number of the current chord progression key and selects one of sixty chords in the selected chord bank or scales in the selected scale bank. The attribute songKeyBank identifies which one of the two song keys is selected (songKey[songKeyBank]), which chord bank is selected (chordTypeBank1 [60] or chordTypeBank2 [60]) and which scale bank is selected (scaleBank1[60][2] or scaleBank2[60][2]). The attribute scaleBank[60] identifies which one of the two scales is selected in the selected scale bank (scaleBank1or2[currentChordKeyNum] [scaleBank [currentChordKey Num]]).

The following discussion assumes that songKeyBank is set to 0. The service ‘SetSongKeyBank(newSongKeyBank)’ sets the current song key bank (songKeyBank=newSongKeyBank). ‘SetScaleBank(newScaleBank)’ service sets the scale bank for the current chord (scaleBank [currentChordKeyNum]=newScaleBank). ‘AssignSongKey(newSongKey)’ service sets the current song key (songKey[songKeyBank]=newSongKey).

The service ‘AssignChord(newChordType, keyNum)’ assigns a new chord (chordTypeBank1[keyNum1=newChordType). The service ‘AssignScale(newScaleType, newScaleRoot, keyNum)’ assigns a new scale (scaleBank1 [keyNum][scaleBank[currentChordKeyNum]]=newScaleType and newScaleRoot).

The service SetCurrentChord(keyNum, chordFundamental)

1. sets currentChordFundamental=chordFundamental;
2. sets currentChordKeyNum=keyNum; and
3. sets the current chord to chordbank1 [currentChordKeyNum] and fundamental currentChordFundamental The service SetCurrentScale(keyNum) sets the current scale to the type and root stored at scaleBank1 [currentChordKeyNum] [scaleBank [currentChordKeyNum]].

The service ‘Save(destinationFileName)’ saves the configuration (all attributes) to a disk file. The service ‘Recall (sourceFileName)’ reads all attributes from a disk file.

The chord progression key objects 3-6 (described later) use the SetCurrentChord() and SetCurrentScale() services to set the current chord and scale as the keys are pressed. The control key objects use the SetSongKeyBank() and SetScaleBank() services to switch key and scale banks respectively as a user plays. The user interface 3-2 uses the other services to change (assign), save and recall the configuration. The present invention also contemplates assigning a song key to each key by extending the size of songKey[2] to sixty (songKey[60]) and modifying the SetCurrentChord() service to set the song key every time it is called. This allows chord progression keys on one octave to play in one song key and the chord progression keys in another octave to play in another song key. The song keys which correspond to the various octaves or sets of inputs can be selected or set by a user either one at a time, or simultaneously in groups.

TABLE 10

| Configuration Objects Attributes and Services |
|---|
| Attributes: |
| 1. songKeyBank |
| 2. scaleBank[60] |
| 3. currentChordKeyNum |
| 4. currentChordFundamental |

TABLE 10-continued

| Configuration Objects Attributes and Services |
|---|
| Attributes: |
| 5. songKey[2] |
| 6. chordTypeBank1[60] |
| 7. chordTypeBank2[60] |
| 8. scaleBank1[60][2] |
| 9. scaleBank2[60][2] |
| Services: |
| 1. SetSongKeyBank(newSongKeyBank); |
| 2. SetScaleBank(newScaleBank); |
| 3. AssignSongKey(newSongKey); |
| 4. AssignChord(newChordType, keyNum); |
| 5. AssignScale(newScaleType, newScaleRoot, keyNum); |
| 6. SetCurrentChord(keyNum, chordFundamental); |
| 7. SetCurrentScale(keyNum); |
| 8. Save(destinationFileName); |
| 9. Recall(sourceFileName); |

Figure 8:
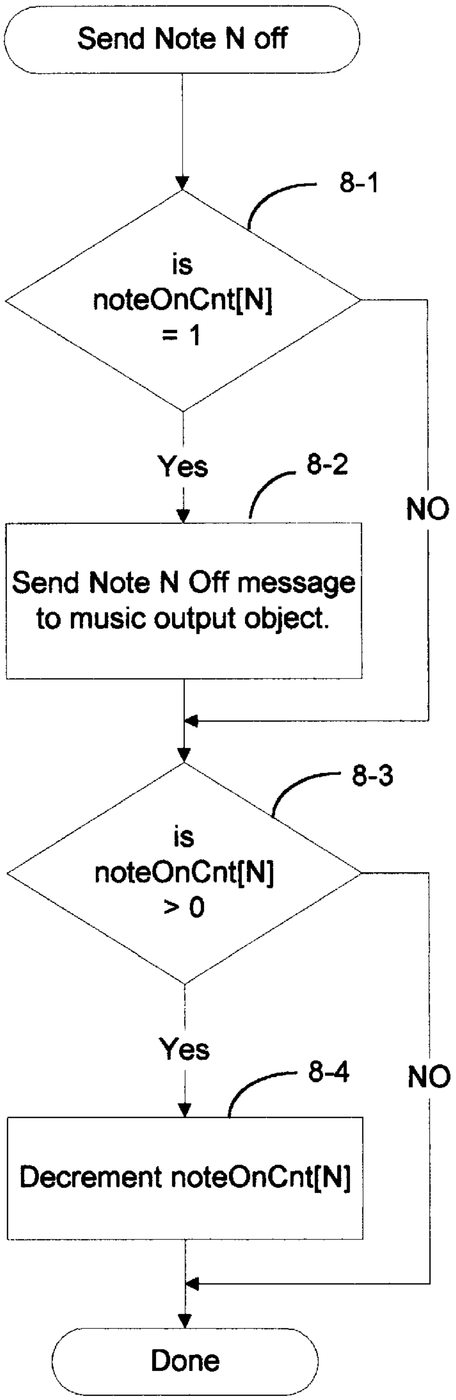
FIG. 8 is a logic flow diagram of channel output objects ‘Send note off’ service.

FIGS. 8 and 9 and Table 11

Each Output Channel object 3-11 (FIG. 3) keeps track of which notes are on or off for an output channel and resolves turning notes on or off when more than one key may be setting the same note(s) on or off. Table 11 shows the Output Channel objects attributes and services. The attributes include (1) the channel number and (2) a count of the number of times each note has been sent on. At start up, all notes are assumed to be off. Service (1) sets the output channel number. This is usually done just once as part of the initialization. In the description that follows, n refers to the note number to be sent on or off.

Figure 9A:
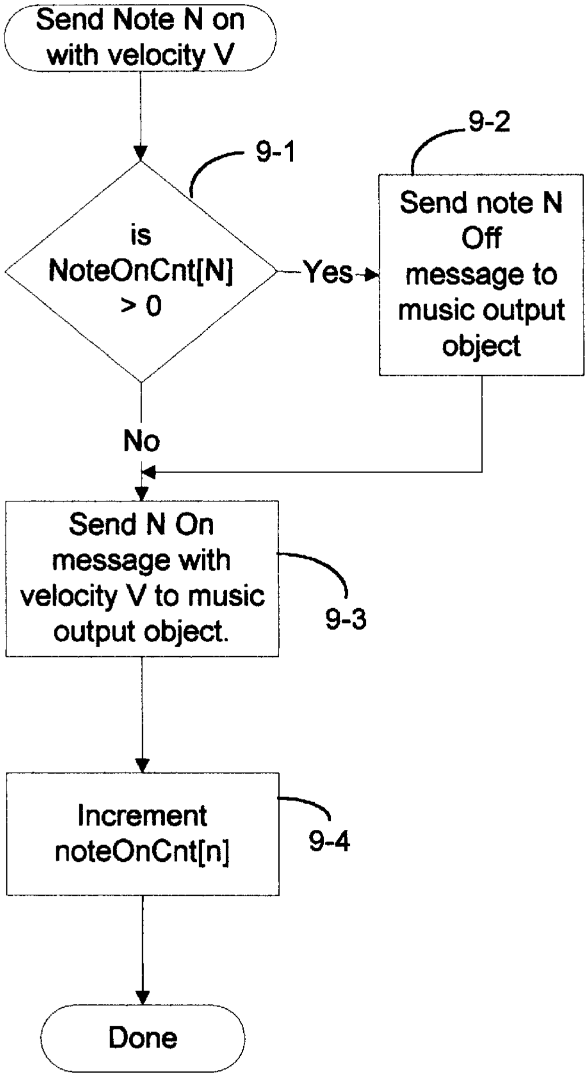
FIG. 9A is a logic flow diagram of channel output objects ‘Send note on’ service.

FIG. 9*a* shows a flow diagram for service 2, which sends a note on message to the music output object 3-12. The note to be sent (turned on) is first checked if it is already on in step 9-1, indicated by noteOnCnt[n]>0. If on, then the note will first be sent (turned) off in step 9-2 followed immediately by sending it on in step 9-3. The last action increments the count of the number of times the note has been sent on in step 9-4.

Figure 9B:
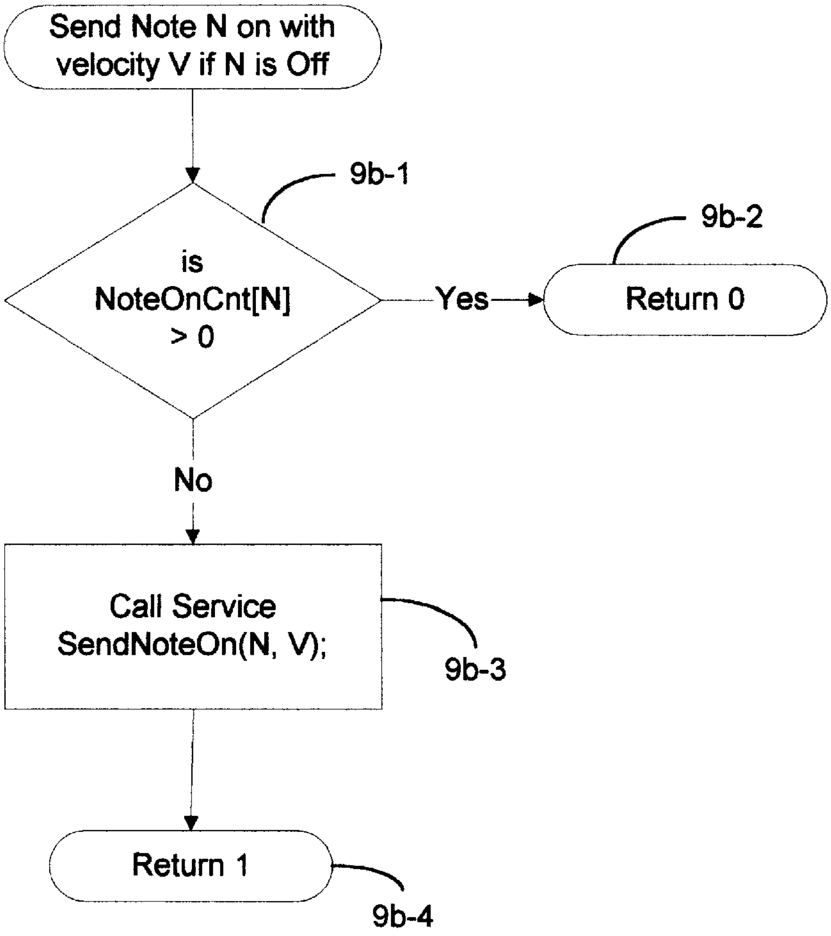
FIG. 9 is a logic flow diagram of channel output objects ‘Send note on if off’ service.

FIG. 9*b* shows a flow diagram for service 3 which sends a note on message only if that note is off. This service is provided for the situation where keys want to send a note on if it is off but do not want to re-send the note if already on. This service first checks if the note is on in step 9b-1 and if it is, returns 0 in step 9b-2 indicating the note was not sent. If the note is not on, then the Send note on service is called in step 9b-3 and a 1 is returned by step 9b-4, indicating that the note was sent on and that the calling object must therefore eventually call the Send Note Off service.

FIG. 8 shows the flow diagram for the sendNoteOff service. This service first checks if the noteOnCnt[n] is equal to one in step 8-1. If it is, then the only remaining object to send the note on is the one sending it off, then a note off message is sent by step 8-2 to the music output object 3-12. Next, if the noteOnCnt[n] is greater than 0, it is decremented.

All objects which call the SendNoteOn service are required (by contract so to speak) to eventually call the SendNoteOff service. Thus, if two or more objects call the SendNoteOn service for the same note before any of them call the SendNoteOff service for that note, then the note will be sent on (sounded) or re-sent on (re-sounded) every time the SendNoteOn service is called, but will not be sent off until the SendNoteOff service is called by the last remaining object that called the SendNoteOn service.

The remaining service in Table 11 is SendProgramChange. The present invention sends notes on/off and program changes, etc., using the MIDI interface. The nature of the message content preferably conforms to the MIDI specification, although other interfaces may just as easily be employed. The Output Channel object 3-11 isolates the rest of the software from the 'message content' of turning notes on or off, or other control messages such as program change. The Output Channel object 3-11 takes care of converting the high level functionality of playing (sending) notes, etc. to the lower level bytes required to achieve the desired result.

TABLE 11

| Output Channel Objects Attributes and Services |
|---|
| Attributes: |
| 1. channelNumber |
| 2. noteOnCnt[128] |
| Services: |
| 1. SetChannelNumber(channelNumber); |
| 2. SendNoteOn(noteNumber, velocity); |
| 3. SendNoteOnIfOff(noteNumber, velocity); noteSentFlag |
| 4. SendNoteOff(noteNumber); |
| 5. SendProgramChange(PgmChangeNum); |

Figure 10A:
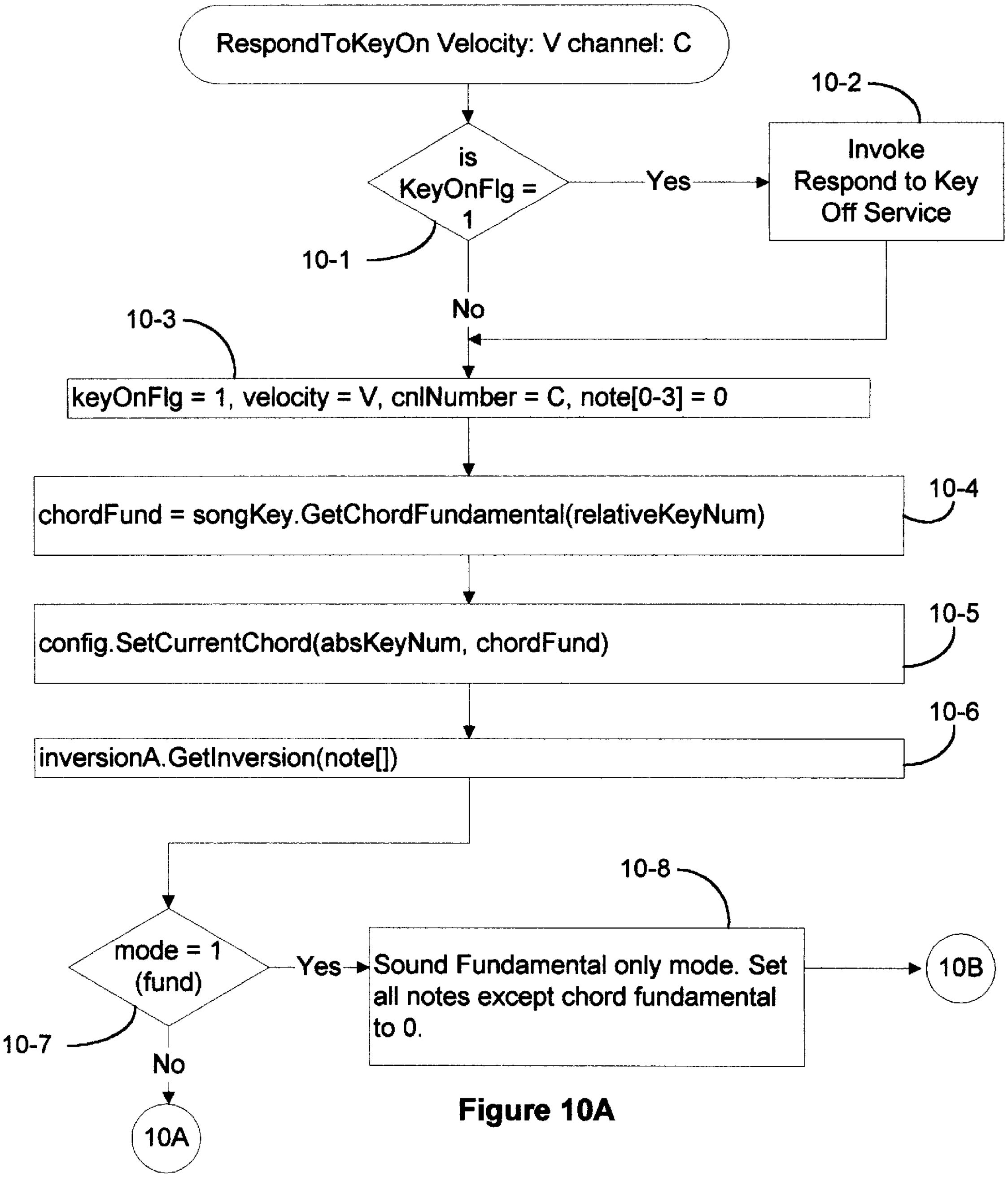
FIG. 10 is a logic flow diagram of PianoKey::Chord Progression Key objects ‘Respond to key on’ service.
Figure 10B:
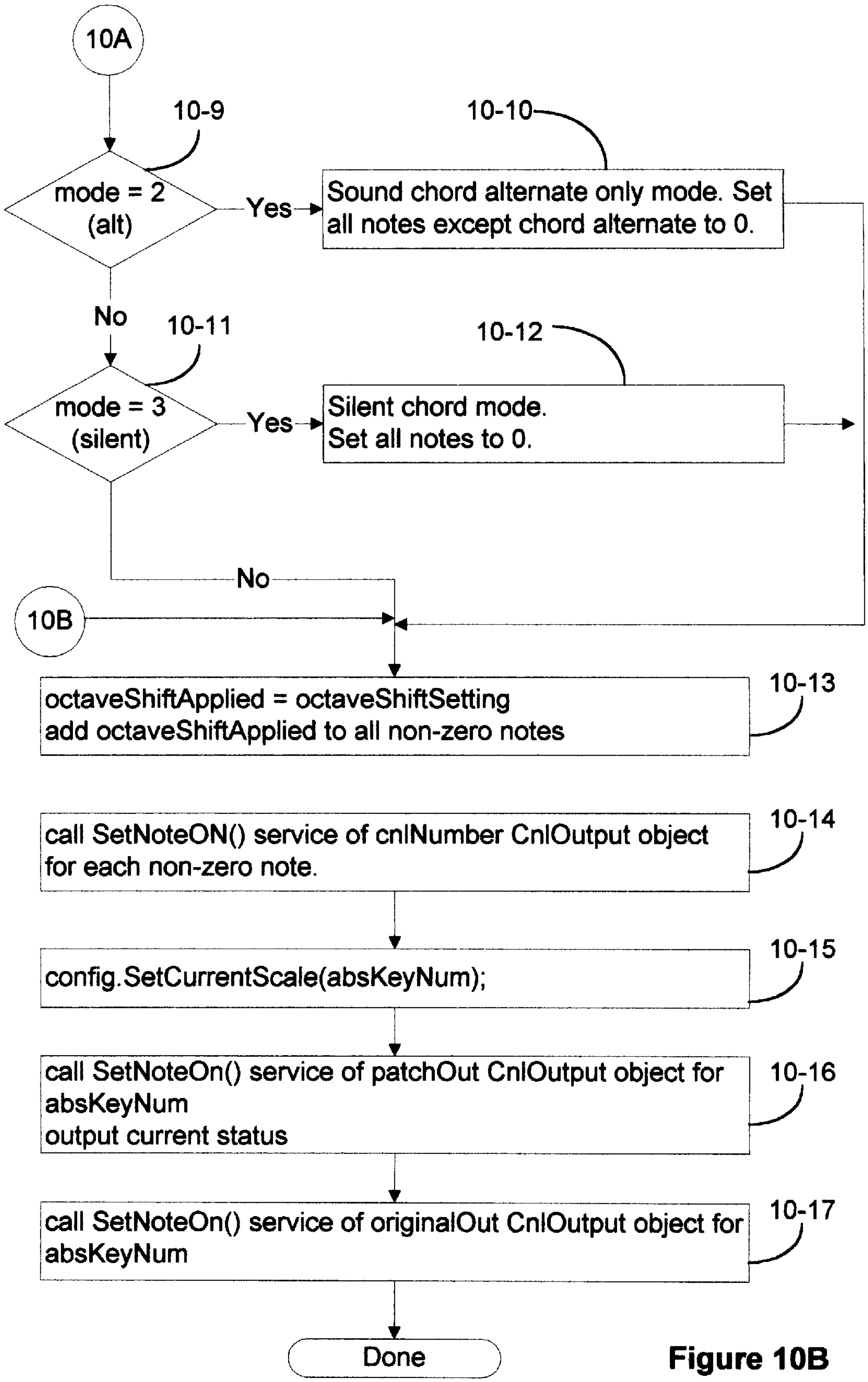
Figure 11:
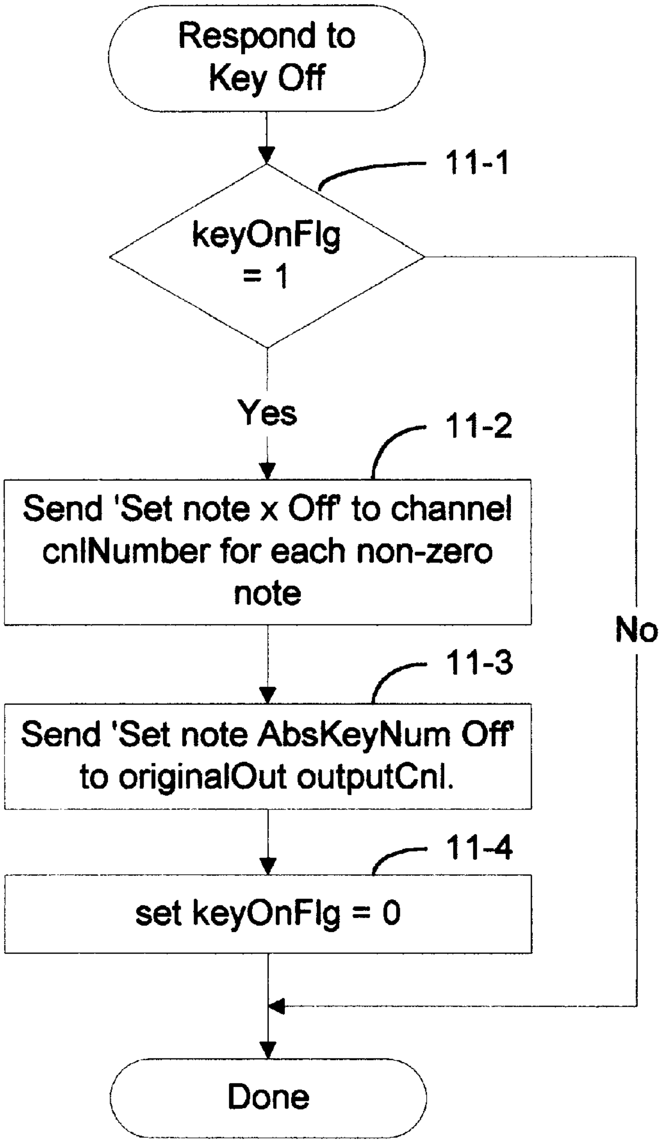
FIG. 11 is a logic flow diagram of PianoKey::Chord Progression Key objects ‘Respond to key off’ service.

FIGS. 10*a*, 10*b* and 11 and Table 12

There are four kinds of PianoKey objects 3-6: (1) ChordProgressionKey, (2) WhiteMelodyKey, (3) BlackMelodyKey, and (4) ControlKey. These objects are responsible for responding to and handling the playing of musical (piano) key inputs. These types specialize in handling the main types of key inputs which include the chord progression keys, the white melody keys, and control keys (certain black chord progression keys). There are two sets of 128 PianoKey objects for each input channel. One set, referred to as chordkeys is for those keys designated (by user preference) as chord progression keys and the other set, referred to as melodyKeys are for those keys not designated as chord keys. The melodyKeys with relative key numbers (FIG. 2) of 0, 2, 4, 5, 7, 9 and 11 will always be the WhiteMelodyKey type while melodyKeys with relative key numbers of 1, 3, 6, 8 and 10 will always be the BlackMelodyKey type.

The first three types of keys usually result in one or more notes being played and sent out to one or more output channels. The control keys are special keys that usually result in configuration or mode changes as will be described later. The PianoKey objects receive piano key inputs from the music administrator object 3-3 and configuration input from the user interface object 3-2. They collaborate with the song key object 3-8, the current chord object 3-7, the current scale object 3-9, the chord inversion objects 3-10 and the configuration object 3-5, in preparing their response, which is sent to one or more of the many instances of the CnlOutput objects 3-11.

The output of the ControlKey objects may be sent to many other objects, setting their configuration or mode.

The ChordProgressionKey type of PianoKey 3-6 is responsible for handling the piano key inputs that are designated as chord progression keys (the instantiation is the designation of key type, making designation easy and flexible).

Table 12 shows the ChordProgressionKeys attributes and services. The attribute mode, a class attribute that is common to all instances of the ChordProgressionKey objects, stores the present mode of operation. With minor modification, a separate attribute mode may be used to store the present mode of operation of each individual key input, allowing all of the individual notes of a chord to be played independently and simultaneously when establishing a chord progression. The mode may be normal (0), Fundamental only (1), Alternate only (2) or silent chord (3), or expanded further. The class attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. The absKeyNum is used for outputting patch triggers to patchOut instance of output object. The relativeKeyNum is used to determine the chord to play. The cnlNumber attribute stores the destination channel for the next key off response. The keyOnFlag indicates if the object has responded to a key on since the last key off. The velocity attribute holds the velocity with which the key was pressed. The chordNote[4] attributes holds the (up to) four notes of the chord last output. The attribute octaveShiftApplied is set to octaveShiftSetting when notes are turned on for use when correcting notes (this allows the octaveShiftSetting to change while a note is on).

TABLE 12

| PianoKey::ChordProgressionKey Attributes and Services |
|---|
| Class Attributes: |
| 1. mode |
| 2. correctionMode |
| 3. octaveShiftSetting |
| Instance Attributes: |
| 1. absoluteKeyNumber |
| 2. relativeKeyNumber |
| 3. cnlNumber |
| 4. keyOnFlag |
| 5. velocity |
| 6. chordNote[4] |
| 7. octaveShiftApplied |
| Services: |
| 1. RespondToKeyOn(sourceChannel, velocity); |
| 2. RespondToKeyOff(sourceChannel); |
| 3. RespondToProgramChange(sourceChannel); |
| 4. SetMode(newMode); |
| 5. CorrectKey(); |
| 6. SetCorrectionMode(newCorrectionMode); |
| 7. SetOctaveShift(numberOctaves); |

FIGS. 10*a* and 10*b* depict a flow diagram for the service 'RespondToKeyon()', which is called in response to a chord progression key being pressed. If the KeyOnFlg is 1 in step 10-1, indicating that the key is already pressed, then the service 'RespondToKeyOff()' is called by step 10-2. Then, some of the attributes are initialized in step 10-3.

Then, the chord fundamental for the relative key number is fetched from the song key object in step 104. The main configuration memory 3-5 is then requested to set the current chord object 3-7 based on the presently assigned chord for the absKeyNum attribute in step 10-5. The notes of the current chord are then fetched in step 10-6 from the chord inversion object A 3-10 (which gets the notes from the current chord object 3-7. If mode attribute=1 (10-7) then all notes of the chord except the fundamental are discarded (set to 0) in step 10-8. If the mode attribute =2 in step 10-9, then all notes of the chord except the alternate are discarded by step 10-10. If the mode attribute=3 in step 10-11, then all notes are discarded in step 10-12. The Octave shift setting (octaveShiftSetting) is stored in octaveShiftApplied and then added to each note to turn on in step 10-13. All notes that are non zero are then output to channel cnlNumber in step 10-14. The main configuration object 3-5 is then requested to set the current scale object 3-9 per current assignment for absoluteKeyNumber attribute 10-15. A patch trigger=to the absKeyNum is sent to patchOut channel in step 10-16. In addition, the current status is also sent out on patchOut channel (see table 17 for description of current status). When these patch triggers/current status are recorded and played back into the music software, it will result in the RespondToProgramChange() service being called for each patch trigger received. By sending out the current key, chord and scale for each key pressed, it will assure that the music software will be properly configured when another voice is added to the previously recorded material. The absKeyNum attribute is output to originalOut channel (10-17).

FIG. 11 shows a flow diagram for the service 'RespondToKeyOff()'. This service is called in response to a chord progression key being released. If the key has already been released in step 11-1, indicated by keyOnFlg=0, then the service does nothing. Otherwise, it sends note off messages to channel cnlNumber for each non -zero note, if any, in step 11-2. It then sends a note off message to originalOut channel for AbsKeyNum in step 11-3. Finally it sets the keyOnFlg to 0 in step 114.

The service 'RespondToProgramChange()' is called in response to a program change (patch trigger) being received. The service responds in exactly the same way as the 'RespondToKeyOn()' service except that no notes are output to any object It initializes the current chord object and the current scale object. The 'SetMode()' service sets the mode attribute. The 'setCorrectionMode()' service sets the correctionMode attribute.

The service CorrectKey() is called in response to a change in the song key, current chord or scale while the key is on (keyOnFlg=1). This enables the key to correct the notes it has sent out for the new chord or scale. There are two different correction modes (see description for correctionMode attribute above). In the normal correction mode (correctionMode=0), this service behaves exactly as RespondToKeyOn() with one exception. If a new note to be turned on is already on, it will remain on. It therefore does not execute the same identical initialization sequence (FIG. 10*a*) in this mode. It first determines the notes to play (as per RespondToKeyon() service) and then turns off only those notes that are not already on and then turns on any new notes. The solo correction mode (correctionMode=1) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service isNoteInChord() and the current scale objects services isNoteInScale and isNoteInCombinedScale() are used to determine if each note already on should be left on or turned off. The output channel for the original key is determined as for the white melody key as described below).

FIGS. 12*a* through 12*k* and Table 13

The WhiteMelodyKey object is responsible for handling all white melody key events. This involves, depending on mode, getting notes from the current scale object and/or chord inversion object and sending these notes out.

The class attributes for this object include mode, which may be set to one of Normal=0, RightHandChords=1, Scale3rds=2, RHCand3rds=3, RemainScale=4 or RemainNonScale=5. The class attributes numBlkNotes hold the number of block notes to play if mode is set to 4 or 5. The attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. Instance variables include absoluteKeyNumber and colorKeyNumber and octave (see FIG. 2). The attribute cnlNumber holds the output channel number the notes were sent out to. keyOnFlag indicates whether the Key is pressed or not. Velocity holds the velocity of the received 'Note On' and note[4] holds the notes that were sounded (if any). The attribute octaveShiftApplied is set per octaveShiftSetting and octave attributes when notes are turned on for use when correcting notes.

TABLE 13

| PianoKey::WhiteMelodyKey Attributes and Services |
| --- |
| Class Attributes: |
| 1. mode |
| 2. numBlkNotes |
| 3. CorrectionMode |
| 4. octaveShiftSetting |
| Instance Attributes: |
| 1. absoluteKeyNumber |
| 2. colorKeyNumber |
| 3. octave |
| 4. cnlNumber |
| 5. keyOnFlag |
| 6. velocity |
| 7. note[4] |
| 8. octaveShiftApplied |
| Services: |
| 1. ResondToKeyOn(sourceChannel, velocity); |
| 2. RespondToKeyOff(sourceChannel); |
| 3. CorrectKey(); |
| 4. SetMode(newMode); |
| 5. SetCorrectionMode(newCorrectionMode); |
| 6. SetNumBlkNotes(newNumBlkNotes); |
| 7. SetOctaveShift(numberOctaves); |

FIGS. 12*a* through 12*j* provide a flow diagram of the service 'RespondToKeyOn()'. This service is called in response to a white melody key being pressed. It is responsible for generating the note(s) to be sounded. It is entered with the velocity of the key press and the channel the key was received on.

The RespondToKeyOn() service starts by initializing itself in step 12a-1. This initialization will be described in more detail below. It then branches to a specific sequence that is dependent on the mode, as shown in flow diagram 12a-2. These specific sequences actually generate the notes and will be described in more detail below. It finishes by outputting the generated notes in step 12a-3.

Figure 12A:
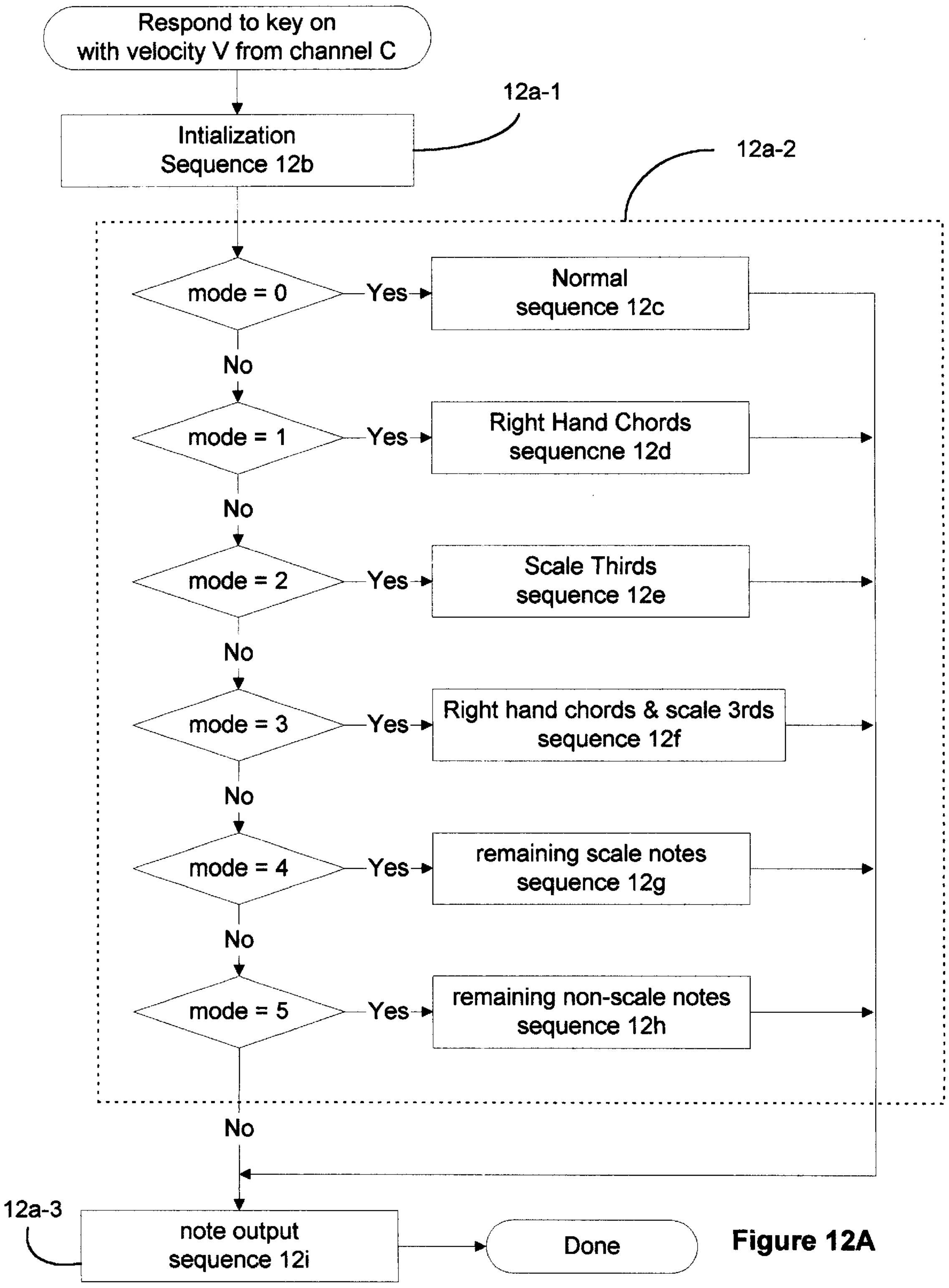
FIGS. 12A, through 12J together are a logic flow diagram of PianoKey::Melody Key objects ‘Respond to key on’ service.
Figure 12B:
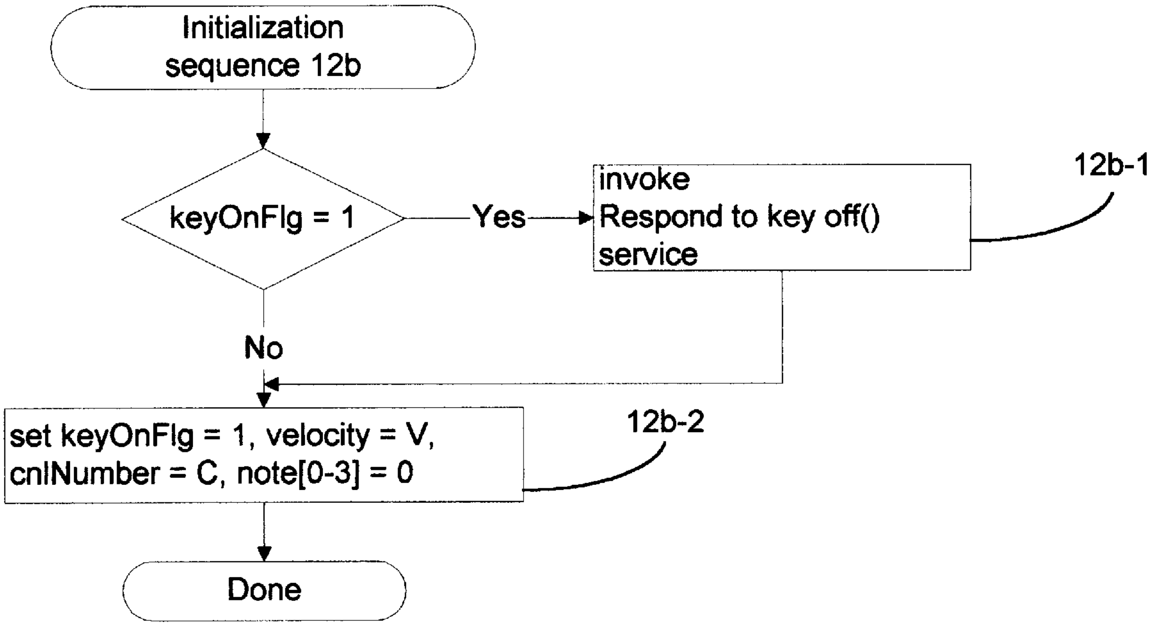
FIG. 12K is a logic flow diagram of PianoKey::Melody Key objects ‘Respond to key off’ service.

The initialization sequence, shown in FIG. 12*b,* first checks if the key is already pressed. If it is (keyOnFlg=1), the service 'RespondToKeyOff()' service will be called in step 12b-1. Then, KeyOnFlg is set to 1, indicating the key is pressed, the velocity and cnlNumber attributes are set and the notes are cleared by being set to 0 in step 12b-2.

Figure 12I:
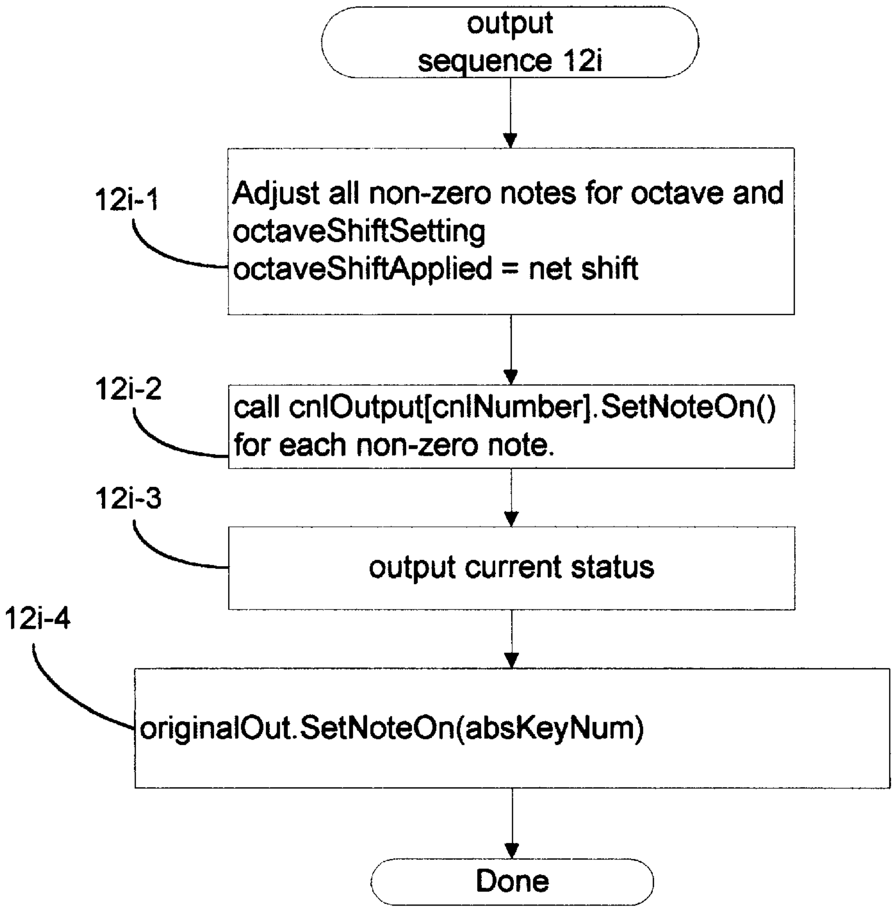
Figure 12C:
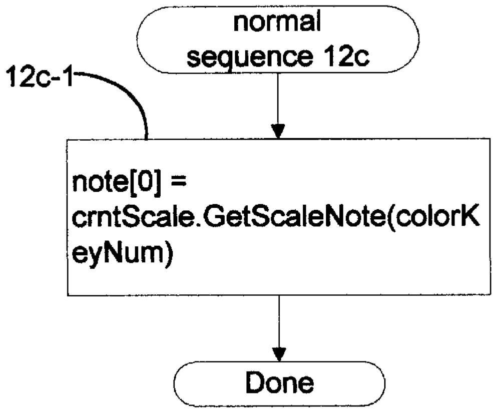

FIG. 12*c* depicts a flow diagram of the normal (mode=0) sequence. This plays a single note (note[0]) that is fetched from the current scale object based on the particular white key pressed (colorKeyNum).

Figure 12D:
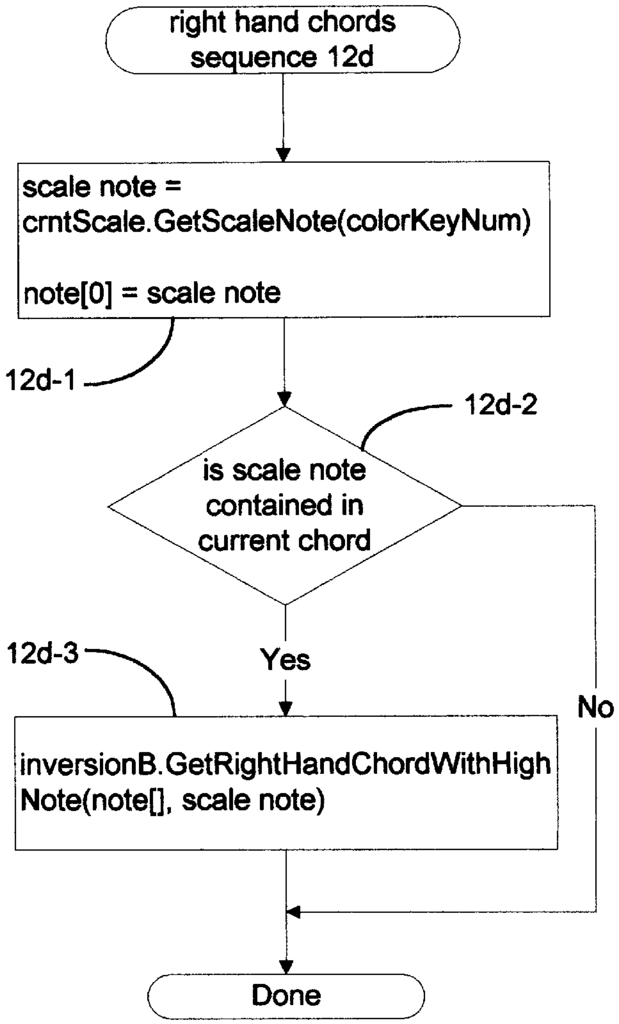

FIG. 12*d* gives a flow diagram of the right hand chord (mode=1) sequence. This sequence first fetches the single normal note as in normal mode in step 12d-1. It then checks if this note (note[0]) is contained in the current chord in step 12d-2. If it is not, then the sequence is done. If it is, then the right hand chord is fetched from chord inversion B object with the scale note (note[)]) as the highest note in step 12d-3.

Figure 12E:
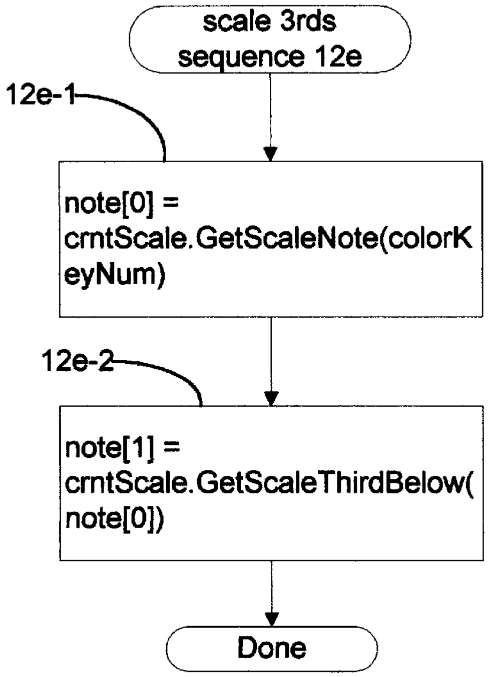

FIG. 12*e* gives a flow diagram of the scale thirds (mode=2) sequence. This sequence sets note[0] to the normal scale note as in normal mode (12e-1). It then sets note[1] to be the scale note one third below note[0] by calling the service 'GetScaleThird(colorKeyNum)' of the current scale object.

Figure 12F:
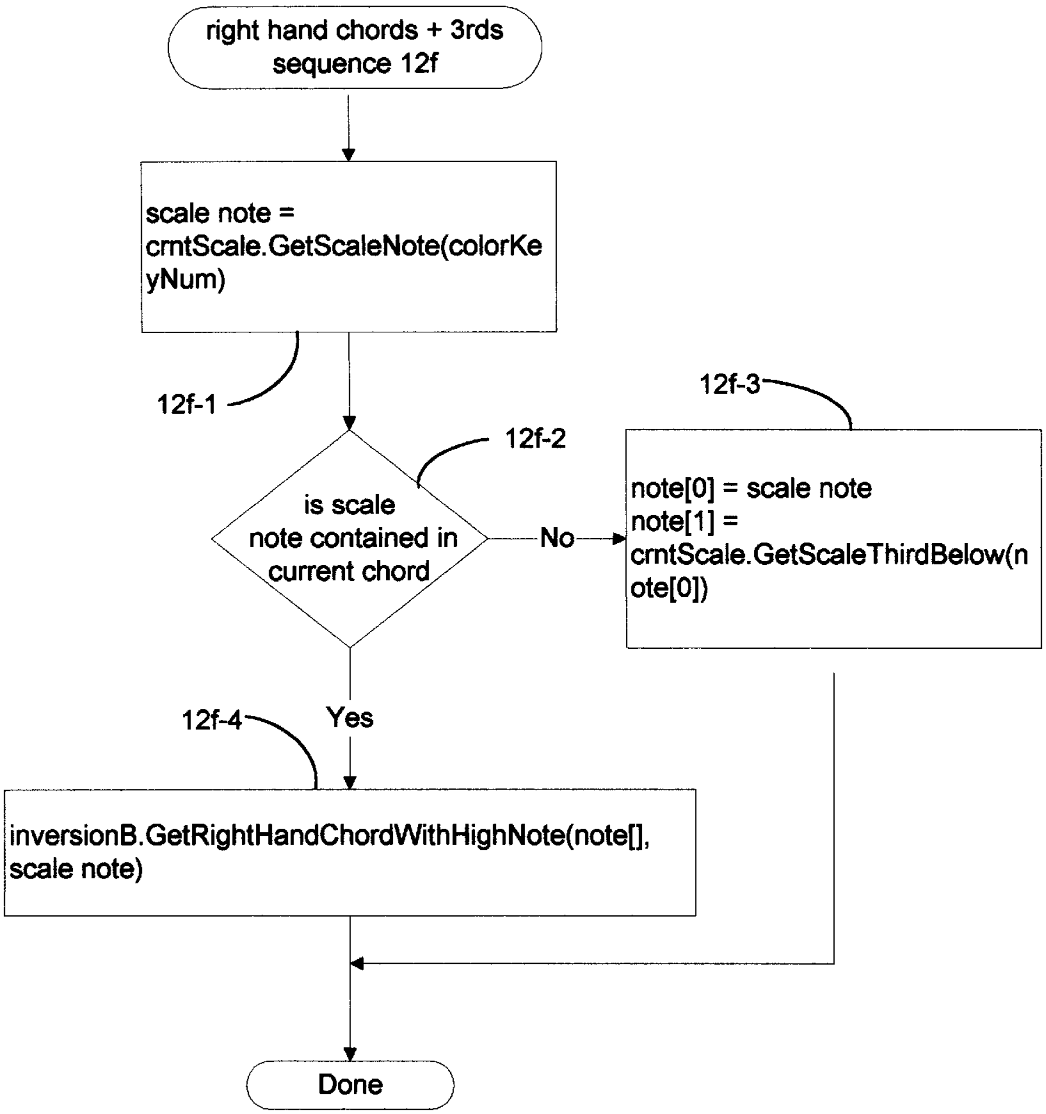

FIG. 12*f* gives a flow diagram of the right hand chords plus scale thirds (mode=3) sequence. This sequence plays a right hand chord exactly as for mode=1 if the normal scale note is in the current chord (12f-1, 12f-2, and 12f-4 are identical to 12d-1, 12d-2, and 12d-3 respectively). It differs in that if the scale note is not in the current chord, a scale third is played as mode 2 in step 12f-3.

Figure 12G:
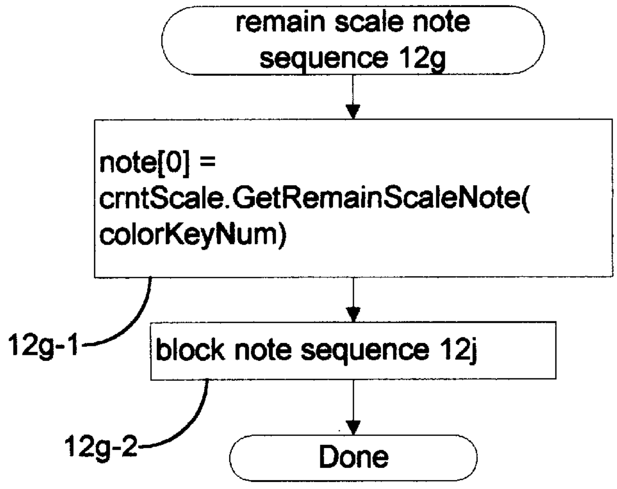

FIG. 12*g* depicts a flow diagram of the remaining scale note (mode=4) sequence. This sequence plays scale notes that are remaining after current chord notes are removed. It sets note[0] to the remaining scale note by calling the service 'GetRemainScaleNote(colorKeyNumber)' of the current scale object instep 12g-1. It then adds chord (block) notes based on the numBlkNotes attributes in step 12g-2. FIG. 12*j* shows a flow diagram for getting block notes.

Figure 12H:
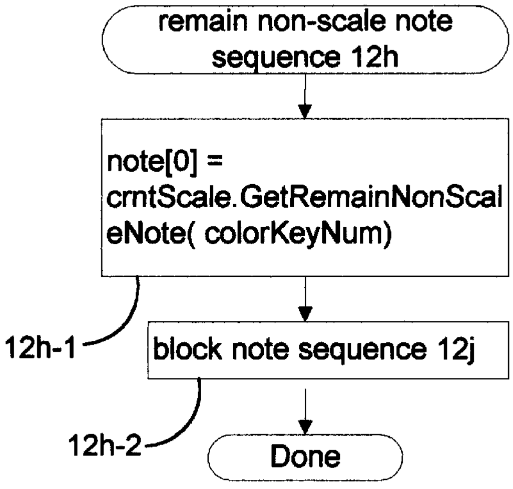
Figure 12J:
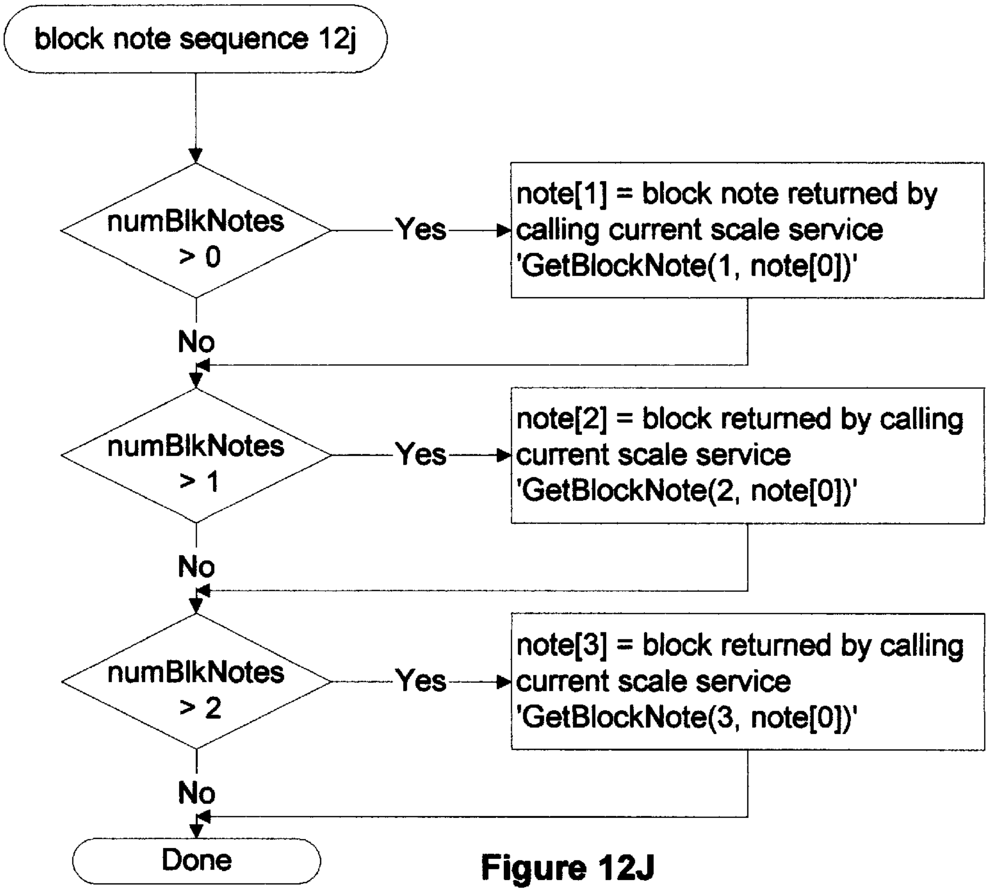

FIG. 12*h* gives a flow diagram of the remaining non-scale notes (mode=5) sequence. This sequence plays notes that are remaining after scale and chord notes are removed. It sets note[0] to the remaining non scale note by calling the service 'GetRemainNonScaleNote(colorKeyNumber)' of the current scale object in step 12h-1. It then adds chord (block) notes based on the numBlkNotes attributes in step 12h-2.

FIG. 12*j* shows a flow diagram for getting block notes.

FIG. 12*i* shows a flow diagram of the output sequence. This sequence includes adjusting each note for the octave of the key pressed and the shiftOctaveSetting attribute in step 12i-1. The net shift is stored in shiftOctaveApplied. Next, each non-zero note is output to the cnlNumber instance of the CnlOutput object in step 12i-2. The current status is also sent out to patchOut channel in step 12i-3 (see Table 17). Last, the original note (key) is output to the originalOut channel in step 12i-4.

Figure 12K:
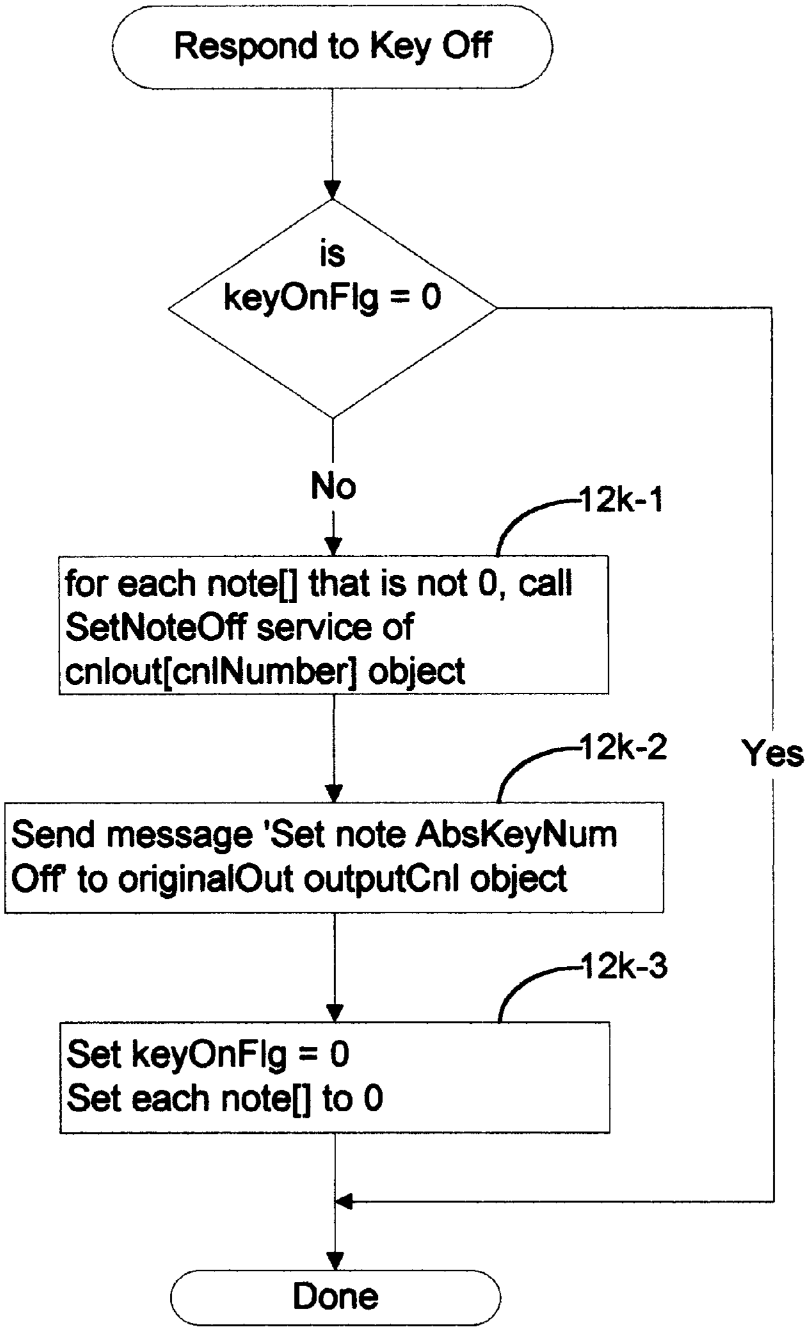

FIG. 12*k* provides a flow diagram for the service 'RespondToKeyOff()'. This service is called in response to a key being released. If the key has already been released (keyOnFlg 32 0) then this service does nothing. If the key has been pressed (keyOnFlg=1) then a note off is sent to channel cnlNumber for each non-zero note in step 12k-1. A note off message is sent for absoluteKeyNumber to originalOut output channel in step 12k-2. Then the keyOnFlg is cleared and the notes are cleared in step 12k-3.

The service CorrectKey() is called in response to a change in the current chord or scale while the key is on (keyOnFlg=1). This enables the key to correct the notes it has sent out for the new chord or scale. There are four different correction modes (see description for correctionMode attribute above). In the normal correction mode (correctionMode=0), this service behaves exactly as RespondToKeyOn() with one exception. If a new note to be turned on is already on, it will remain on. It therefore does not execute the same identical initialization sequence (FIG. 12*b*) in this mode. It first determines the notes to play (as per RespondToKeyOn() service) and then turns of only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service is NoteInChord() and the current scale objects services isNoteInScale and is NoteInCombinedScale() are used to determine if each note already on should be left on or turned off.

When in solo mode (correctionMode=1, 2, or 3), the original key (absKeyNum) that will be output to a unique channel, as shown in step 12i-4 of FIG. 12*i*. The output channel is determined by adding the correction mode multiplied by 9 to the channel determined in 12i-4. For example, if correctionMode is 2 then 18 is added to the channel number determined in step 12i-4. This allows the software to determine the correction mode when the original performance is played back.

Step 12b-2 of FIG. 12*b* decodes the correctionMode and channel number. The original key channels are local to the software and are not MIDI channels, as MIDI is limited to 16 channels.

The services SetMode(), SetCorrectionMode() and SetNumBlkNotes() set the mode, correctionMode and numBlkNotes attributes respectively using simple assignment (example: mode=newMode).

FIG. 13 and Table 14

The BlackMelodyKey object is responsible for handling all black melody key events. This involves, depending on mode, getting notes from the current scale object and/or chord inversion object and sending the notes out.

The class attributes for this object include mode, which may be set to one of Normal=0, RightHandChords=1 or Scale3rds=2. The attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. Instance variables include absoluteKeyNum and colorKeyNum and octave (see FIG. 2). The attribute destChannel holds the destination channel for the key on event. keyOnFlag indicates whether the Key in pressed or not. Velocity holds the velocity the key was pressed with and note[4] holds the notes that were sounded (if any).

TABLE 14

| PianoKey::BlackMelodyKey Attributes and Services |
|---|
| Class Attributes: |
| 1. mode |
| 2. correctionMode |
| 3. octaveShiftSetting |
| Instance Attributes: |
| 1. absoluteKeyNum |
| 2. colorKeyNum |
| 3. octave |
| 4. destChannel |
| 5. keyOnFlag |
| 6. velocity |
| 7. note[4] |
| 8. octaveShiftApplied |
| Services: |
| 1. ResondToKeyOn(sourceChannel, velocity); |
| 2. RespondToKeyOff(sourceChannel); |
| 3. CorrectKey(); |
| 4. SetMode(newMode); |
| 5. SetCorrectionMode(newCorrectionMode); |
| 6. SetOctaveShift(numberOctaves); |

FIG. 13*a* through 13*f* shows a flow diagram for the RespondToKeyOn() service. This service is called in response to the black melody key being pressed. It is responsible for generating the note(s) to be sounded. It is entered with the velocity of the key press and the channel the key was received on. It starts by initializing itself in step 13a-1, as described below. Next, it branches to a specific sequence that is dependent on the mode in step 13a-2. These specific sequences generate the notes. It finishes by outputting the generated notes in step 13a-3.

Figure 13A:
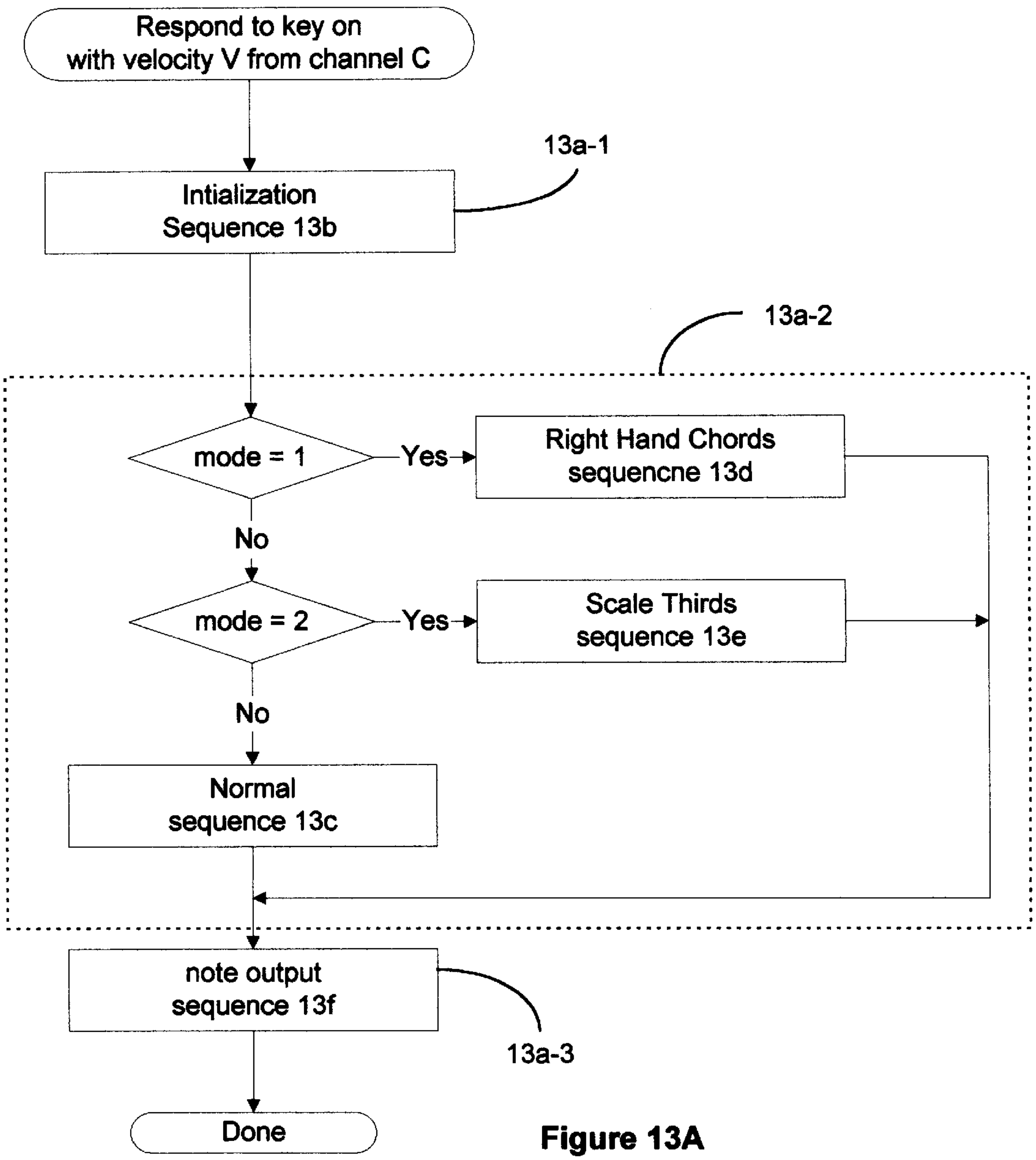
FIG. 13A through 13F together are a logic flow diagram of the PianoKey::MelodyKey objects ‘Respond To Key On’ service.
Figure 13B:
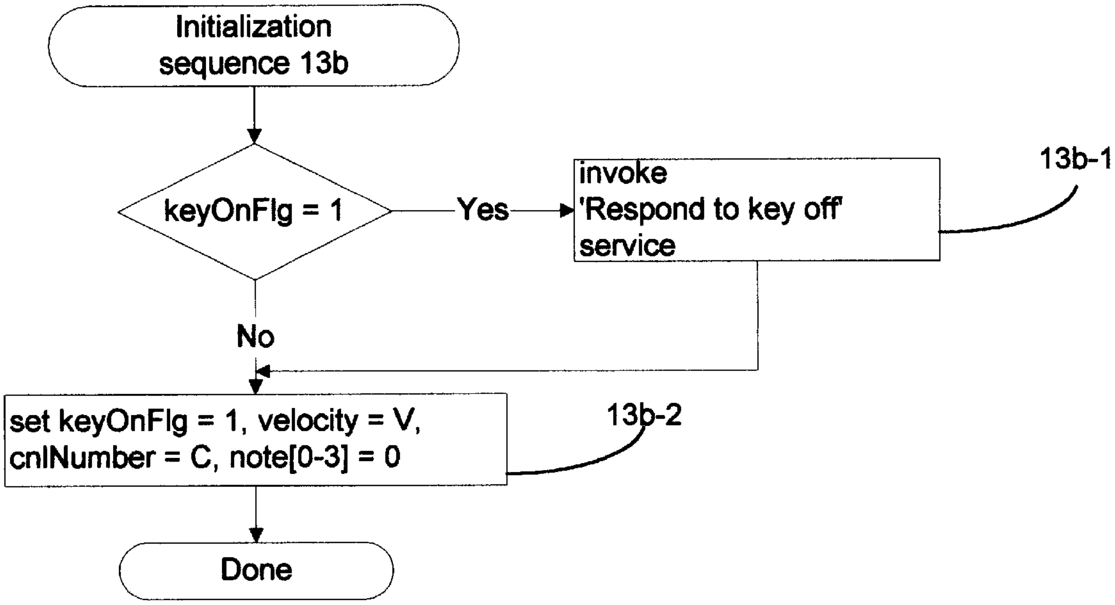

The initialization sequence, shown in FIG. 13*b,* first checks if the key is already pressed. If it is (keyOnFlg=1), the service 'RespondToKeyOff()' service will be called in step 13b-1. Then, keyOnFlg is set to 1, indicating the key is pressed, the velocity and destCnl attributes are set and the notes are cleared by being set to 0 in step 13b-2.

Figure 13F:
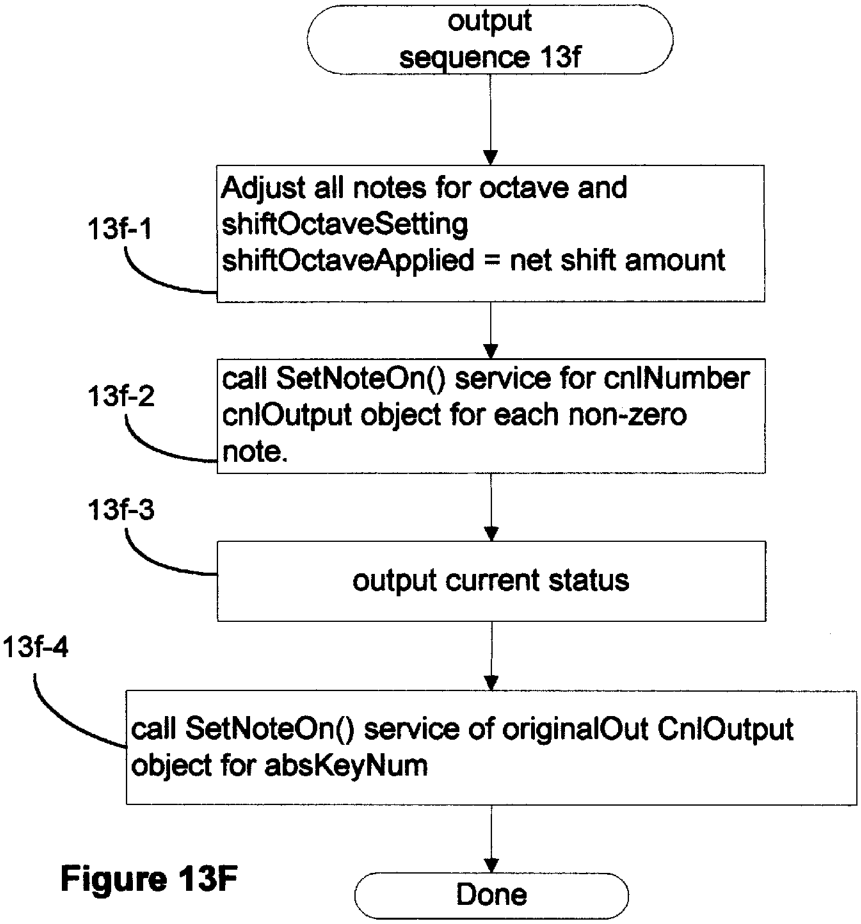
Figure 13C:
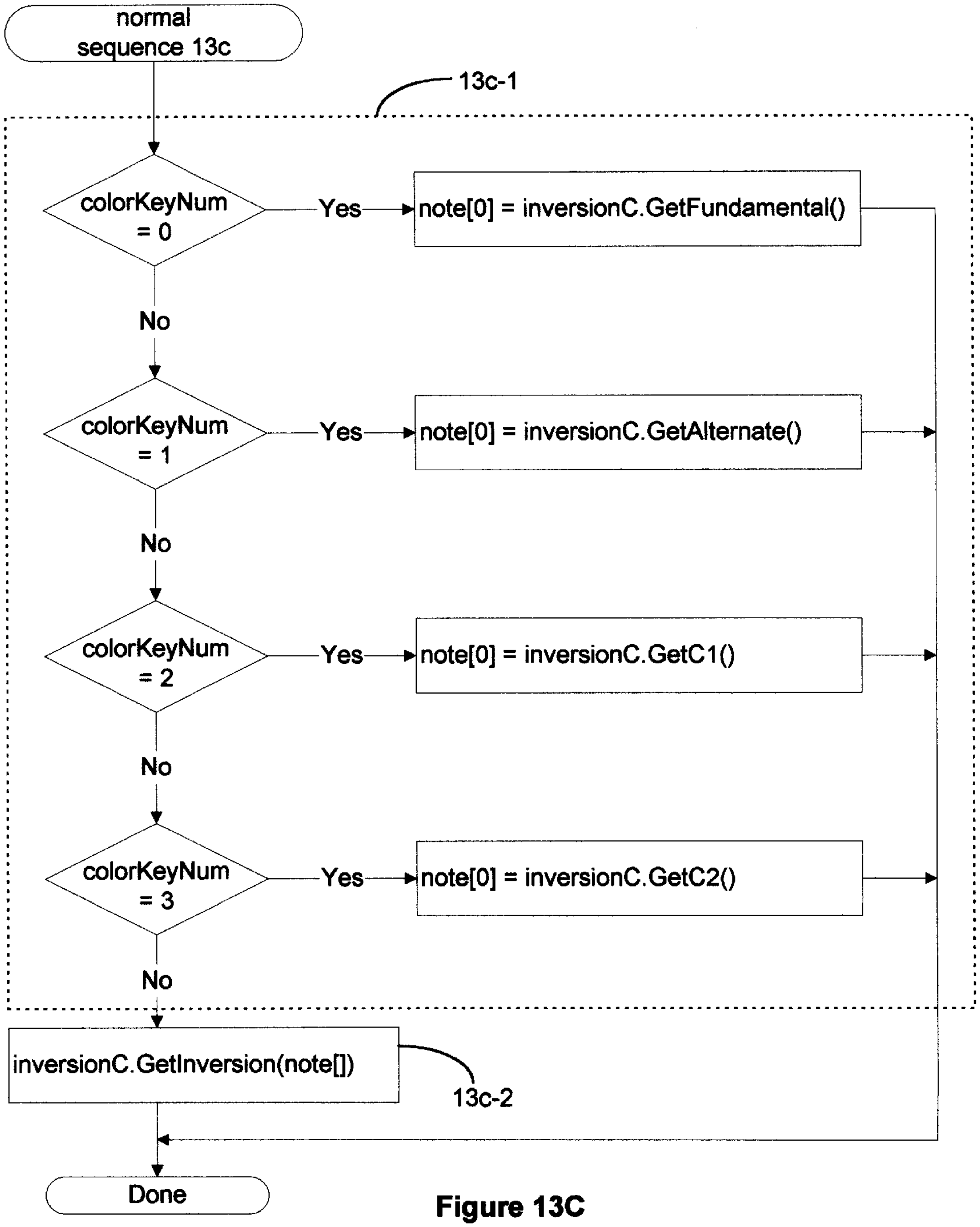

FIG. 13*c* shows a flow diagram of the normal (mode=0) sequence. The note(s) played depends on which black key it is (colorKeyNum). Black (colorKeyNum) keys 0, 1, 2, and 3 get the fundamental, alternate, C1 and C2 note of inversionC, respectively as simply diagrammed in the sequence 13c-1 of FIG. 13C. Black (colorKeyNum) key 4 gets the entire chord by calling the GetInversion() service of inversionC (13c-2).

Figure 13D:
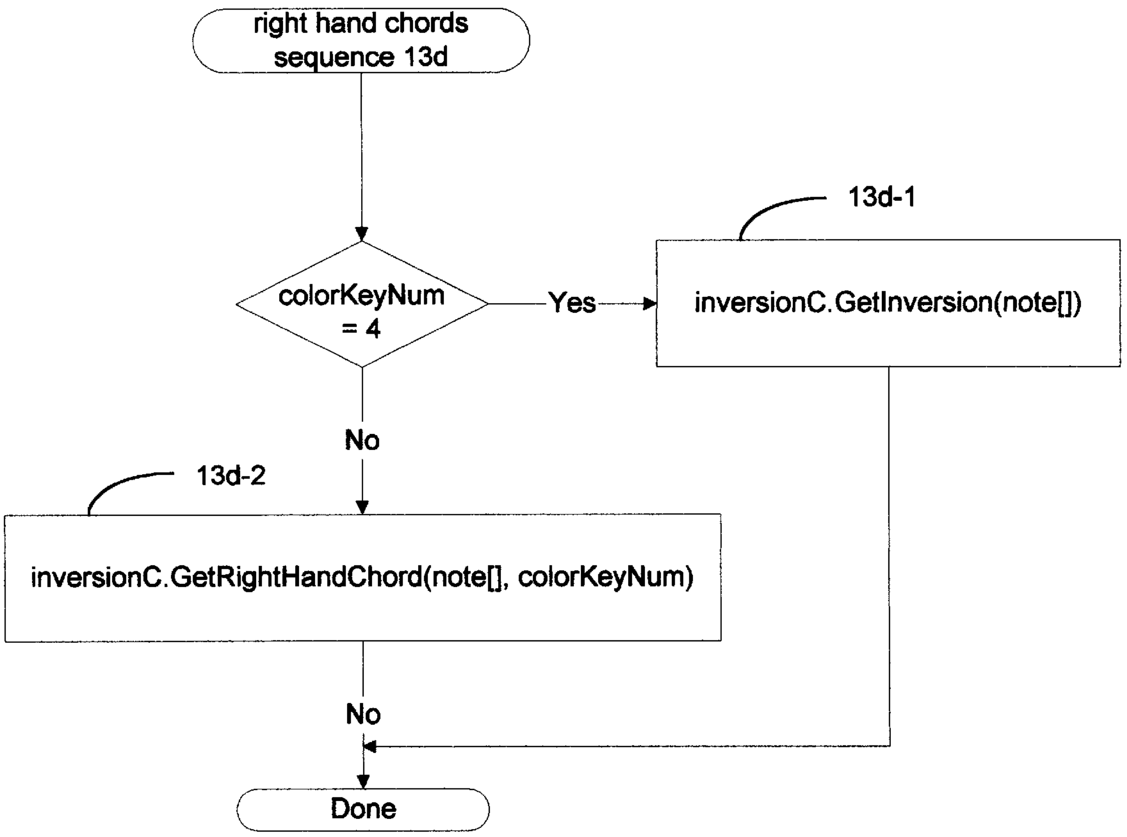

FIG. 13*d* shows a flow diagram of the right hand chords (mode=1) sequence. If the colorKeyNum attribute is 4 (meaning this is the 5th black key in the octave), then the current chord in the current inversion of inversionC is fetched and played in step 13d-1. Black keys 0 through 3 will get right hand chords 1 through 4 respectively.

Figure 13E:
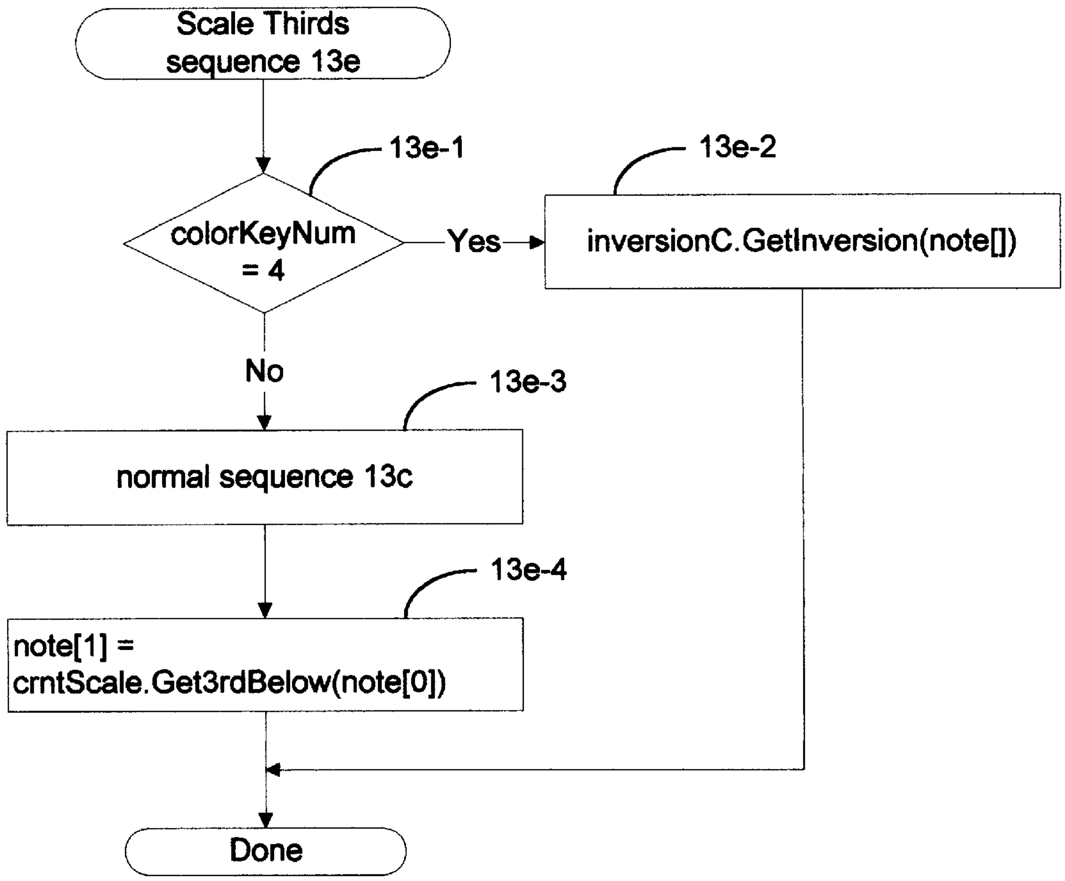

FIG. 13*e* shows a flow diagram of the scale thirds (mode=2) sequence. 13e-1 checks if this is the 5th black key (colorKeyNum=4). If it is, the 13e-2 will get the entire chord from inversionC object. If it is not the 5th black key, then the normal sequence shown in FIG. 13*c* is executed (13e-3). Then the note one scale third below note[0] is fetched from the current scale object (13e-4).

FIG. 13*f* shows a flow diagram of the output sequence. This sequence includes adjusting each note for the octave of the key pressed and the octaveShiftSetting attribute in step 13f-1. The net shift is stored in octaveShiftApplied Next, each non-zero note is output to the compOut instance of the CnlOutput object in step 13f-2. The current status is also sent out to channel 2 in step 13f-3 (see Table 17). Finally, the original note (key) is output to the proper channel in step 13f-4.

The service RespondToKeyOff() sends note offs for each note that is on. It is identical the flow diagram shown in FIG. 12*k*.

The service CorrectKeyOn() is called in response to a change in the current chord or scale while the key is on (keyOnFlg=1). This enables the key to correct the notes it has sent out for the new chord or scale. There are four different correction modes (see description for correctionMode attribute above).

In the normal correction mode (correctionMode=0), this service behaves exactly as RespondToKeyOn() with one exception. If a new note to be turned on is already on, it will remain on. It therefore does not execute the same identical initialization sequence (FIG. 13*b*) in this mode. It first determines the notes to play (as per RespondToKeyOn() service) and then turns off only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale correctionMode=3). If a note that is already on exists any wherein the current chord, scale or combined chord and scale it will remain on. The current chord objects service isNoteInChord() and the current scale objects services isNoteInScale and isNoteInCombinedScale() are used to determine if each note already on should be left on or turned off. The output channel for the original key is determined as for the while melody key as described above. It should be noted that all note correction methods described by the present invention are illustrative only, and can easily be expanded to allow note correction based on any single note, such as chord fundamental or alternate, or any note group. A specific mode may also be called for any of a plurality of input controllers.

The services SetMode() and SetCorrectionMode() set the mode and correctionMode attributes respectively using simple assignment (example: mode newMode).

Table 15

Since the black chord progression keys play non-scale chords, they are seldom used in music production. These keys become more useful as a control (function) key or toggle switches that allow a user to easily and quickly make mode and configuration changes on the fly. Note that any key can be used as a control key, but the black chord progression keys (non-scale chords) are the obvious choice. The keys chosen to function as control keys are simply instantiated as the desired key type (as are all the other key types). The present invention uses 4 control keys. They are piano keys with absKeyNum of 49, 51, 54 and 56. They have three services, RespondToKeyOn(), RespondToProgramChange and RespondToKeyOff(). Presently, the RespondToKeyOff() service does nothing (having the service provides a consistent interface for all piano key objects, relieving the music administrator object 3-3 from having to treat these keys differently from other keys. The RespondToKeyOn() service behaves as follows. Key 49 calls config.setSongKeyBank(0), key 51 calls config.SongKeyBank(1), key 54 calls config.SetScaleBank (0), and key 56 calls config.SetScaleBank(1). Note that these same functions can be done via a user interface. A program change equal to the absKeyNum attribute is also output as for the chord progression keys (see 10-16). The service RespondToProgramChange() service is identical to the RespondToKeyOn() service. It is provided to allow received program changes (patch triggers) to have the same controlling effect as pressing the control keys.

TABLE 15

| PianoKey::ControlKey Attributes and Services |
|---|
| Attributes: |
| 1. absKeyNum |
| Services: |
| I. RespondToKeyOn(sourceChannel, velocity); |
| 2. RespondToKeyOff(sourceChannel) |
| 3. RespondToProgramChange(sourceChannel); |

FIGS. 14*a*, 14*b*, 14*c*, 14*d* and 14*e* and Table 16

There is one instance of the music administrator object called musicAdm 3-3. This is the main driver software for the present invention. It is responsible for getting music input from the music input object 3-4 and calling the appropriate service for the appropriate piano key object 3-6. The piano key services called will almost always be RespondToKeyOn() or RespondToKeyOff(). Some music input may be routed directly to the music output object 3-12. Table 16 shows the music administrators attributes and services. Although the description that follows assumes there are 16 input channels, the description is applicable for any number of input channels. All attributes except melodyKeyFlg[16][128] are user setable per user preference. The attribute mode applies to all input channels and may be either off (0) or on (1). The array melodyKeyFlg [16][128] is an array of flags that indicate which melody keys are on (flag=1) and which are off (flag=0). The array holds 128 keys for each of 16 input channels.

The cnlMode[16] attribute holds the mode for each of 16 input channels. This mode may be one of normal, bypass or off. If cnlMode[y]=bypass, then input from channel y will bypass any processing and be heard like a regular keyboard. Data which represents bypassed musical data can be provided utilizing a plurality of input controllers on the instrument. Data representing bypassed musical data will include note-identifying information that will identify a note or notes in accordance with that of a regular keyboard (i.e. such as when no chord note, scale note, etc. processing is taking place). Data representing bypassed musical data allows a user to perform notes with the appearance that they are playing regular keyboard notes, and that no musical processing is taking place. The notes to be sounded could play musical notes, trigger drum sounds, etc. Those of ordinary skill in the art will recognize that any number of input controllers on a given instrument may be utilized for bypassed performance. Other input controllers on the instrument may optionally be used for scale note/chord note performance, etc. If cnlMode[x]=off, then input from channel x will be discarded or filtered out. The attribute firstMldyKey[16] identifies the first melody key for each input channel. FirstMldyKey[y]=60 indicates that for channel y, keys 0–59 are to be interpreted as chord progression keys and keys 60–127 are to be interpreted as melody keys. FirstMldyKey[x]=0 indicates that channel x is to contain only melody keys and firstMldyKey[z]=128 indicates that channel z is to contain only chord progression keys. The attribute chordProcCnl[16] and mldyProcCnl[16] identify the process channel for an input channel's chord progression keys and melody keys respectively. This gives a user the ability to map input to different channels, and/or to combine input from 2 or more channels and to split the chord and melody keys to 2 different channels if desired. By default, the process channels are the same as the receive channel.

It should be noted that multiple instruments of the present invention can be connected in a variety of ways and combinations at any point in time during a given performance. For example, an individual instrument which is connected with one or more other instruments may include its own software or program, may share software or a program with at least one other connected instrument, or any and all combinations of these. The instruments of the present invention can be connected utilizing a variety of communication means known in the art. Ways of connecting one or more instruments of the present invention, as well as various forms of communication means utilized to connect the instruments of the present invention, will become apparent to those of ordinary skill in the art.

TABLE 16

| Music Administrator Objects Attributes and Services |
|---|
| Attributes: |
| 1. mode |
| 2. melodyKeyFlg[16][128] |
| 3. cnlMode[16] |
| 4. firstMldyKey[16] |

TABLE 16-continued

| Music Administrator Objects Attributes and Services |
|---|
| Attributes: |
| 5. chordProcCnl[16]<br>6. mldyProcCnl[16] |
| |
| Services: |
| 1. Update();<br>2. SetMode(newMode);<br>3. SetCnlMode(cnlNum, newMode);<br>4. SetFirstMldyKey(cnlNum, keyNum);<br>5. SetProcCnl(cnlNum, chordCnl, mldyCnl);<br>6. CorrectKeys(); |

The service SetMode(x) sets the mode attribute to x The service SetCnlMode(x, y) sets attribute cnlMode[x] to y. SetFirstMldyKey(x, y) sets firstMldyKey[x] to y and the service SetProcCnl(x, y, z) sets attribute chordProcCnl[x] to y and attribute mldyProcCnl[x] to z. The above services are called by the user interface object 3-2.

The Update() service is called by main (or, in some operating systems, by the real time kernel or other process scheduler). This service is the music software's main execution thread. FIGS. 14*a* through 14*d* show a flow diagram of this service. It first checks if there is any music input received in step 14a-1 and does nothing if not. If there is input ready, step 14a-2 gets the music input from the music input object 34. This music input includes the key number (KeyNum in FIG. 14*a* through 14*d*), the velocity of the key press or release, the channel number (cnl in FIG. 14) and whether the key is on (pressed) or off (released).

If mode attribute is off (mode=0) then the music input is simply echoed directly to the output in step 14a-4 with the destination channel being specified by the attribute mldyProcCnl[rcvCnl]. There is no processing of the music if mode is off. If mode is on (mode=1), then the receiving channel is checked to see if it is in bypass mode in step 14a-5. If it is, then the output is output in step 14a-4 without any processing. If not in bypass mode, then step 14a-6 checks if the channel is off. If it is off then execution returns to the beginning. If it is on execution proceeds with the flow diagram shown in FIG. 14*b*.

Step 14b-2 checks if it is a key on or off message. If it is, then step 14b-3 checks if it is a chord progression key (keys<firstMldyKey[cnl]) or a melody key (>=firstMldyKey [cnl]). Processing of chord progression keys proceeds with U3 (FIG. 14*c*) and processing of melody keys proceeds with U4 (FIG. 14*d*). If it is not a key on/off message then step 14b-4 checks if it is a program change (or patch trigger). If it is not then it is a pitch bend or other MIDI message and is sent unprocessed to the output object by step 14b-7, after which it returns to U1 to process the next music input. If the input is a patch trigger then step 14b-5 checks if the patch trigger is for a chord progession key indicated by the program number being <firstMldyKey[cnl]. If it is not, then the patch trigger is sent to the current status object in step 14b-8 by calling the RcvStatus(patchTrigger) service (see Table 17) and then calling the CorrectKey() service (14b-9), followed by returning to U1.

If the patch trigger is for a chord progression key, then step 14b-6 calls the RespondToProgramChange() service of the chordkey of the same number as the patch trigger after changing the channel number to that specified in the attribute chordProcCnl[rcvCnl] where rcvCnl is the channel the program change was received on. Execution then returns to U1 to process the next music input.

Figure 14A:
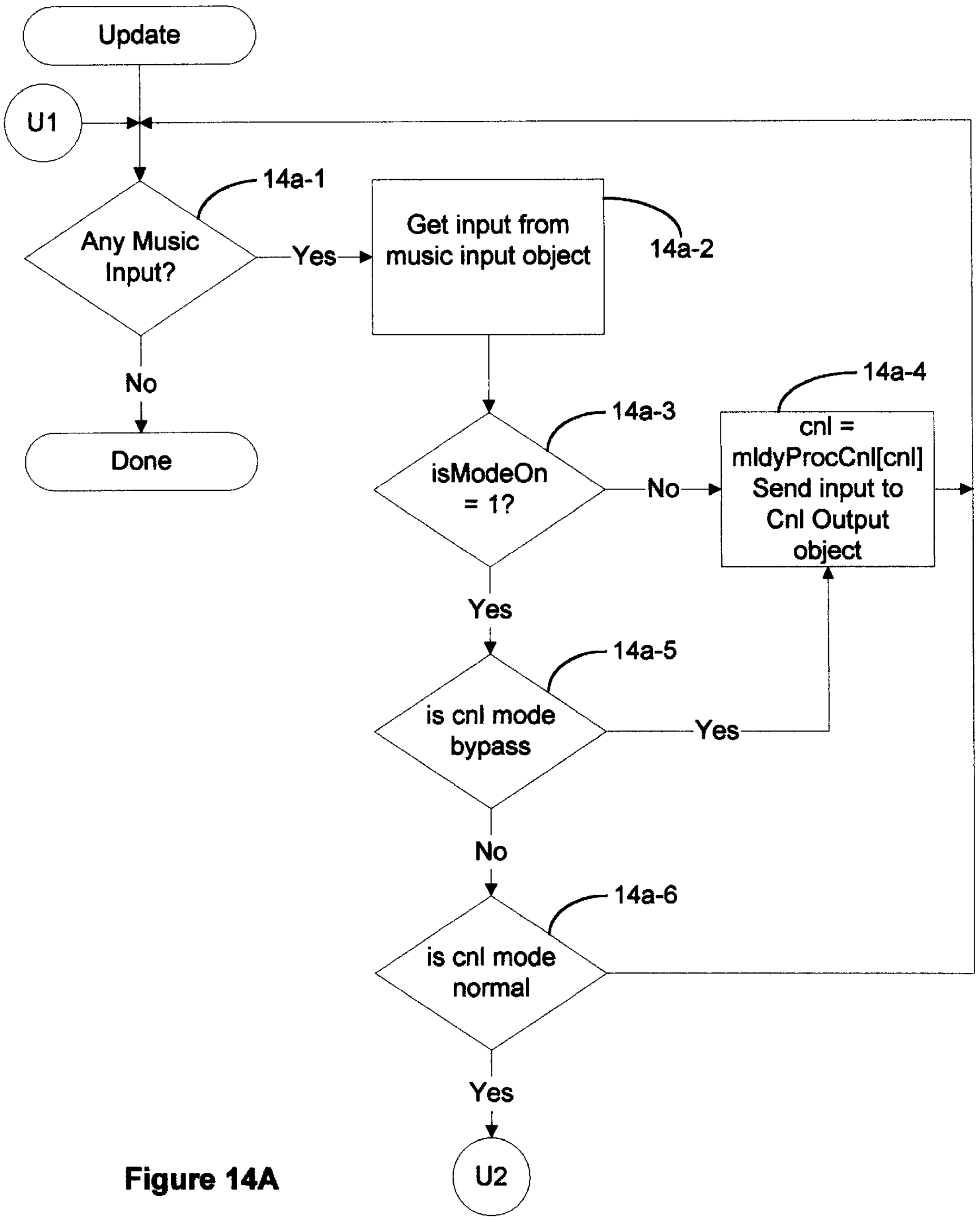
FIGS. 14A through 14D together are a logic flow diagram of Music Administrator objects ‘Update’ service.
Figure 14B:
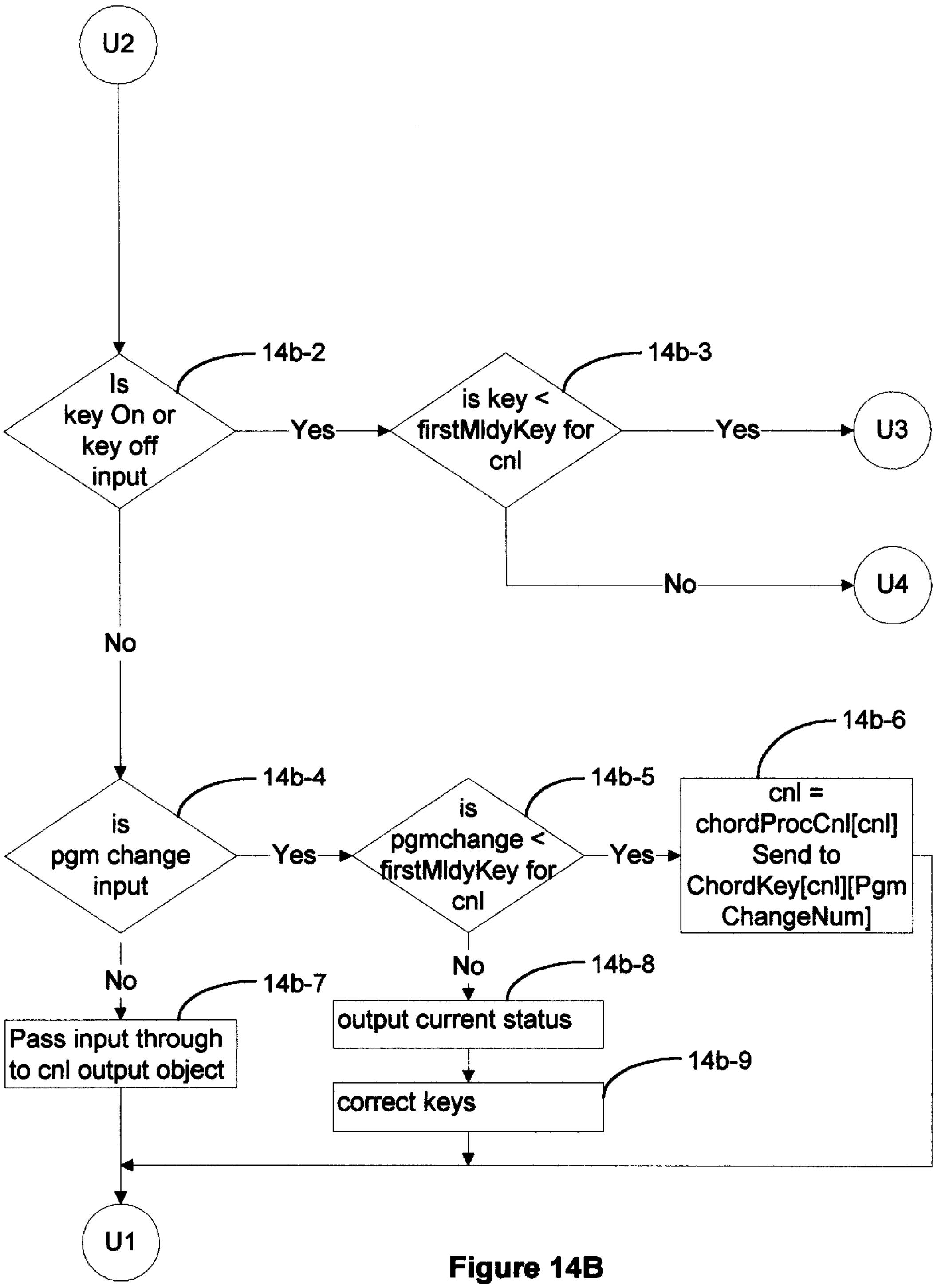
Figure 14C:
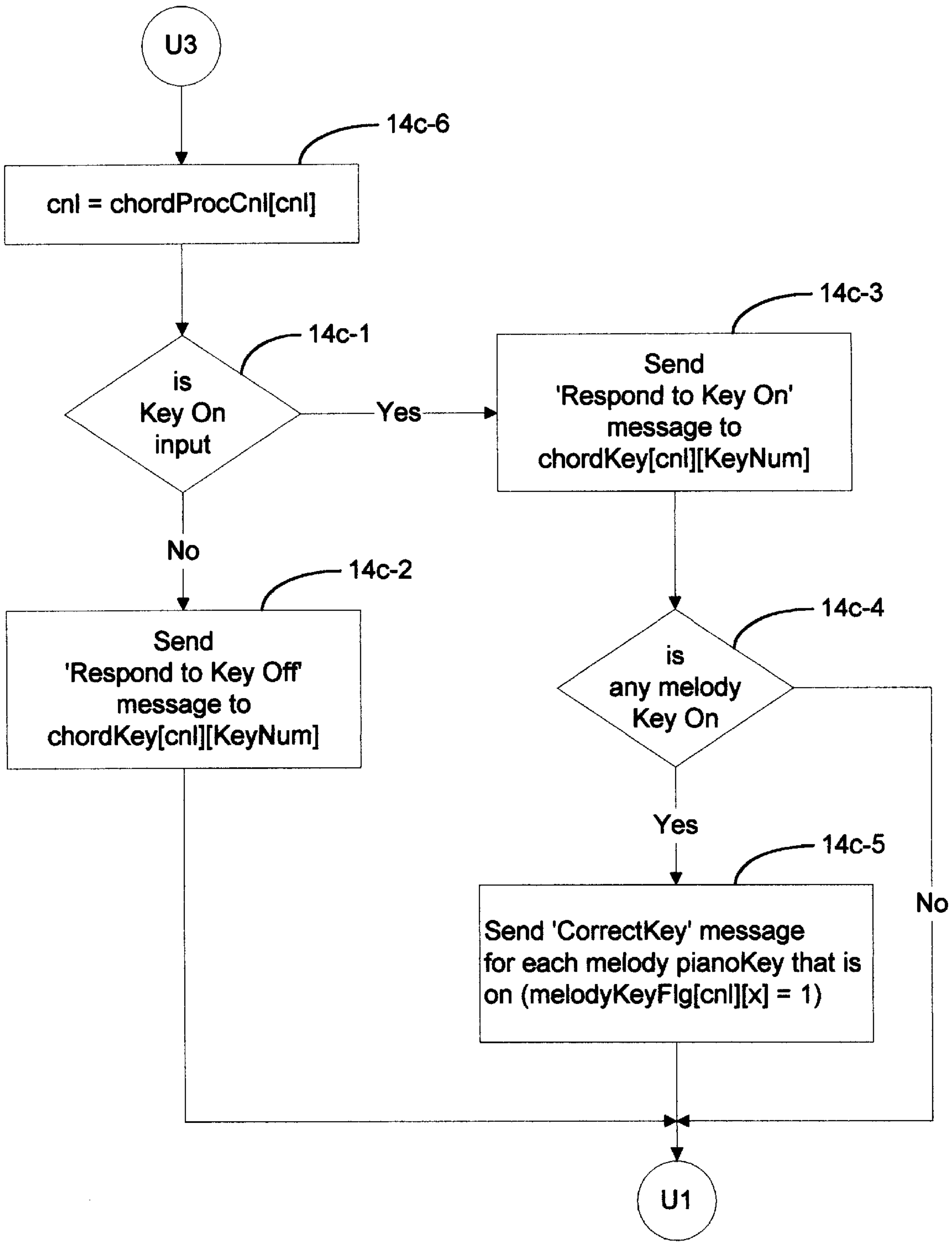
Figure 14D:
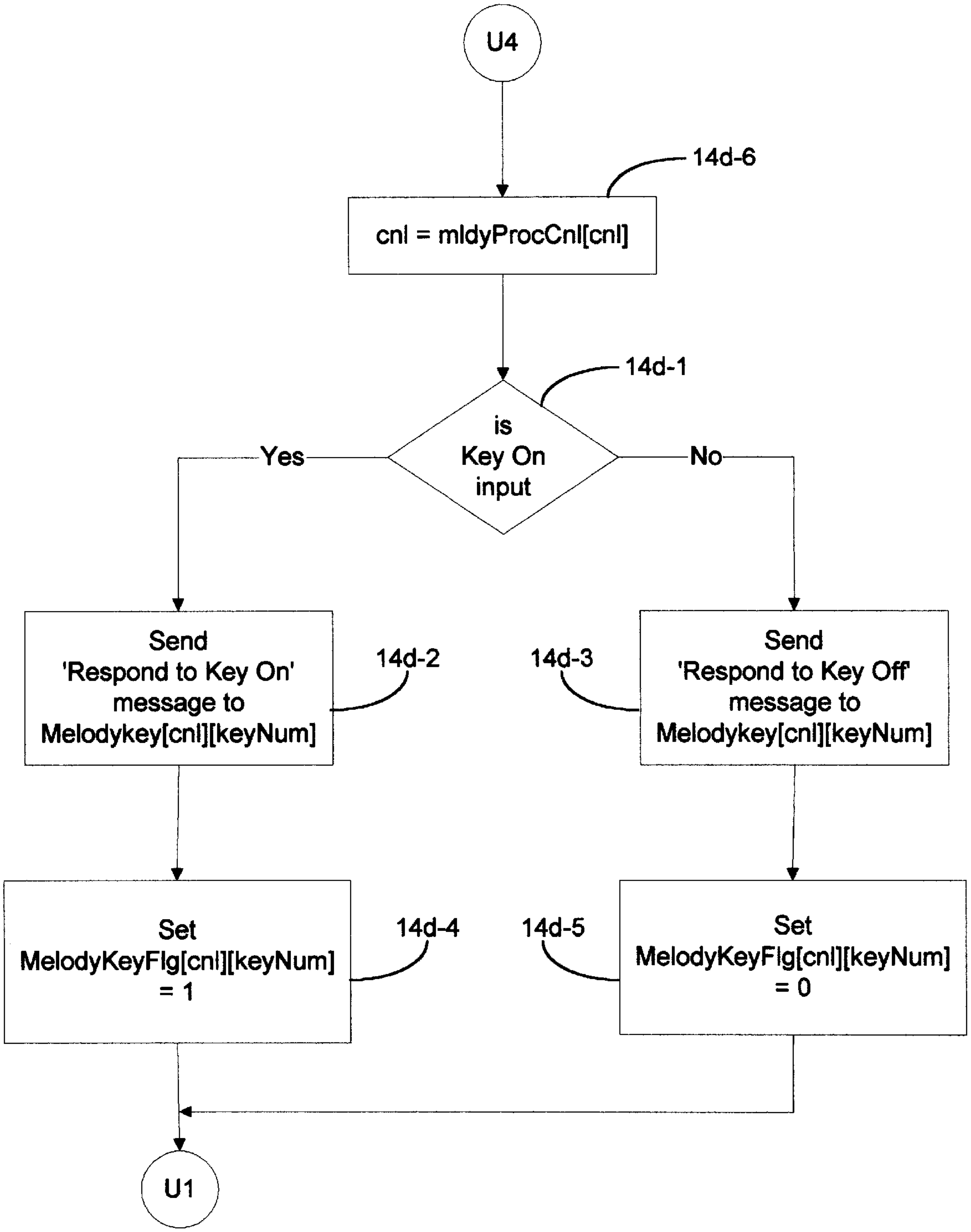

Referring to FIG. 14*c*, step 14c-6 changes the channel (cnl in FIG. 14) to that specified by the attribute chordProcCnl [cnl]. Next, step 14c-1 checks if the music input is a key on message. If it is not, step 14c-2 calls the RespondToKeyOff() service of the key. If it is, step 14c-3 calls the RespondToKeyOn() service. After the KeyOn service is called, steps 14c-4 and 14c-5 call the CorrectKey() service of any melody key that is in the on state, indicated by melodyKeyFlg[cnl][Key number]=1. Processing then proceeds to the next music input.

Referring to FIG. 14*d*, step 14d-6 changes the channel (cnl in FIG. 14) to that specified by the attribute mldyProcCnl[cnl]. Next, step 14d-1 checks if the melody key input is a Key On message. If it is, then step 14d-2 calls the RespondToKeyOn() service of the specified melody key. This is followed by step 14d-4 setting the melodyKeyFlg [cnl][key] to 1 indicating that the key is in the on state. If the music input is a key off message, then step 14d-3 calls the RespondToKeyOff() service and step 14d-5 clears the melodyKeyflg[cnl] [key] to 0. Execution then proceeds to U1 to process the next input.

In the description thus far, if a user presses more than one key in the chord progression section, all keys will sound chords, but only the last key pressed will assign (or trigger) the current chord and current scale. It should be apparent that the music administrator object could be modified slightly so that only the lowest key pressed or the last key pressed will sound chords.

The CorrectKeys() service is called by the user interface in reponse to the song key being changed or changes in chord or scale assignments. This service is responsible for calling the CorrectKey() services of the chord progression key(s) that are on followed by calling the CorrectKey() services of the black and white melody keys that are on.

Table 17

Table 17 shows the current status objects attributes and services. This object, not shown in FIG. 3, is responsible for sending and receiving the current status which includes the song key, the current chord (fundamental and type), the current scale (root and type). Current status may also include the current chord inversion, a relative chord position identifier (see Table 2, last two rows), as well as various other identifiers described herein (not shown in Table 17). The current status message sent and received comprises 6 consecutive patch changes in the form 61, 1aa, 1bb, 1cc, 1dd and 1ee, where 61 is the patch change that identifies the beginning of the current status message (patch changes 0–59 are reserved for the chord progression keys).

aa is the current song key added to 100 to produce 1aa. The value of aa is found in the song key attribute row of Table 2 (when minor song keys are added, the value will range from 0 through 23). bb is the current chord fundamental added to 100. The value of bb is also found in the song key attribute row of Table 2, where the number represents the note in the row above it. cc is the current chord type added to 100. The value of cc is found in the Index column of Table 4. dd is the root note of the current scale added to 100. The value of dd is found the same as bb. ee is the current scale type added to 100. The possible values of ee are found in the Index column of Table 6a.

The attributes are used only by the service RcvStatus() which receives the current status message one patch change at a time. The attribute state identifies the state or value of the received status byte (patch change). When state is 0, RcvStatus() does nothing unless statusByte is 61 in which case is set state to 1. The state attribute is set to 1 any time a 61 is received. When state is 1, 100 is subtracted from statusByte and checked if a valid song key. If it is then it is stored in rcvdSongKey and state is set to 2. If not a valid song key, state is set to 0. Similarly, rcvdChordFund (state=2), rcvdChordType (state=3), rcvdScaleRoot (state=4) and rcvdScaleType (state=5) are sequentially set to the status byte after 100 is subtracted and value tested for validity. The state is always set to 0 upon reception of invalid value. After rcvdScaleType is set, the current song key, chord and scale are set according to the received values and state is set to 0 in preparation for the next current status message.

The service SendCurrentStatus() prepares the current status message by sending patch change 61 to channel 2, fetching the song key, current chord and current scale values, adding 100 to each value and outputting each to channel 2.

It should also be noted that the current status messages may be utilized to generate a "musical metronome". Traditional metronomes click on each beat to provide rhythmic guidance during a given performance. A "musical metronome" however, will allow a user to get a feel for chord changes and/or possibly scale changes in a given performance. When the first current status message is read during playback, the current chord fundamental is determined, and one or more note ons are provided which are representative of the chord fundamental. When a new and different chord fundamental is determined using a subsequently read current status message, the presently sounded chord fundamental note(s) are turned off, and the new and different chord fundamental note(s) are turned on and so on. The final chord fundamental note off(s) are sent at the end of the performance or when a user terminates the performance. This will allow a plurality of chord changes in the given performance to be indicated to a user by sounding at least fundamental chord notes. Those of ordinary skill will recognize that selected current scale notes may also be determined and sounded if desired, such as for indicating scale changes for example. Additional selected chord notes may also be sounded. In a given performance where a chord progression and/or various scale combinations in the given performance are known, the musical metronome data may be easily generated with minor modification such as before the commencement of the given performance, for example.

TABLE 17

Current Status Objects Attributes and Services

| Attributes: |
|---|
| 1. state |
| 2. rcvdSongKey |
| 3. rcvdChordFund |
| 4. rcvdChordType |
| 5. rcvdScaleRoot |
| 6. rcvdScaleType |

| Services: |
|---|
| 1. SendCurrentStatus(); |
| 2. RcvStatus(statusByte); |

An alternative to the current status message described is to simplify it by identifying only which chord, scale, and song key bank (of the configuration object) is selected, rather than identifying the specific chord, scale, and song key. In this case, 61 could be scale bank 1, 62 scale bank 2, 63 chord group bank 1, 64 chord group bank 2, 65 song key bank 1, 66 song key bank 2, etc. The RcvStatus() service would, after reception of each patch trigger, call the appropriate service of the configuration object, such as SetScaleBank(1 or 2). However, if the configuration has changed since the received current status message was sent, the resulting chord, scale, and song key may be not what a user expected. It should be noted that all current status messages as well as patch triggers described herein may be output from input controller performances in both the chord section and melody section. The current status message or patch trigger is stored. Playing any key in the melody section will output the current status message or trigger allowing a chord progression to be established during a melody key performance. This is useful when a user is recording a performance, but has not yet established a chord progression utilizing the chord progression keys.

Table 18

There is one music input object musicIn 3-4. Table 18 shows its attributes and services. This is the interface to the music input hardware. The low level software interface is usually provided by the hardware manufacturer as a 'device driver'. This object is responsible for providing a consistent interface to the hardware "device drivers" of many different vendors. It has five main attributes. keyRcvdFlag is set to 1 when a key pressed or released event (or other input) has been received. The array rcvdKeyBuffer[] is an input buffer that stores many received events in the order they were received. This array along with the attributes bufferHead and bufferTail enable this object to implement a standard first in first out (FIFO) buffer. The attribute ChannelMap[64] is a table of channel translations. ChannelMap[n]=y will cause data received on channel n to be treated as if received on channel y. This allows data from two or more different sources to combined on a single channel if desired.

The services include isKeyInputRcvd() which returns true (1) if an event has been received and is waiting to be read and processed. GetMusicInput() returns the next event received in the order it was received The InterruptHandler() service is called in response to a hardware interrupt triggered by the received event. The MapChannelTo(inputCnl, outputCnl) service will set ChannelMap[inputCnl] to outputCnl. The use and implementation of the music input object is straight forward common. Normally, all input is received from a single source or cable. For most MIDI systems, this limits the input to 16 channels. The music input object 3-4 can accommodate inputs from more than one source (hardware device/cable). For the second, third and fourth source inputs (if present), the music input object adds 16, 32 and 48 respectfully to the actual MIDI channel number. This extends the input capability to 64 channels.

TABLE 18

Music Input Objects Attributes and Services

| Attributes: |
|---|
| 1. keyRcvdFlag |
| 2. rcvKeyBuffer[n] |
| 3. channelMap[64] |
| 4. bufferHead |
| 5. bufferTail |

TABLE 18-continued

| Music Input Objects Attributes and Services |
|---|
| Attributes: |
| Services: |
| 1. isKeyInputRcvd(); keyRcvdFlag |
| 2. GetMusicInput(); rcvdKeyBuffer[bufferTail] |
| 3. InterruptHandler() |
| 4. MapChannelTo(inputCnl, outputCnl); |

Table 19

There is one music output object musicOut 3-12. Table 19 shows its attributes and services. This is the interface to the music output hardware (which is usually the same as the input hardware). The low level software interface is usually provided by the hardware manufacturer as a 'device driver'. This object is responsible for providing a consistent interface to the hardware 'device drivers' of many different vendors.

The musicOut object has three main attributes. The array outputKeyBuffer[] is an output buffer that stores many notes and other music messages to be output. This array along with the attributes bufferHead and bufferTail enable this object to implement a standard first in first out (FIFO) buffer or output queue.

The service OutputMusic() queues music output. The InterruptHandler() service is called in response to a hardware interrupt triggered by the output hardware being ready for more output. It outputs music in the order is was stored in the output queue. The use and implementation of the music output object is straight forward and common. As with the music input object 3-4, the music output object 3-12 can accommodate outputing to more than one physical destination (hardware device/cable). Output specified for channels 1-16, 17-32, 33-48 and 49-64 are directed to the first, second, third and fourth destination devices respectfully.

TABLE 19

| Music Output Objects Attributes and Services |
|---|
| Attributes: |
| 1. outputKeyBuffer[n] |
| 2. bufferHead |
| 3. bufferTail |
| Services: |
| 1. OutputMusic(outputByte); |
| 2. InterruptHandler(); |

FIGS. 15A through 15K and Tables 20 through 26.

Figure 15A:
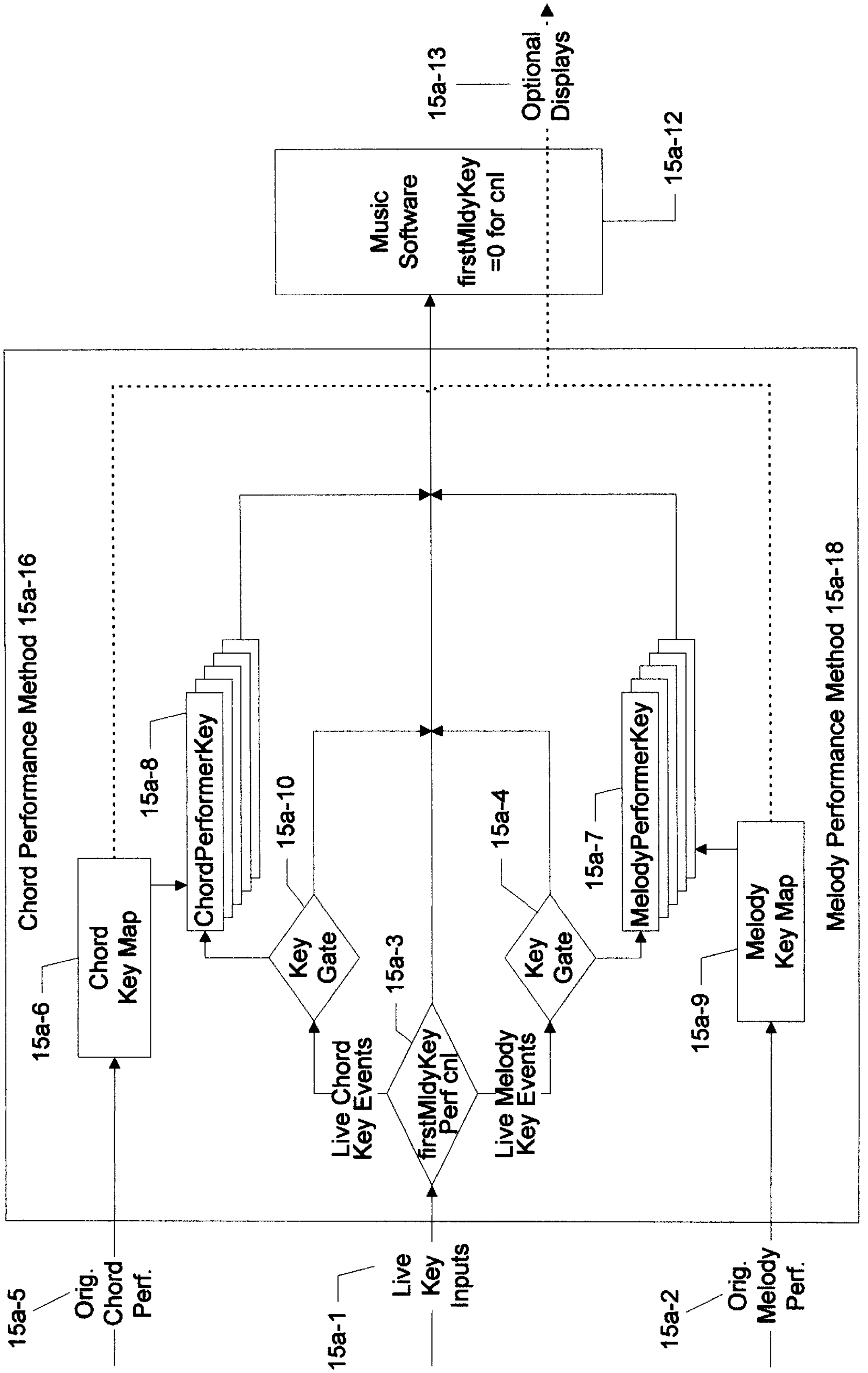
FIG. 15A is a general overview of the performance function of the present invention.

FIG. 15A shows a general overview of the chord performance method and melody performance method of the present invention. The performance embodiments shown, allow previously recorded or stored musical data to be utilized for effecting a given performance from various input controller pluralities, even if the given performance represents a composition originally composed by the author(s) from a different number of input controllers. The method uses indicators or "indications" to allow a user to discern which input controllers to play in a given performance. The use of indicators for visually assisted musical performance is well known in the art, and generally involves a controller which contains the processing unit, which may comprise a conventional microprocessor. The controller retrieves indicator information in a predetermined order from a source. The processing unit determines a location on the musical instrument corresponding to the indicator information. The determined location is indicated to a user where the user should physically engage the instrument in order to initiate the intended musical performance. Indicators can be LEDs, lamps, alphanumeric displays, etc. Indicators may be positioned on or near the input controllers utilized for performance. They may also be positioned in some other manner, so long as a user can discern which indicator corresponds to which performance input controller. Indicators may also be displayed on a computer monitor or other display, such as by using depictions of performance input controllers and their respective indications, as one example. The indication system described herein, may be incorporated into the instrument of the present invention, or may comprise a stand-alone unit which is provided to complete the musical instrument of the present invention. Those of ordinary skill in the art will recognize that the indicators, as described herein, may be provided in a variety of ways. One means of providing indications on an instrument of the type which may be used to execute one of the performance method embodiments of the present invention is described in U.S. Pat. No. 5,266,735, incorporated herein by reference. For purposes of clarification, a given musical performance or "given performance" is defined herein to include any song, musical segment, composition, specific part or parts, etc. being performed by a user. A given performance as described herein will be readily identifiable and apparent to a user, regardless of the number of input controllers, beat, voice selection, mode, etc. utilized to effect the given performance. The harmony modes described herein may be used in a given performance, and may be set differently for each skill level, if preferred. Additional indications including those described herein, may also be utilized It should also be noted that the words "recorded" and "stored" are used interchangeably herein to describe the present invention.

FIG. 15A shows a general overview of one embodiment of the Chord Performance Method 15a-16 and Melody Performance Method 15a-18 of the present invention. Both methods have been incorporated and shown together in order to simplify the description. An embodiment of the present invention may however, include the Chord Performance Method only 15a-16, or the Melody Performance Method only 15a-18, if preferred. The following performance method description is for one performance channel. Processing may be duplicated, as described later, to allow simultaneous multi-user performance on multiple channels. It should be noted that the present invention is described herein using a basic channel mapping scenario. This was done to simplify the description. Many channel mapping scenarios may be utilized, and will become apparent to those of ordinary skill in the art. Although the Chord Performance Method and Melody Performance Method are actually part of the music software 15a-12, for purposes of illustration they are shown separate. The Melody Performance Method 15a-18 of the present invention will be described first. The Melody Performance Method 15a-18 involves two main software objects, the Melody Performance Method 15a-18 and MelodyPerformerKey 15a-7. What the Melody Performance Method 15a-18 does is intercept live key inputs 15a-1 and previously recorded original melody performance key inputs 15a-2, and translate these into the original performance which is then presented to the music software 15a-12 for processing as the original performance. Thus the previously recorded or stored original melody performance 15a-2 is played back under the control of the live key inputs 15a-1. The live key inputs 15a-1 correspond to the key inputs 1-13 of FIG. 1A. The previously recorded original melody performance input 15a-2 is from the sequencer 1-22 in FIG. 1A. The input may also be provided using a variety of sources, including interchangeable storage devices, etc. This is useful for providing a user with pre-stored data, such as that which may represent a collection of popular songs, for example. FIG. 15A, 15a-2 is referred to as an 'original performance' because it is a sequence of actual keys pressed and presented to the music software and not the processed output from the music software, as has been described herein. When the Melody Performance Method 15a-18 utilizes original melody performance input 15a-2 to be presented to the music software for processing, the original melody performance will be re-processed by the music software 15a-12. The music software 15a-12 is the same as 1-10 in FIG. 1A and the optional displays 15a-13 correspond to 1-18 of FIG. 1A.

Table 20

The MelodyPerformerKey object 15a-7 will be discussed before the Melody Performance Method object 15a-18. Table 20 shows the six attributes of the MelodyPerformerKey object 15a-7 and listing of services. Attribute isEngaged is set to TRUE when the object is engaged and is set to FALSE when the object is disengaged The defaultKey attribute holds the default key (MIDI note) value for the object The originalDefaultKey attribute holds the default key value when first set. The originalDefaultKey attribute may be used to reset a default key back to its original value when various optional steps described herein are utilized. The armedKey[64] attribute is an array of 64 keys that each MelodyPerformerKey object 15a-7 may be armed with. The attribute velocity holds the velocity parameter received with the last Engage(velocity) service. Attribute isArmedDriverKey is set to TRUE when the object is armed with a key and is set to FALSE when the object is disarmed of all keys. Each instance of MelodyPerformerKey object 15a-7 is initialized with isEngaged=FALSE, defaultKey=−1, originalDefaultKey=−1, velocity=0, each armedkey[] set to −1, and isArmedDriverKey=FALSE. The value −1 indicates the attribute is null or empty. The service SetDfltKey (keyNum) will set the defaultKey attribute to keyNum where keyNum is a MIDI note number in the range 0 to 127. The services IsDriverKeyArmed() and IsArmedDriverKeyPressed() are used with the optional performance feature shown by FIG. 15K, described later.

TABLE 20

| MelodyPerformerKey Attributes and Services |
| --- |
| Attributes: |
| 1. isEngaged |
| 2. defaultKey |
| 3. originalDefaultKey |
| 4. velocity |
| 5. armedKey[64] |
| 6. isArmedDriverKey |
| Services: |
| 1. Engage(velocity); |
| 2. Disengage(); |
| 3. Arm(keyNum); |
| 4. DisArm(keyNum); |
| 5. SetDefaultKey(keyNum); |
| 6. IsDriverKeyArmed(); |
| 7. IsArmedDriverKeyPressed(); |

Figure 15B:
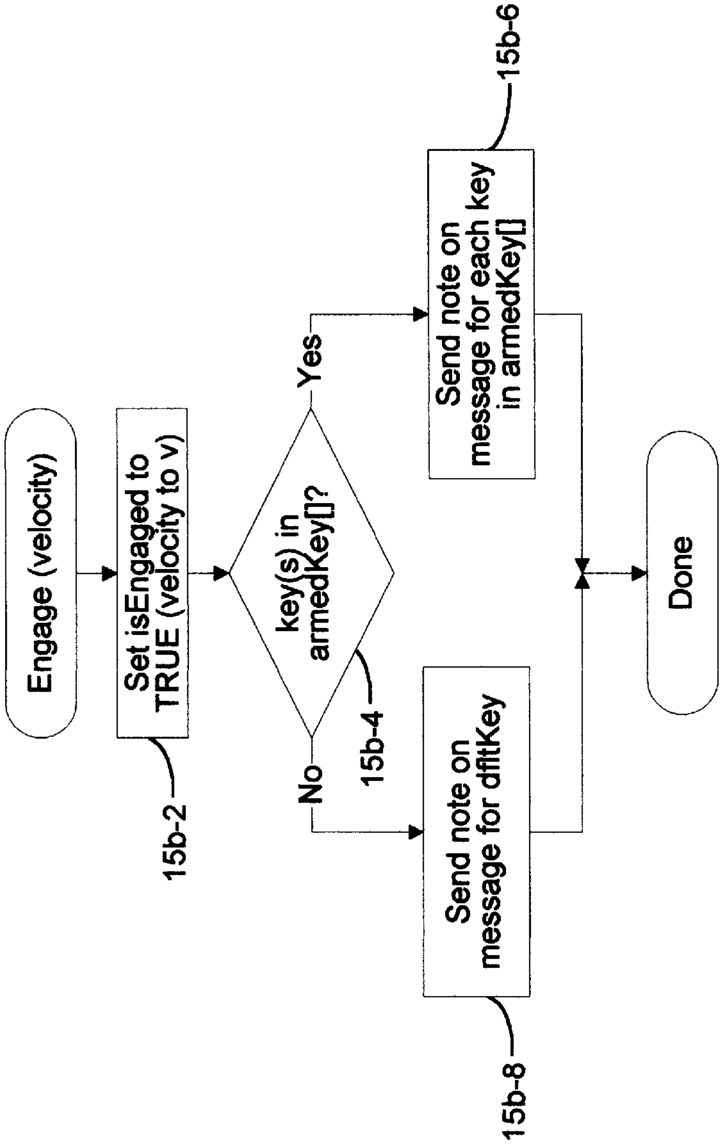
FIG. 15B is a logic flow diagram of the Engage(velocity) service of the performance function.

FIG. 15B shows a flow diagram for the service Engage (velocity). This service is called for the MelodyPerformerKey object 15a-7 when a live key 15a-1 (MIDI note number) is pressed that corresponds to the MelodyPerformerKey object 15a-7, as will be described later. Step 15b-2 will set attribute isEngaged to TRUE and velocity to v. Step 15b-4 determines if one or more keys are in the armedKey[] attribute. If one or more keys are in the armedkey[] attribute, then step 15b-6 sends a MIDI note on message with velocity v on sourceChannel for each key (MIDI note number) in the armedKey[] attribute, and processing finishes. These note on messages are sent to the music software object 15a-12 for processing as an original performance input. It should be noted that the sourceChannel attribute is common to the Melody Performance Method 15a-1, and will be described later. If there are no keys in the armedkey[] attribute in step 15b-14, then step 15b-8 sends a note on message with velocity v on sourceChannel for the defaultKey attribute if set, and processing finishes. This note on message is also sent to the music software object 15a-12 for processing as an original performance input.

Figure 15C:
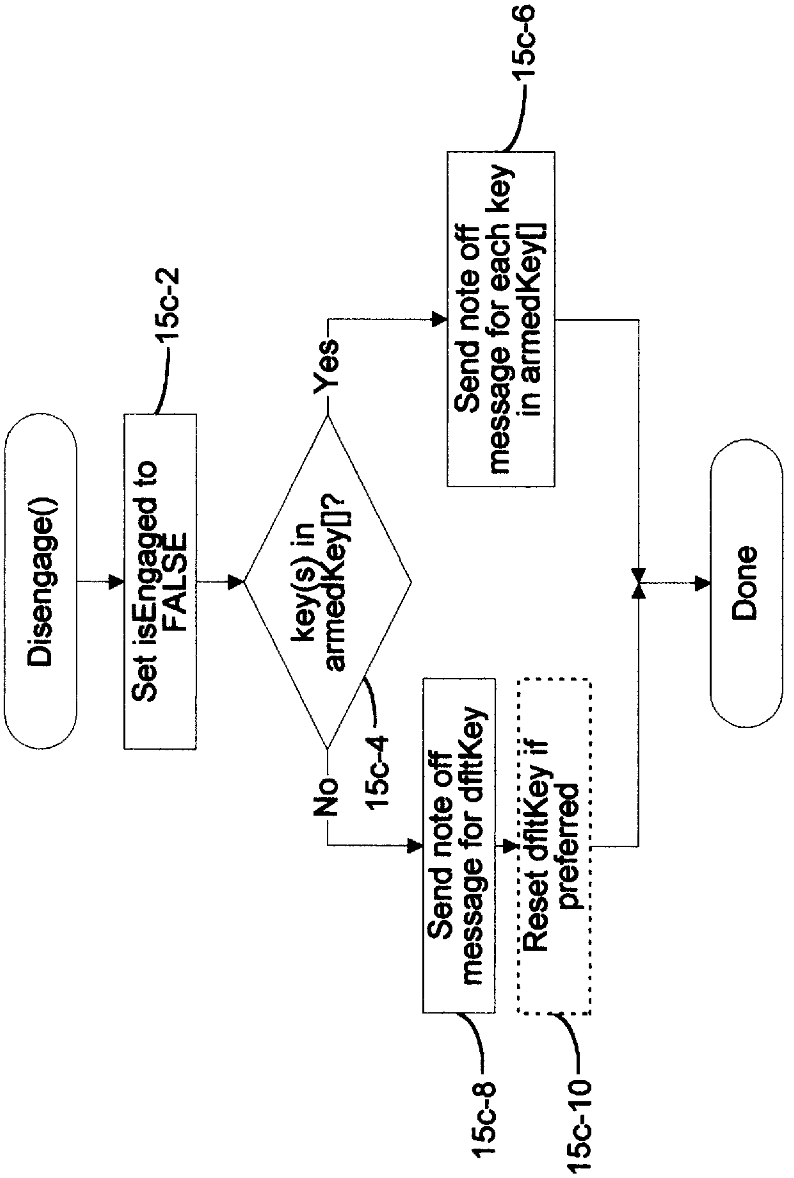
FIG. 15C is a logic flow diagram of the Disengage() service of the performance function.

FIG. 15C shows a flow diagram for the service Disengage (). This service is called for the MelodyPerformerKey object 15a-7 when a live key 15a-1 (MIDI note number) is released that corresponds to the MelodyPerformerKey object 15a-7, as will be described later. Step 15c-2 will set isEngaged to FALSE. Step 15c-4 determines if one or more keys are in the armedKey[] attribute. If one or more keys are in the armedKey[] attribute, then step 15c-6 sends a note off message on sourceChannel for each key in armedkey[] array, and processing finishes. Each note off message is sent to the music software object 15a-12 for processing as an original performance input. If there are no keys in the armedKey[] attribute, then step 15c-8 sends a note off message on sourceChannel for the defaultKey attribute if set, and processing finishes. This note off message is also sent to the music software object 15a-12 for processing as an original performance input. Although not required, optional step 15c-10 (shown by dotted lines) may then reset the defaultkey attribute using the originalDefaultKey value (if different), and processing finishes. The designer has the option of using this additional step 15c-10 when optional step 15e-10 of FIG. 15E is utilized (shown by dotted lines). Although not required, these optional steps 15c-10 and 15e-10 may be used in one embodiment of the present invention for the purpose of providing smoother performance playback. It should be noted that by having a default key, a user will always hear something when a key is pressed, even if it is not part of the previously recorded original performance 15a-2. A default key is required when the optional steps 15c-10 and 15e-10 (shown by dotted lines) are utilized.

Figure 15D:
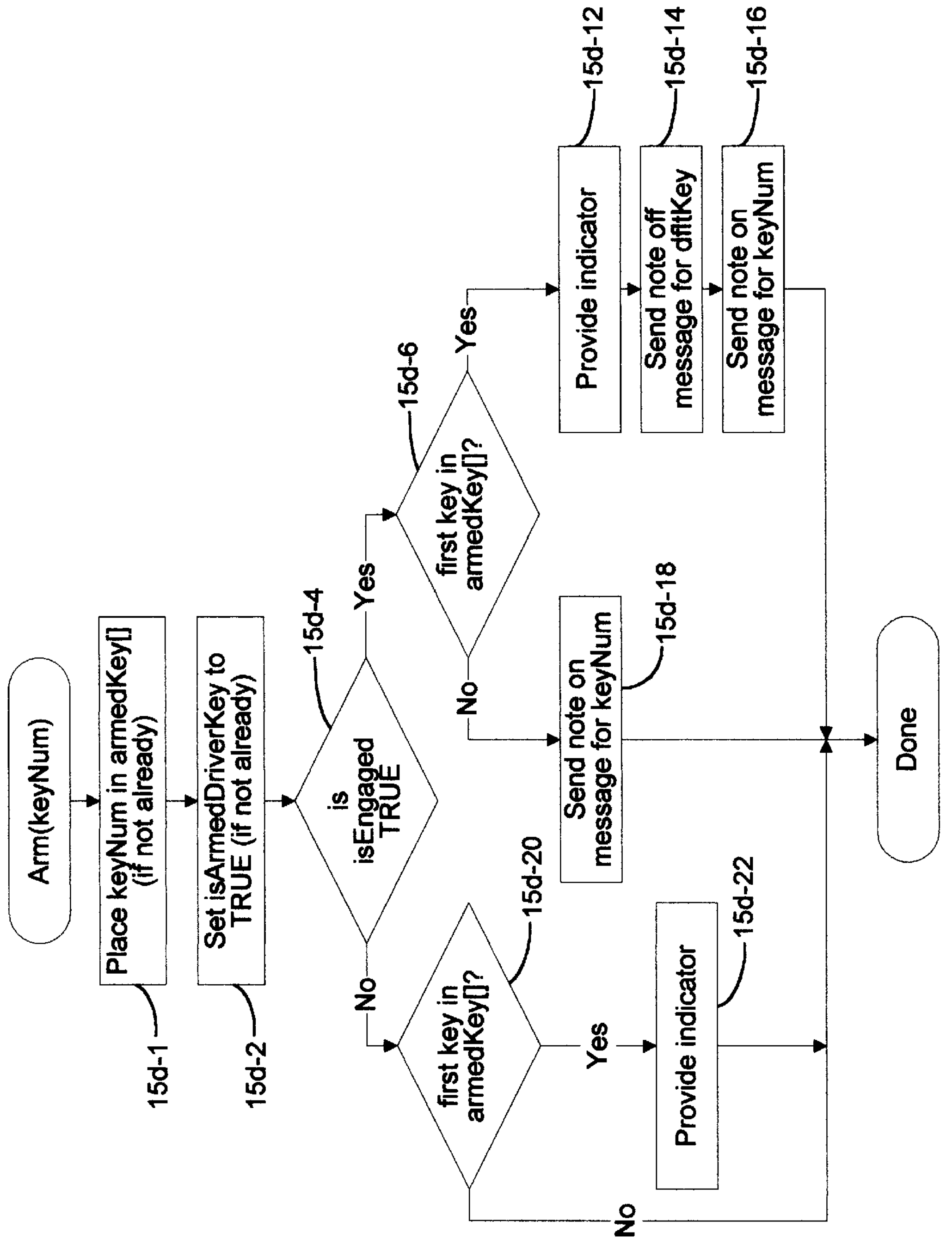
FIG. 15D is a logic flow diagram of the Arm(keyNum) service of the performance function.
Figure 15E:
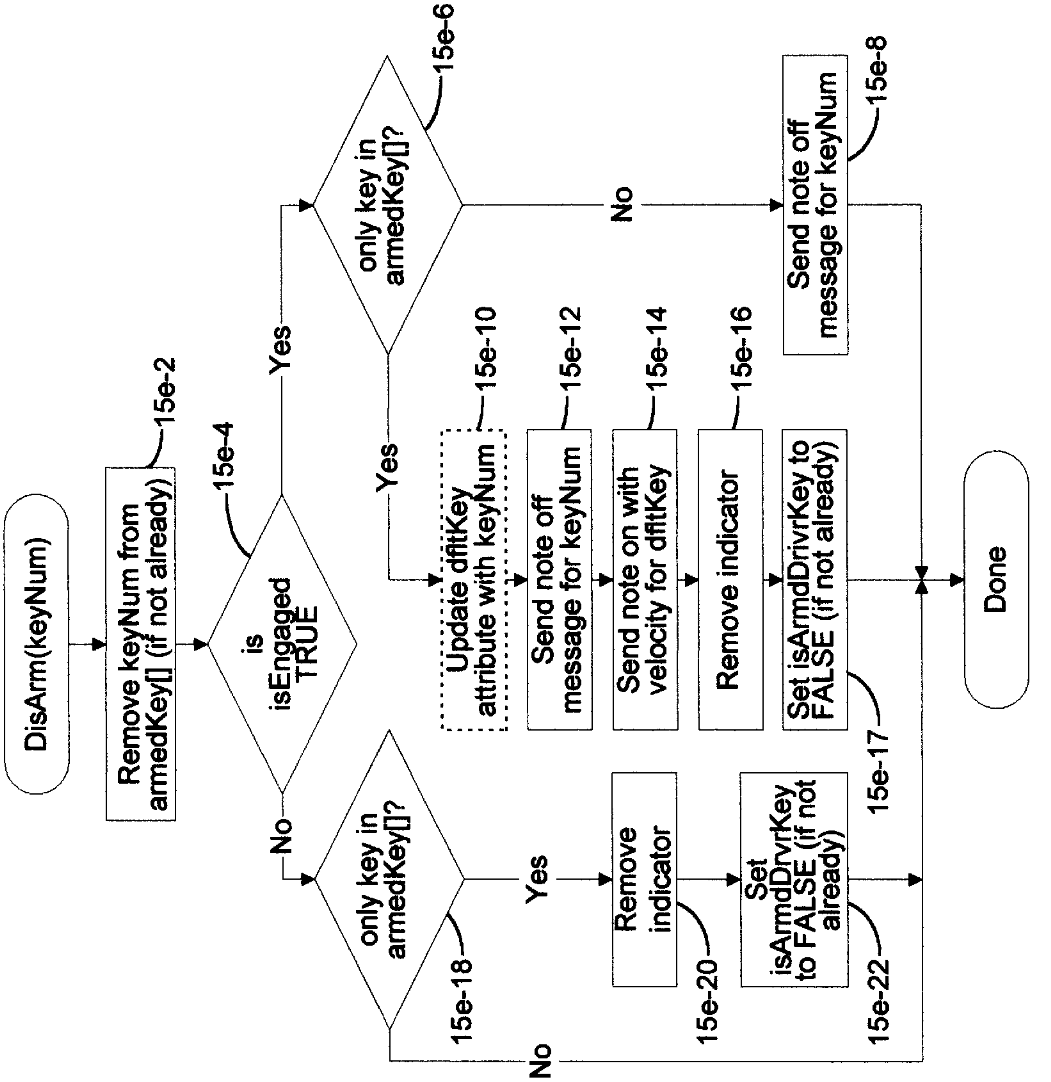
FIG. 15E is a logic flow diagram of the DisArm(keyNum) service of the performance function.

FIG. 15D shows a flow diagram for the service Arm (keyNum). This service is called for the MelodyPerformerKey object 15a-7 when an original melody performance note on event 15a-2 (keyNum) is received that corresponds to the MelodyPerformerKey object 15a-7. Mapping to the object is handled by the melody key map 15a-9 or MelodyPerformerKey mapping identifier, as will be described later. Step 15d-1 will first place keyNum in the armedkey[] array (if not already). Step 15d-2 will set isArimedDriverKey to TRUE (if not already). It should be noted that the Arm(keyNum) and DisArm(keyNum) services of FIGS. 15D and 15E, respectively, each set the isArmedDriverKey attribute. However, this attribute (and the steps shown for setting the attribute) are not required unless the additional performance feature shown by FIG. 15K is utilized. The performance feature of FIG. 15K may be utilized in an embodiment of the present invention to provide tempo control, as will be described later. Step 15d-4 determines if the isEngaged attribute is set to TRUE for the object. If it is set to TRUE, then step 15d-6 determines if this is the first key in the armedKey[] array. If it is, then step 15d-12 provides (or turns on) an indicator corresponding to the live key 15a-1 of the object, thus indicating to a user that this live key is armed with an original performance event that needs to be played. It should be noted that this indicator may be provided on a specific channel or network address in an embodiment of the present invention. For example, an instrument providing live key inputs 15a-1 may be set to send and receive on channel x or network address x If so, then live key inputs 15a-1 are received from channel x or network address x, and indicators are provided to the instrument on channel x or network address x This allows indications to be provided independently for each instrument in a multi-user performance, including over networks, as described later. The indicators may also be provided by using designated keyboard depictions on an alphanumeric display, etc. as described herein. Step 15d-14 then sends a note off message on sourceChannel for the default key to the music software object 15a-12. Step 15d-16 then sends a note on message for keyNum (with velocity) on sourceChannel to the music software object 15a-12, and processing finishes. It should be noted that steps 15d-14 and 15d-16 may optionally send these note on/off messages only if the defaultkey is different than keyNum. The designer may prefer this smoother sounding performance effect depending on the embodiment. If in step 15d-6 it is not the first key in the armedKey[] array, then step 15d-18 sends a note on message for keyNum (with velocity) on sourceChannel to the music software object 15a-12, and processing finishes. If in step 15d-4 isEngaged is not TRUE, but instead is FALSE, then step 15d-20 determines if this is the first key in the armedKey[] array. If it is, then step 15d-22 provides (or turns on) an indicator corresponding to the live key 15a-1 as described previously, and processing finishes. If it is not the first key in the armedkey[] array, then processing finishes.

FIG. 15E shows a flow diagram for the service DisArm (keyNum). This service is called for the MelodyPerformerKey object 15a-7, when an original melody performance note off event 15a-2 (keyNum) is received that corresponds to the MelodyPerformerKey object 15a-7. Mapping to the object is also handled by the melody key map 15a-9 or MelodyPerformerKey mapping identifier, as will be described later. Step 15e-2 will remove keyNum from armedKey[] array (if in the array). Step 15e-4 determines if the isEngaged attribute is set to TRUE for the object. If it is set to TRUE, then step 15e-6 determines if this is the only key in the armedkey[] array. If it is not, then step 15e-8 sends a note off message for keyNum on sourceChannel to the music software object 15a-12, and processing finishes. If it is the only key in the armedkey[] array, then step 15e-12 sends a note off message on sourceChannel for keyNum to the music software object 15a-12. Step 15e-14 then sends a note on message with velocity on sourceChannel for the defaultKey attribute (if set). This note on message is also sent to the music software object 15a-12 for processing. Step 15e-16 removes (or turns off) the indicator corresponding to the physical live key 15a-1, thus indicating to a user that this live key is not armed with an original performance event that needs to be played. Step 15e-17 sets isArmedDriverKey to FALSE if not already, and processing finishes. Step 15e-10 (shown by dotted lines) is the optional step mentioned previously when describing FIG. 15C. Although not required, this optional step 15e-10 may be used to update the defaultKey attribute with keyNum (if different). This will allow a note to continue to play even though it has been removed from armedKey[] array, and the corresponding indicator for the live key has been removed (or turned off). When optional step 15e-10 is used, steps 15e-12 and 15e-14 are not used. Steps 15e-16 and 15e-17, however, are still used as described previously, and then processing finishes. If in step 15e-4 isEngaged is not TRUE, but instead is FALSE, then step 15e-18 determines if this is the only key in the armedkey[] array. If it is, then step 15e-20 removes (or turns off) the indicator corresponding to the physical live key 15a-1 as described previously. Step 15e-22 sets isArmedDriverKey to FALSE if not already, and processing finishes. If it is not the only key in the armedkey[] array in step 15e-18, then processing finishes. The net effect of all of the previously described, is that in response to a live key 15a-1 being received (and Engaging a MelodyPerformerKey object 15a-7) a previously recorded key 15a-2 (having armed the MelodyPerformerKey object) will be played (or presented to the music software object 15a-12 as an original performance), and the live keys that are armed will be indicated to a user.

Table 21 lists the Melody Performance Method 15a-18 attributes and services. The attribute melodyPerformerOctave[] identifies the 1st key of the octave where a user wishes to perform a previously recorded performance. It may also hold the last key if desired. It should be noted that, although the term melody performer "octave" is used to describe the present invention, a variety of different key ranges may be used for performance. MelodyPerformerKey[12] is an array of 12 instances of the MelodyPerformerKey objects 15a-7 as described previously, one instance for each key in one octave. The melody key map 15a-9 maps or identifies which MelodyPerformerKey[] instance should be armed with a given original melody performance key 15a-2. The present invention maps all C keys (relative key 0, see FIG. 2) to the 1st MelodyPerformerKey instance, all C sharps to the 2nd instance etc., although a variety of mapping scenarios may be utilized One example of another mapping scenario is to encode a MelodyPerformerKey object identifier into each original note on/off event 15a-2. These identifiers are then read by the software to provide the desired routing to a MelodyPerformerKey object 15a-7. This will allow the melody mapping scenario 15a-9 to be optimized for the particular original melody performance 15a-2 to be effected. Various other on-the-fly routing techniques may also be utilized, as will become apparent to those of ordinary skill in the art. The illustrative mapping scenario described herein, is done by dividing an original melody performance key by 12 and letting the remainder (modulus) identify the instance of MelodyPerformerKey[] 15a-7 that should be armed with that original melody performance key. This enables the original melody performance 15a-2 to be performed from a reduced number of keys. The service SetMelodyPerformerOctave(firstNoteNum) establishes which octave will play the original melody performance by setting melodyPerformerOctave[] attribute to firstNoteNum, and then by setting the default key (and originalDefaultKey) of each MelodyPerformerKey[] instance 15a-7 to be the actual keys of the octave. This is done by calling the SetDefaultKey(n) service of each MelodyPerformerKey[] instance 15a-7. The absolute key numbers of the melody performer octave are stored in an attribute called melodyPerfOctaveArray[12]. In this example, the array would hold the 12 absolute key numbers of the melody performer octave, one for each instance of the 12 MelodyPerformerKey objects 15a-7. The service RcvOriginalMelodyPerformance(keyEvent) receives the previously recorded original melody performance 15a-2 currently designated for the channel. All non note on/off messages (pitch bend, etc.) may be allowed to pass directly to the music software object 15a-12 on sourceChannel. It should be noted that all current status messages are passed directly to the music software object 15a-12 during a performance (see Table 17 for description of current status). Original melody performance 15a-2 note on message for note number x will result in calling the Arm(x) service of MelodyPerformerKey[y] where y is obtained from the melody key map attribute 15a-9 (in the present invention, y=x% 12 where % is the modulus or "remainder from division" operator). For example, note number 24 calls Arm(24) of MelodyPerformerKey[0], while note number 30 calls Arm(30) of MelodyPerformerKey[6]. Similarly, note off message for note number x will result in calling the Disarm(x) service of MelodyPerformerKey[y] where y is determined the same as for note on messages. When a MelodyPerformerKey 15a-7 is armed with a previously recorded note on/off event, then playing the appropriate live key 15a-1 will result in that previously recorded note on/off event being replayed. The attribute sourceChannel holds the default channel for sending all melody section messages to the music software 15a-12. Attribute isDriverOctave is set to TRUE when the melody performer octave is designated as a driver octave and is set to FALSE when it is not. These two attributes are initialized with sourceChannel=cnl, and isDriverOctave=FALSE.

TABLE 21

| Melody Performance Method Attributes and Services |
|---|
| Attributes: |
| 1. melodyPerformerOctave[ ] |
| 2. MelodyPerformerKey[12] |
| 3. Melody Key Maps |
| 4. melodyPerformerOctaveArray[12] |
| 5. sourceChannel |
| 6. isDriverOctave |
| Services: |
| 1. SetMelodyPerformerOctave(firstNoteNum); |
| 2. RcvOriginalMelodyPerformance(keyEvent); |

Tables 22 and 23.

Table 22 shows the six attributes of the ChordPerformerKey object 15a-8 and listing of services. Table 23 lists the Chord Performance Method 15a-16 attributes and services. The Chord Performance Method 15a-16 is carried out using essentially the same processing technique as the Melody Performance Method 15a-18. The services shown by FIGS. 15B through 15E are duplicated except with minor differences. The illustrative chord key map 15a-6 is also carried out the same as the melody key map 15a-9, thus allowing all chords originally performed as 1-4-5, etc. to be played back respectively from a 1-4-5 . . . input controller. Therefore only the processing differences for the Chord Performance Method 15a-16 shall be described below. All of the ChordPerformerKey objects 15a-8 are armed in each instance with a designated BlackMelodyKey colorKeyNum=4 (i.e. absoluteKeyNums 46, 58, etc., see FIG. 2). These absoluteKeyNums will always output the current chord. The original chord performance input 15a-5 is used to determine which ChordPerformerKey 15a-8 to arm with the designated BlackMelodyKey. For example, using the previously described mapping formula, note number 24 calls Arm(58) of ChordPerformerKey[0], while note number 30 calls Arm (58) of ChordPerformerKey[6]. Note off message for note number x will result in calling the DisArm(58) service of ChordPerformerKey[y]. Key number 58 is the designated BlackMelodyKey in this example. Although not required, optional steps 15c-10 and 15e-10 of FIGS. 15C and 15E (shown by dotted lines) may also be utilized in the Chord Performance Method 15a-16. They are carried out using the same steps as described previously by the Melody Performance Method 15a-18. Steps 15d-14 and 15d-16 of FIG. 15D may also be modified as described before. They may send note on/off messages only if the default key is different than keyNum. Adding the previously said three options will provide smoother sounding chord performance. Chord performance may be further improved by using an additional service along with these optional steps (except for 15c-10). Step 15c-10 is eliminated from FIG. 15C when using the additional service described below. The additional service will dynamically update the defaultKey. The additional service is called only when a new ChordPerformerKey 15a-8 is arming itself. Then, the additional service determines if isEngaged=FALSE for the previously armed ChordPerformerKey 15a-8. If it is, then the defaultKey for the previously armed ChordPerformerKey 15a-8 is reset using the originalDefaultKey value (if different). If isEngaged=TRUE for the previously armed ChordPerformerKey 15a-8, then a note off message is sent for the default key, the defaultKey is then reset using the originalDefaultKey value, and a note on message is sent for the new defaultKey. It should be noted that the music software 15a-12 may be duplicated to provide an independent chord section processor, if preferred. This independent processor is used for processing the chord section performance independently of the melody section performance. Both processors will operate according to the same current song key and same current status messages. Normally, pressing keys in the chord section will not initiate chord and scale changes in the melody section under this scenario. A user may then play additional (different) chords along with the chord section performance, if desired With minor modification, the stored current status messages may also be used to make on-the-fly chord assignments for the indicated live chord keys if desired.

TABLE 22

| ChordPerformerKey Attributes and Services |
|---|
| Attributes: |
| 1. isEngaged |
| 2. defaultKey |
| 3. originalDefaultKey |
| 4. velocity |
| 5. armedKey[64] |
| 6. isArmedDriverKey |
| Services: |
| 1. Engage(velocity); |
| 2. Disengage(); |
| 3. Arm(keyNum); |
| 4. DisArm(keyNum); |
| 5. SetDefaultKey(keyNum); |
| 6. IsDriverKeyArmed(); |
| 7. IsArmedDriverKeyPressed(); |

TABLE 23

| Chord Performance Method Attributes and Services |
|---|
| Attributes: |
| 1. chordPerformerOctave[] |
| 2. ChordPerformerKey[12] |
| 3. ChordKeyMaps |
| 4. chordPerformerOctaveArray[12] |
| 5. sourceChannel |
| 6. isDriverOctave |
| Services: |
| 1. SetChordPerformerOctave(firstNoteNum); |
| 2. RcvOriginalChordPerformance(keyEvent); |

Figure 15F:
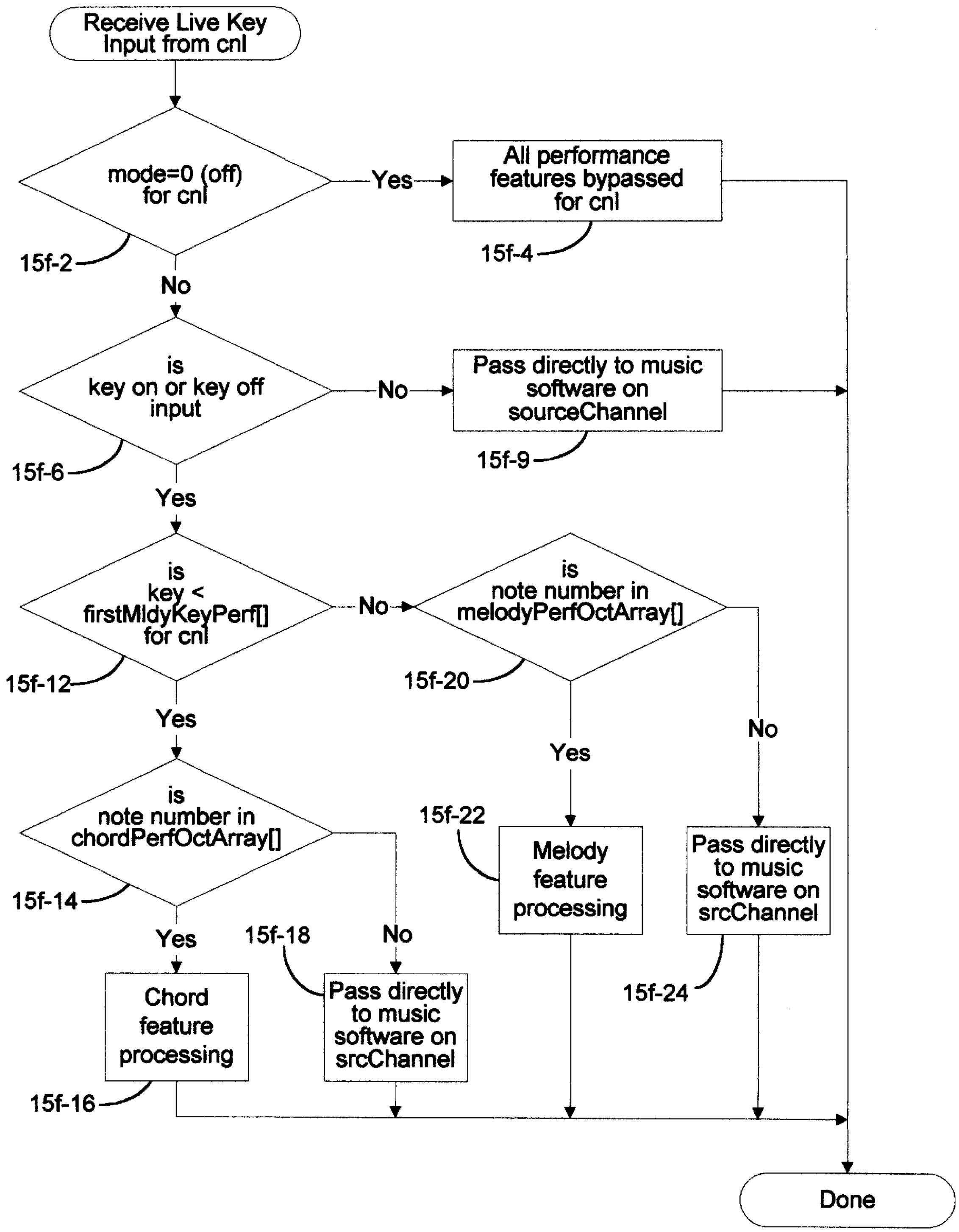
FIG. 15F is a logic flow diagram of the RcvLiveKey (keyEvent) service of the performance function.

FIG. 15F shows a flow diagram for the RcvLiveKey (keyEvent) service listed in Table 24. This service is common to both the Chord Performance Method 15a-16 and Melody Performance Method 15a-18 for the channel. The service responds to live key inputs 15a-1 for the channel and provides key gating 15a-3, 15a-4, and 15a-10. The live key inputs for the channel 15a-1 are received from an input buffer that stores many received events in the order they were received (see Table 18 for description of input buffering). The keyEvent contains the status, note number, channel and velocity information. Step 15f-2 determines if mode=0 (off for cnl). If it is, then all performance features are bypassed for the channel in step 15f-4, and the live key input 15a-1 is passed directly to the music software 15a-12. If it does not equal 0, meaning the mode is on for the channel, then step 15f-6 determines if a key on or key off is input. If a key on or key off is not input (but instead pitch bend, etc.), then step 15f-9 passes the input directly to the music software 15a-12 on sourceChannel, and processing finishes. It should be noted that the sourceChannel will be determined by the performanceMode for cnl. In steps not shown, if performanceMode=1, then the chord method sourceChannel is used. If performanceMode=2, then the melody method sourceChannel is used. If performanceMode=3, then either the chord method sourceChannel, the melody method sourceChannel, or both may be used. The input is duplicated and sent on both sourceChannels when both sourceChannels are used. If a key on or key off is input in step 15f-6, then step 15f-12 determines if the key (MIDI note number) is less than the firstMldyKeyPerf[] setting for the channel 15a-3 (see Table 26 for description of firstMldyKeyPerf[]. If it is less, then step 15f-14 (key gate 15a-10) determines if the note number is in the chordPerfOctaveArray[]. If it is in the chordPerfOctaveArray[], then it is processed by the Chord Performance Method 15a-16 in step 15f-16. Note on messages that are in the chordPerfOctaveArray[], result in calling the Engage(v) service of ChordPerformerKey[r] 15a-8 where v is the velocity and r is the relative key number of the received note on. Similarly note off messages that are in the chordPerfOctaveArray[], result in calling the Disengage() service of ChordPerformerKey[r] 15a-8 where r is the relative key number of the received note off. It should be noted that in some embodiments of the present invention, r may be the position in the chordPerfOctaveArray[] of the received note number. This may be the case when the chordPerfOctaveArray[] holds absolute key numbers which are not in sequential order, using one example. If the note number is not in the chordPerfOctaveArray[], then step 15f-18 passes the note on/off message directly to the music software 15a-12 on the chord method sourceChannel, and processing finishes. If in step 15f-12 it is determined that the key (MIDI note number) is greater than or equal to the firstMldyKeyPerf[] setting for the channel 15a-3, then step 15f-20 (key gate 15a-4) determines if the note number is in the melodyPerfOctaveArray[]. If it is in the melodyPerfOctaveArray[], then it is processed by the Melody Performance Method 15a-18 in step 15f-22. Note on messages that are in the melodyPerfOctaveArray[], result in calling the Engage(v) service of MelodyPerformerKey[r] 15a-7 where v is the velocity and r is the relative key number of the received note on. Similarly note off messages that are in the melodyPerfOctaveArray[], result in calling the Disengage() service of MelodyPerformerKey[r] 15a-7 where r is the relative key number of the received note off. Again, in some embodiments of the present invention r may be the position in the melodyPerfOctaveArray() of the received note number, as described previously. If the note number is not in the melodyPerfOctaveArray[], then step 15f-24 passes the note on/off message directly to the music software 15a-12 on the melody method sourceChannel, and processing finishes.

Figure 15G:
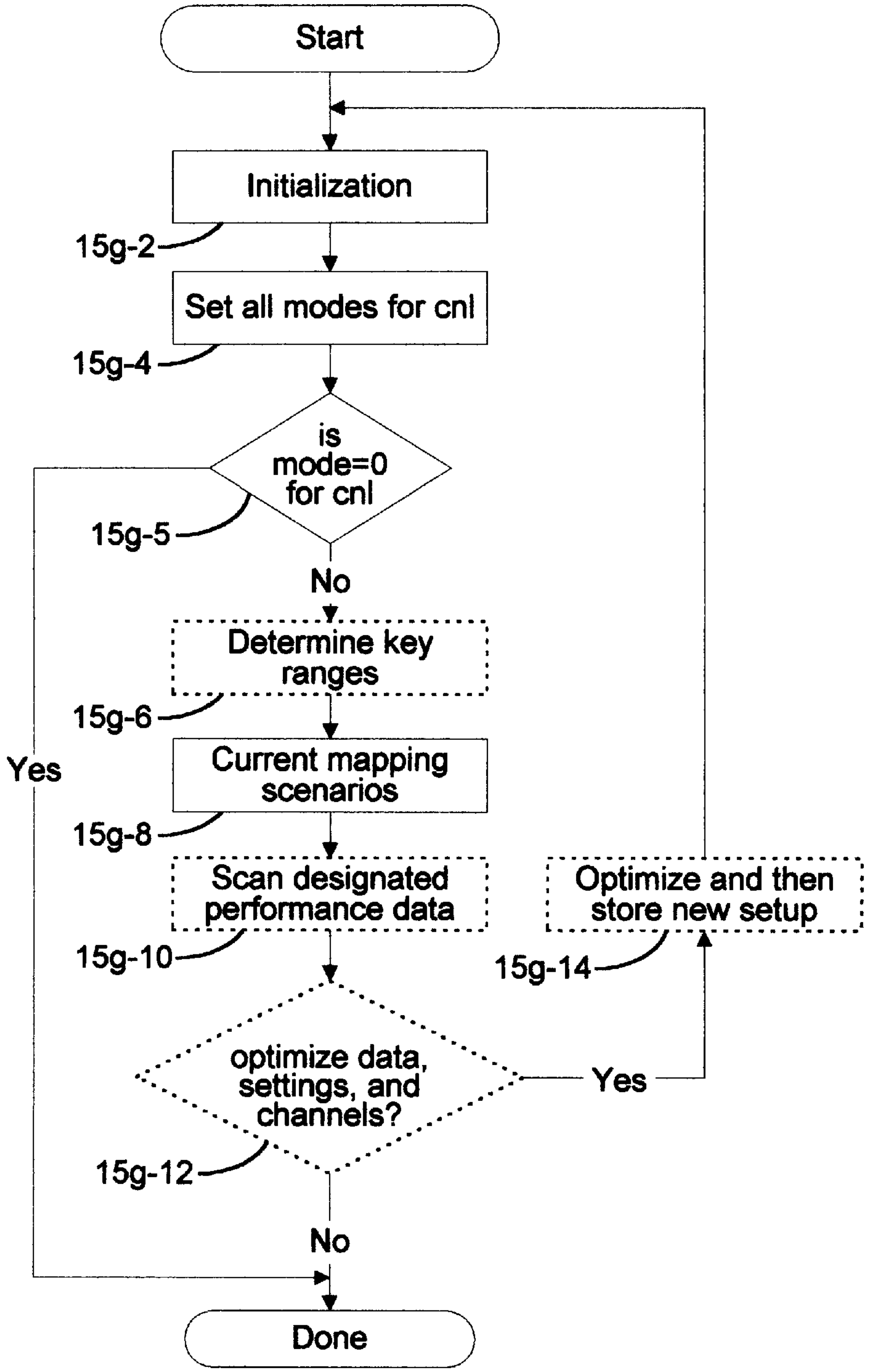
FIGS. 15G through 15J together are a logic flow diagram of mode setting services for the performance function.

FIG. 15G and Tables 24 and 25.

The performance mode settings are common to both the Chord Performance Method 15a-16 and Melody Performance Method 15a-18 for the channel. The service SetMode (newMode) of Table 24 sets the mode. Table 25 shows possible mode setting combinations in one embodiment of the present invention. The mode settings may be simplified or expanded as desired. FIG. 15G is a flow diagram for the service called when the mode is set (i.e. mode index=0, etc.). Step 15g-2 performs the initialization by setting attributes to their initialization values, removing or turning off any indicators, turning off notes, resetting flags, etc. in the usual manner. No original performance data 15a-2 and 15a-5 should be designated for the channel in step 15g-2. Step 15g-4 sets all modes for the channel by calling the appropriate service (FIGS. 15H, 15I, and 15J) and setting each mode according to the mode setting combinations shown in Table 25. Step 15g-5 determines if mode=0 (off) for cnl. If it is, then processing finishes. If it is not, then step 15g-8 determines the current mapping scenario(s). In one presently preferred embodiment of the present invention, a plurality of stored mapping scenarios are available to a user. A mapping scenario will include a PerformerKey[x] array of x instances of the PerformerKey objects. It will also include a performerOctaveArray[x] which includes x absolute key numbers of the performer octave. It will also include a performerOctave[] attribute which includes the lowest absolute key number and highest absolute key number of the performer octave. It will also include a key mapping service for mapping the original performance to the x instances of the PerformerKey objects. Normally when performanceMode=1 (chord performance only), a user may choose to effect a chord performance using any number of input controllers (up to the entire keyboard range) as one example. When performanceMode=2 (melody performance only), a user may also effect a melody performance using any number of input controllers (up to the entire keyboard range, etc.). A mapping scenario which uses the entire keyboard range will include a PerformerKey[128] array of 128 instances of the PerformerKey objects, one for each piano key. It will also include a performerOctave[] attribute which identifies the first key and the last key of the performer octave. The first key is equal to the lowestKey x on the sending instrument. The last key is equal to the highestKey x on the sending instrument. The mapping service for live note on/off event x 15a-1 will call either the engage or disengage service of PerformerKey[x]. Similarly, an original performance note on/off event for note number x 15a-2 and 15a-5 will result in calling either the Arm(x) or DisArm(x) service of PerformerKey[x]. If an original performance note on/off event n is greater than highestKey y, then it will result in calling either the Arm(n) or DisArm(n) service of PerformerKey[y]. If an original performance note message n is less than lowestKey x, then it will result in calling either the Arm(n) or DisArm(n) service of PerformerKey[x]. The original performance may then be played back from any instrument, even if it contains less keys than the original composition instrument. If performanceMode=3 (chord performance and melody performance), then the mapping scenarios available for the chord performance and melody performance are determined by the firstMldyKeyPerf[] setting 15a-3. A designer may know the key ranges and the firstMldyKeyPerf[] setting for the sending instrument. Therefore, all mapping scenarios may be determined and pre-stored as desired. If not, optional step 15g-6 may be utilized (shown by dotted lines). As previously described lowestKey x is the absoluteKeyNum of the lowest key on the sending instrument, and highestKey y is the absoluteKeyNum of the highest key on the sending instrument. These values may originally be set by a user when prompted to press the lowest key and highest key on the keyboard for example. The firstMldyKeyPerf[] array 15a-3 holds setting z for the channel. Setting z may be predetermined or user-selectable. When these three values are determined, then Y−X+1=[totalKeysAvailable], Z−X=[chordKeysAvailable] (not to exceed totalKeysAvailable, negative values=0), Y−Z+1=[melodyKeysAvailable] (not to exceed totalKeysAvailable, negative values=0), chordSectionRange if any=X through Z −1, melodySectionRange if any=Z through Y. These values will allow appropriate mapping scenarios to be made available for the particular sending instrument. For example, the chordKeysAvailable may be 24. Chord bank 24A may then be used for providing chord mapping scenarios as one example. Chord bank 24A will hold a plurality of chord mapping scenarios which allow a user to effect the chord performance using up to 24 keys. It should be noted that the absolute key numbers in chordPerfOctaveArray[], chordPerfOctave[] attribute, and default keys for the ChordPerformerKey objects, are normally adjusted so as to be note numbers in the chordSectionRange (X through Z−1). Similarly, melodyKeysAvailable may be 37. Melody bank 37A may then be used for providing melody mapping scenarios as one example. Melody bank 37A will hold a plurality of melody mapping scenarios which allow a user to effect the melody performance using up to 37 keys. It should be noted that the absolute key numbers in melodyPerfOctaveArray[], melodyPerfOctave[] attribute, and default keys for the MelodyPerformerKey objects, are normally adjusted so as to be note numbers in the melodySectionRange (Z through Y). Optional steps 15g-10, 15g-12, and 15g-14 may be used for performance optimization. A performance may be optimized for the channel or for all channels in step 15g-12. All performance settings for all channels are then stored as a new setup in step 15g-14. Step 15g-2 then performs the initialization as described previously. Step 15g-4 then resets performance settings for selected channels using the setup information stored in step 15g-14. Step 15g-5 determines if mode=0 (off for each channel). If it is off for a channel then processing finishes for the channel. If it is not, then step 15g-8 may determine new mapping scenarios for the channel depending on the optimization process, and processing finishes. A user may save the stored setup to disk, etc. for later recall.

TABLE 24

| Chord Performance and Melody Performance Attributes and Services |
|---|
| Attributes: |
| 1. mode |
| 2. performanceMode |
| 3. tempoControlMode |
| 4. optionalMode |
| Services: |
| 1. RcvLiveKey(keyEvent); |
| 2. SetMode(newMode); |

TABLE 25

Chord Performance and Melody Performance Mode Setting Combinations

| Mode Index | Performance Mode | Tempo Control Mode | Optional Mode |
|---|---|---|---|
| 0 | 0 (off) | 0 (off) | 0 (off) |
| 1 | 1 (chord perf only) | 0 (off) | 0 (off) |
| 2 | 1 | 0 | 1 (indicators only/chord) |
| 3 | 1 | 1 (chord driven) | 0 (off) |
| 4 | 1 | 1 | 1 (indicators only/chord) |
| 5 | 2 (melody perf only) | 0 (off) | 0 (off) |
| 6 | 2 | 0 | 2 (indic. only/melody) |
| 7 | 2 | 2 (melody driven) | 0 (off) |
| 8 | 2 | 2 | 2 (indic. only/melody) |
| 9 | 3 (chord/melody perf) | 0 (off) | 0 (off) |
| 10 | 3 | 0 | 1 (indicators only/chord) |
| 11 | 3 | 0 | 2 (indic. only/melody) |
| 12 | 3 | 0 | 3 (BYPASS chord proc.) |
| 13 | 3 | 0 | 4 (BYPASS mel. proc.) |
| 14 | 3 | 1 (chord driven) | 0 (off) |
| 15 | 3 | 1 | 1 (indicators only/chord) |
| 16 | 3 | 1 | 2 (indic. only/melody) |
| 17 | 3 | 1 | 4 (BYPASS mel proc) |
| 18 | 3 | 2 (melody driven) | 0 (off) |
| 19 | 3 | 2 | 1 (indicators only/chord) |
| 20 | 3 | 2 | 2 (indic. only/melody) |
| 21 | 3 | 2 | 3 (BYPASS chord proc.) |

TABLE 25-continued

Chord Performance and Melody Performance Mode Setting Combinations

| Mode Index | Performance Mode | Tempo Control Mode | Optional Mode |
|---|---|---|---|
| 22 | 3 | 3 (chord/melody driven) | 0 (off) |
| 23 | 3 | 3 | 1 (indicators only/chord) |
| 24 | 3 | 3 | 2 (indic. only/melody) |

Stored mapping scenarios may include different sets of services (FIGS. 15B through 15E and mapping service) in an embodiment of the present invention. The automatic optimization process 15g-12 may be used to call a particular mapping scenario with a different set of services if desired. The mapping scenario is normally called based on the original performance data to be performed. One example of an automatic optimization process, is to encode PerformerKey object identifiers into one or more given performance parts 15a-2 and 15a-5. The identifiers are read by the mapping service and routed to the appropriate PerformerKey object. An identifier is encoded into each note on/corresponding note off event of a given performance part (i.e. 15a-2). The value of the identifier to be encoded, may be based on the interval x between a note on event and the next note on event in the sequence. They may also be encoded based on the interval x between a note off event and the next note on event in the sequence. Note on/offs with intervals of x or less in a particular segment, may be given selected PerformerKey object identifiers. This will allow a difficult to play or "quick" passage to be routed to one or more specific PerformerKeys using the mapping service. These notes may also be encoded manually. It should be noted that with minor modification, a sustained indicator of a different color, type, etc. may be provided to indicate the difficult passage. Note events with short intervals may also be routed based on the range x in which they lie, based on tempo, by using an on-the-fly processing technique, etc. if preferred. Many variations may be utilized and will become apparent to those of ordinary skill in the art. Regardless of the variation used, one or more notes may be said to be automatically sounded based on the interval or intervals between a various plurality of sounded notes in the performance. A different identifier may also be encoded into each note in a particular segment of notes. This is usefull when a small number of input controllers is used to effect the performance. This technique may be used prevent a redundant succession of arming of one PerformerKey for example. Indicators in the selected segment will then jump from key to key instead of arming just one PerformerKey, therefore providing increased user interaction. An original performance may also be mapped according to color key numbers (see FIG. 2) so that notes may be performed from their original note group (i.e. individual chord notes, scale notes, non-scale notes, etc.). It should also be noted that default keys may be different than the absolute key numbers in the performerOctaveArray[], however they should still be kept in the appropriate sectionRange. They may be optimally set to be the mean range of the performance to be effected, as one example. This will provide a smoother sounding overall performance when default keys are played. Also, the sourceChannel for the chord section performance and melody section performance may each be set to a different (and currently unused by system) sourceChannel value. This may be useful when the note ranges of the chord performance 15a-5 (i.e. designated BlackMelodyKey) and the note ranges of the melody performance 15a-2 overlap. Many performance optimization scenarios and mapping techniques will become apparent to those of ordinary skill in the art.

Figure 15H:
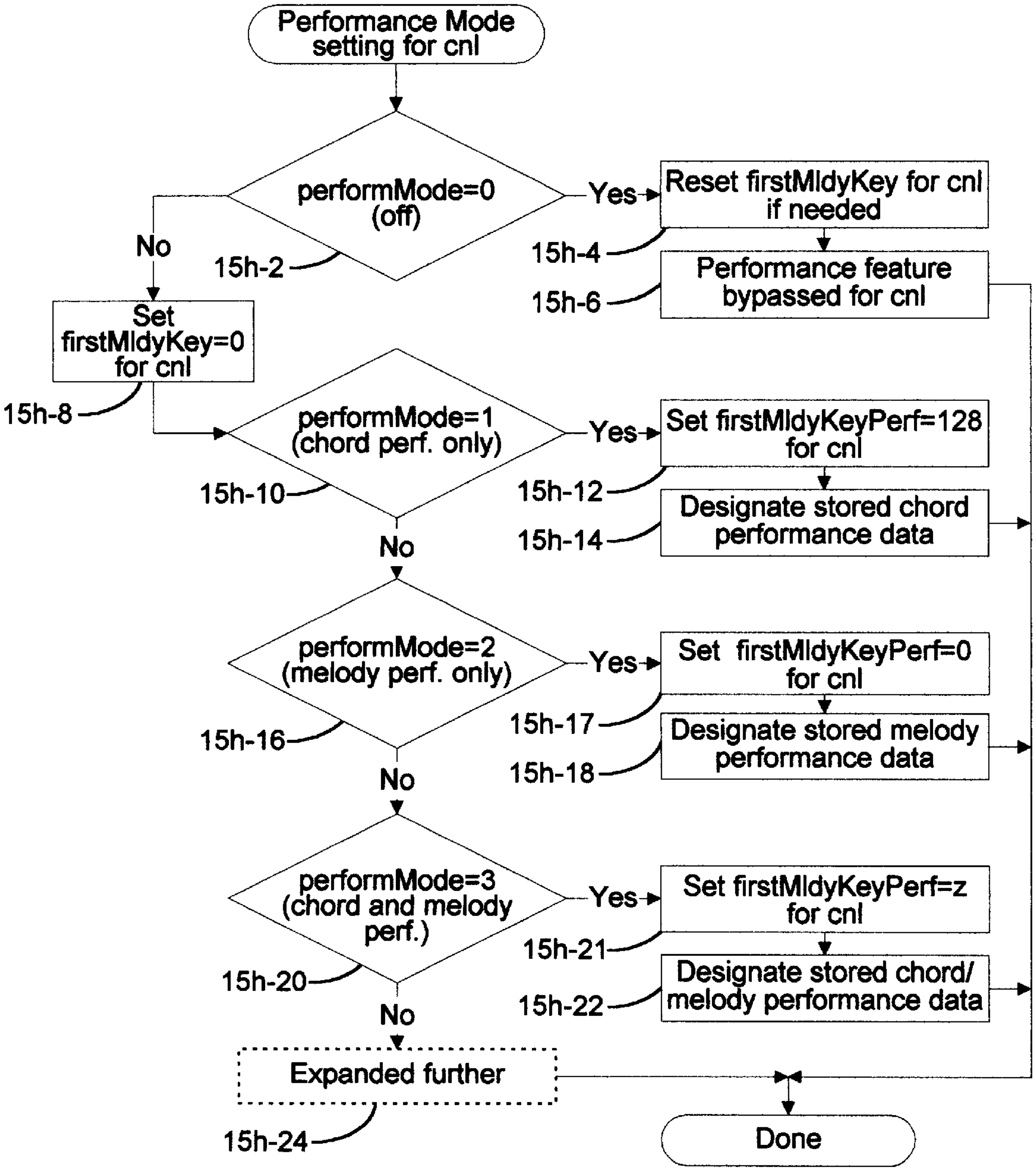

FIG. 15H shows the flow diagram for setting the performanceMode for the channel. FIG. 15A will be referred to while describing the flow diagram. Step 15h-2 determines if performanceMode=(off for cnl). If it is, then step 15h-4 resets firstMldKey[] for cnl (if needed) using the originalFirstMdyKey[] setting for cnl (see Table 26 for description of originalFirstMldyKey[]). The performance feature is bypassed for cnl in step 15h-6, and all live key inputs 15a-1 for cnl are passed directly to the music software 15a-12. If in step 15h-2 performanceMode is not equal to 0, then step 15h-8 sets firstMldyKey[] to 0 for cnl if not already. If performanceMode=1 in step 15h-10, then step 15h-12 sets firstMldyKeyPerf[] to 128 for cnl if not already. Step 15h-14 then designates stored chord performance data 15a-5 to be utilized for performance, and processing finishes. It should be noted that this designated stored performance data 15a-5 may be predetermined or user-selectable. If performanceMode=2 in step 15h-16, then step 15h-17 sets firstMldyKeyPerf[] to 0 for cnl if not already. Step 15h-18 then designates stored melody performance data 15a-2 to be utilized for performance as described previously, and processing finishes. If performanceMode=3 in step 15h-20, then step 15h-21 sets firstMldyKeyPerf[] to Z for cnl if not already (Z may be predetermined or user-selectable). Step 15h-22 then designates stored melody performance data 15a-2 and stored chord performance data 15a-5 to be utilized for performance as described previously, and processing finishes. Step 15h-24 shows a possible expansion of performance modes. One example of this is to use two Melody Performance Methods 15a-18 for the channel. Two Chord Performance Methods 15a-16 may also be used for the channel. With minor modification, two or more Chord Performance Methods 15a-16 and two or more Melody Performance Methods 15a-18 may be used for the channel. Combinations of these are also possible (i.e. 2 melody methods/1 chord method, etc.). A simplified "indicators only" mode may be used to indicate a performance as originally played. The original performance data 15a-2 and 15a-5 would then be used only to provide indicators on the instrument. All other processing by the performance methods 15a-16 and 15a-18 would be bypassed, and live key inputs 15a-1 would be passed directly to the music software 15a-12.

Figure 15I:
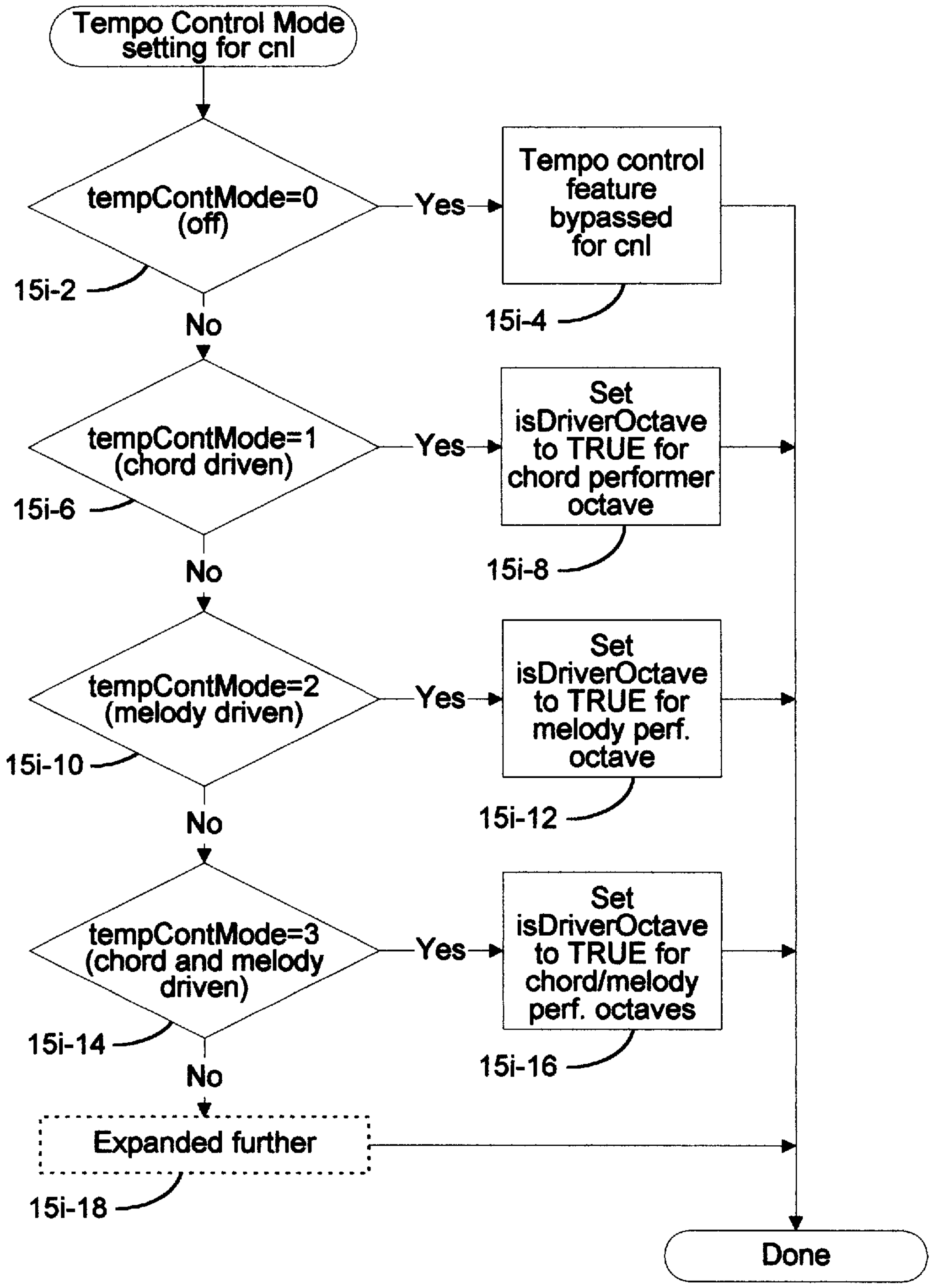

FIG. 15I shows a flow diagram for setting the tempoControlMode for the channel. Tempo control is an additional feature described later by FIG. 15K. If tempoControlMode=0 (off for cnl) in step 15i-2, then the tempo control feature is bypassed for cnl in step 15i-4, and processing finishes. If tempoControlMode=1 in step 15i-6, then step 15i-8 sets isDriverOctave to TRUE for chord performer octave and processing finishes. If tempoControlMode=2 in step 15i-10, then step 15i-12 sets isDriverOctave to TRUE for melody performer octave and processing finishes. If tempoControlMode=3 in step 15i-14, then step 15i-16 sets isDriverOctave to TRUE for both the melody performer octave and chord performer octave, and processing finishes. Step 15i-18 shows a possible expansion of tempo control modes. As one example, the channel may be expanded to include more than one Chord Performance Method 15a-16, or Melody Performance Method 15a-18, as described previously. A user may then be allowed to designate selected performer octaves as driver octaves, etc.

Figure 15J:
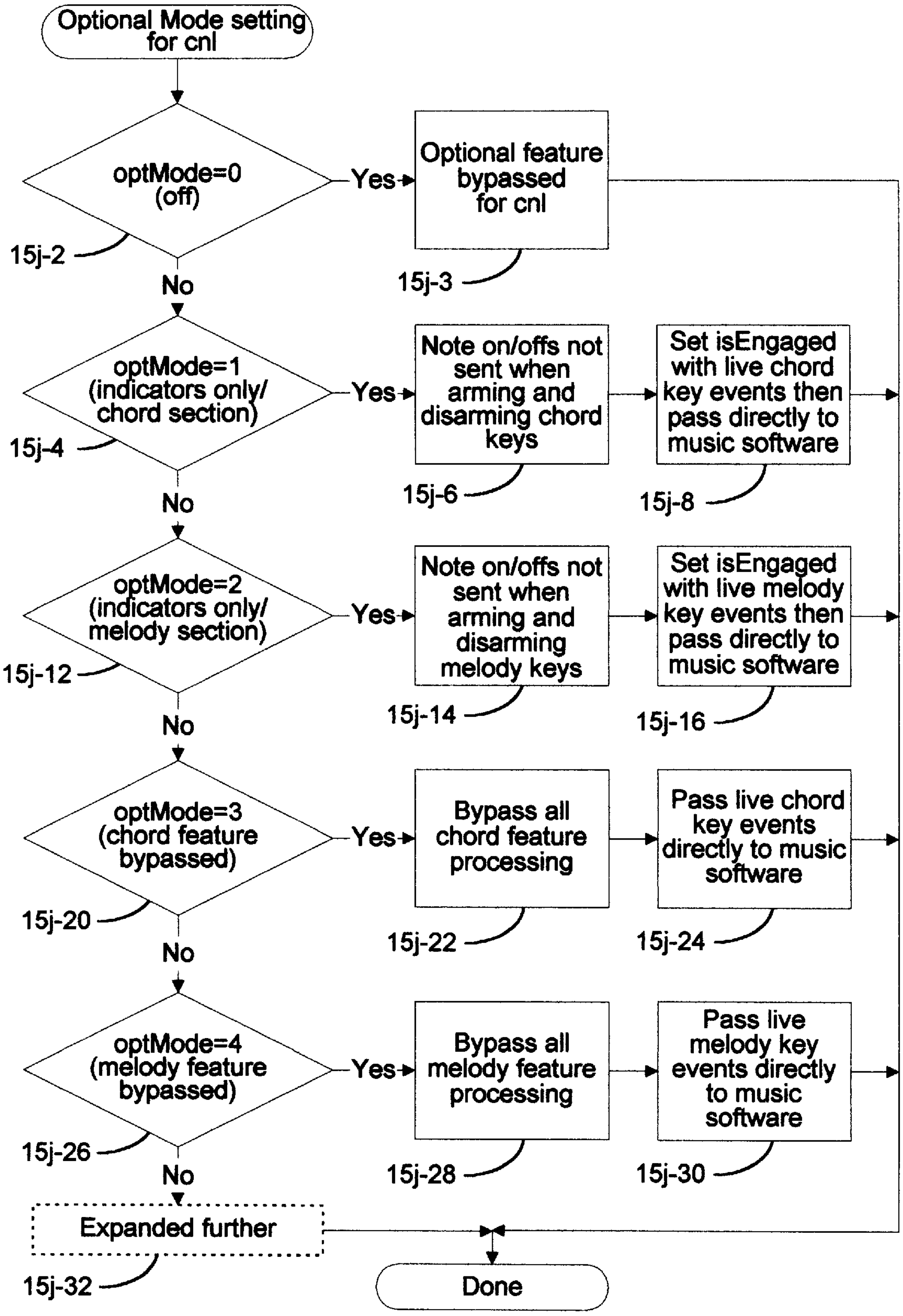
Figure 15K:
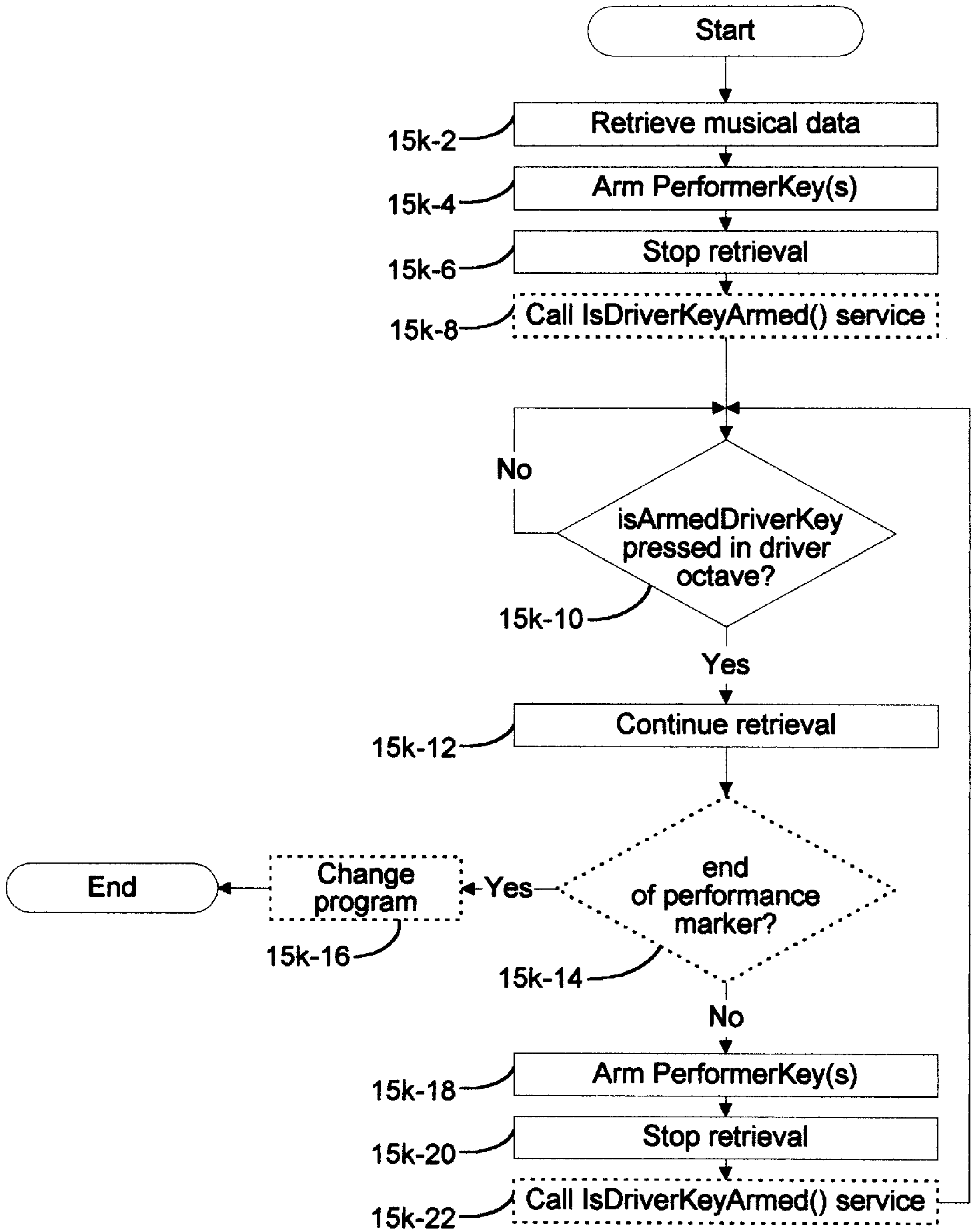
FIG. 15K is a logic flow diagram of a tempo control feature of the performance function.

FIG. 15J shows a flow diagram for setting the optionalMode for the channel. FIG. 15A will be referred to while describing the flow diagram. If optionalMode=0 (off for cnl) in step 15j-2, then the optional feature is bypassed for cnl in step 15j-3, and processing finishes. If optionalMode=1 in step 15j-4, then note on/off messages are not generated and sent when arming and disarming ChordPerformerKey objects in step 15j-6. To accomplish this, the services Arm and DisArm (FIGS. 15D and 15E) are modified not to send any note on/off messages. Non note on/off messages (pitch bend, etc.) in the original chord performance 15a-5 are not sent to the music software 15a-12. In step 15j-8, live chord key events in the chord performer octave are used only to set the isEngaged attribute, and then are passed directly to the music software 15a-12 on chord method sourceChannel. Note on/off messages are not generated and sent by the Engage and Disengage services (FIGS. 15B and 15C/requires minor modification to these services). All live chord key events not in the chord performer octave are passed directly to the music software 15a-12 on chord method sourceChannel, and processing finishes. If optionalMode=2 in step 15j-12, then note on/off messages are not generated and sent when arming and disarming MelodyPerformerKey objects in step 15j-14. To accomplish this, the services Arm and DisArm (FIGS. 15D and 15E) are modified not to send any note on/off messages. Non note on/off messages (pitch bend, etc.) in the original melody performance 15a-2 are not sent to the music software 15a-12. In step 15j-16, live melody key events in the melody performer octave are used only to set the isEngaged attribute, and then are passed directly to the music software 15a-12 on melody method sourceChannel. Note on/off messages are not generated and sent by the Engage and Disengage services (FIGS. 15B and 15C/requires minor modification to these services). All live melody key events not in the melody performer octave are passed directly to the music software 15a-12 on melody method sourceChannel, and processing finishes. If optionalMode=3 in step 15j-20, then step 15j-22 bypasses all Chord Performance Method processing 15a-16 (including indicators). All live chord key events are passed directly to the music software on chord method sourceChannel in step 15j-24, and processing finishes. If optionalMode=4 in step 15j-26, then step 15j-28 bypasses all Melody Performance Method processing 15a-18 (including indicators). All live melody key events are passed directly to the music software on melody method sourceChannel in step 15j-30, and processing finishes. Step 15j-32 shows a possible expansion of optional modes.

Table 26 shows the performance method attributes common to all performance channels. This table will be described while referring to FIG. 15A. The attribute originalFirstMldyKey[16] holds the current firstMldyKey [16] settings for each channel (See Table 16 for description of firstMldyKey[] attribute). As previously described, firstMldyKey[] attribute will be set to 0 when mode is set greater than 0 for the channel. The originalFirstMldyKey[] setting for the channel is not changed when mode is set greater than 0 for the channel. It is then used to reset the firstMldyKey[] attribute back to its original setting for the channel, when mode is set to 0 for the channel. The attribute firstMelodyKeyPerformance[16] 15a-3 identifies the first melody key for each performance input channel. All live key events 15a-1 for the channel which are less than the first-MldyKeyPerf ] setting for the channel, are interpreted as a chord section performance. All live key events 15a-1 for the channel which are greater than or equal to the firstMldyKeyPerf[] setting for the channel, are interpreted as a melody section performance.

TABLE 26

| Performance Method Attributes (common to all performance channels) |
|---|
| Attributes: |
| 1. originalFirstMldyKey[16] |
| 2. firstMelodyKeyPerformance[16] |

The previously described performance methods of the present invention may be utilized on multiple performance channels. Tables 20 through 25 as well as the performance processing shown by FIGS. 15A through 15J are simply duplicated for each performance channel. This will allow simultaneous multi-user performance on multiple channels. Each user may select one or more given performance parts, thus allowing multiple users to cumulatively effect a given performance, possibly along with stored playback tracks. At least one user in the group may perform in bypassed mode as described herein, thus allowing traditional keyboard play, drum or "percussion" play (possibly along to indications), etc. Those of ordinary skill in the art will recognize that a percussion performance may be effected along to indications in a variety of ways. The array arming techniques of the present invention, as well as drum maps for mapping a note number to a particular drum sound, known in the art, etc. may all be used. The present invention allows one or more users to re-perform an original user composition. An original user composition is defined herein to mean an original work, originally performed and recorded by one or more users using a fixed-location type musical method known in the art. It may then possibly be re-performed by one or more users using the present invention. An embodiment of the present invention may be optimized for single user performance, or for simultaneous multi-user performance.

FIG. 15K shows a flow diagram for one embodiment of an additional performance feature of the present invention. This feature is common to all performance channels. However, it may also be used in simplified systems including one instrument systems, etc. The method shown allows a user to control the tempo of a performance based on the rate at which a user performs one or more indicated keys. This provides creative tempo control over a performance, even while using the improvisational and mapping capabilities as described herein. What this method does is control the rate at which the indicators are displayed for the live keys 15a-1. In the embodiment shown, this is accomplished by controlling the rate at which the stored original performance 15a-2 and 15a-5 is received by the performance methods 15a-16 and 15a-18. Markers are included in the stored original performance 15a-2 and 15a-5 at predetermined intervals in the sequence. The markers may then be used to effectively "step through" the performance at the predetermined intervals. An end-of-performance marker may be included at the end of the longest stored performance. It should be noted that in a presently preferred embodiment, all marker data is normally stored in a separate storage area than that of the original performance data 15a-2 and 15a-5. When tempoControlMode=1 (chord driven mode), a chord section performance is used to control the tempo. When tempoControlMode=2 (melody driven mode), a melody section performance is used to control the tempo. When tempoControlMode=3 (chord driven and melody driven mode), both a chord section performance and a melody section performance are used to control the tempo. Processing commences after all performance modes have been set (see FIG. 15G), and tempoControlMode=1, 2, or 3 (see Table 25 for mode combinations). Processing may commence automatically or in response to a user-selectable input (i.e. play button on the user interface being selected, etc.). Step 15k-2 begins by retrieving the stored musical data 15a-2, 15a-5, and marker data at a predetermined rate. The stored musical data may include notes, intentional musical pauses, rests, etc. Step 15k-4 arms one or more PerformerKeys in the usual manner until a marker is received. Step 15k-6 stops the retrieval of the musical data when the marker is received. Step 15k-10 determines if an isArmedDriverKey is pressed in an isDriverOctave. This is done by calling the IsArmedDriverKeyPressed() service for each instance of PerformerKey[] (all channels) where isDriverOctave=TRUE and isArmedDriverKey=TRUE. This service will return True (1) where isDriverOctave=TRUE, isArmedDriverKey=TRUE, and isEngaged=TRUE for the PerformerKey object. It will return False (0) where isDriverOctave=TRUE, isArmedDriverKey=TRUE, and isEngaged=FALSE for the PerformerKey object. Step 15k-10 effectively performs a continuous scan by calling the IsArmedDriverKeyPressed() service repeatedly as necessary until a first value of True (1) is returned for a first PerformerKey. This will indicate that a user has pressed an indicated live key 15a-1 (isArmedDriverKey=TRUE) which is currently designated as a driver key (isDriverOctave=TRUE). When a value of True (1) is returned, execution then proceeds to step 15k-12. Step 15k-12 retrieves the next segment of stored musical data 15a-2, 15a-5, and marker data at a predetermined rate. Step 15k-18 arms one or more PerformerKeys in the usual manner until a next marker is received Step 15k-20 stops the retrieval of the musical data when the previously said next marker is received Step 15k-10 determines if an isArmedDriverKey is pressed in a driver octave as before, and then processing continues as before until there is no more musical data left to retrieve. If end-of-performance markers are used, step 15k-14 will terminate the performance when an end-of-performance marker is received. Optional step 15k-16 may be used to change the program at the end of a given performance. This is useful when mapping scenarios are to be changed automatically for the performance, using one example. This allows the performance to be made progressively harder, improvisational parts may be added and indicated, harmonies may be added, etc. Those of ordinary skill will recognize that an embodiment of the present invention may allow a user to terminate a performance at any time. A performance may also be auto-located to predetermined points in the given performance, as is well known in the art. A temporary bypass may also be provided. This will allow a user to improvise as desired before continuing to advance the performance using the indicated keys.

Optional steps 15k-8 and 15k-22 (shown by dotted lines) may also be used in an embodiment of the present invention. These steps are used to verify that at least one driver key is currently indicated (armed). These optional steps may be useful in an embodiment of the tempo control method which is used to start and stop a common sequencer, for example. In an embodiment of this type, markers are not required Instead, start and continue commands are sent in steps 15k-2 and 15k-12, respectively. Stop commands are sent in steps 15k-6 and 15k-20. These start and stop commands are internal to the software and do not result in notes being turned off or controllers being reset. When arming data 15a-2 and 15a-5 is received in step 15k-4 for a first PerformerKey (where isDriverOctave=TRUE), a note count, tick count, or timer (not shown) commences. After a predetermined number of ticks, notes, or time has expired, a stop command is then sent in step 15k-6 to effectively stop retrieval of the musical data. This note count, tick count, or timer is also carried out in step 15k-18. Optional steps 15k-8 and 15k-22 are used to call the IsDriverKeyArmed() service for each instance of PerformerKey[] (all channels) where isDriverOctave=TRUE. This service will return True (1) where isDriverOctave=TRUE and isArmedDriverKey=TRUE for the PerformerKey object. It will return False (0) where isDriverOctave=TRUE and isArmedDriverKey=FALSE for the PerformerKey object. If a value of False (0) is returned for each PerformerKey object, then the next segment of stored musical data 15a-2, 15a-5, and marker data is retrieved at a predetermined rate. One or more PerformerKeys are armed in the usual manner as described previously until a next marker is received. The retrieval of the musical data is then stopped when the previously said next marker is received. The IsDriverKeyArmed() service is then called again for each instance of PerformerKey[] as described previously. Processing continues in this manner until a value of True (1) is returned for a PerformerKey object. Execution then proceeds to step 15k-10 and processing is carried out in the usual manner. It should be noted that data may also be retrieved until the next arming note is received 15a-2 and 15a-5 (where isDriverOctave=TRUE) instead of retrieving data until the next marker is received. The previously described start/stop action of a sequencer may be used in one embodiment of the present invention. It should be noted that many modifications and variations of the start/stop method of the present invention may be utilized, and will become apparent to those of ordinary skill in the art.

As one example of a start/stop variation, a tempo offset table (not shown) is stored in memory for use with the tempo control method of the present invention. Each tempo offset value in the table has a corresponding timer value. An attribute called originalTempoSetting holds the original tempo of the performance when first begun. An attribute called currentTempoSetting holds the current tempo of the performance. An attribute called currentTimerValue holds the time at which a driver key is pressed as determined in step 15k-10. These attributes are initialized with currentTimerValue=0, originalTempoSetting=x, and currentTempoSetting=x, where x may be predetermined or selected by a user. A timer (not shown) is reset (if needed) and started just prior to step 15k-10 being carried out. When in step 15k-10 it is determined that an armed driver key is pressed in a driver octave as described previously, the current time of the timer is stored in the attribute currentTimerValue. The currentTimerValue is then used to look up its corresponding tempo offset in the tempo offset table. It should be noted that retrieval=rates and actual tempo values may also be stored in a tempo lookup table. Step 15k-12 then uses this corresponding tempo offset value to determine the current tempo setting of the performance. This is done by adding the tempo offset value to the currentTempoSetting value. This determined tempo is then stored in the current- TempoSetting attribute, replacing the previous value. The currentTempoSetting is then used in step 15k-12 to control the rate at which original performance data 15a-2 and 15a-5 is retrieved or "played back". This will allow a user to effectively increase the tempo of a given performance, based on the rate at which a user performs one or more indicated keys. A user may also effectively decrease the tempo of a given performance, based on the rate at which a user performs one or more indicated keys. Normally, lower currentTimerValues will increase the tempo (i.e. using positive tempo offsets). Higher currentTimerValues will decrease the tempo (i.e. using negative tempo offsets). This will allow indicators to be displayed in accordance with an intended song tempo, while still allowing creative tempo control. Predetermined currentTimerValues may also use the originalTempoSetting or currentTempoSetting for setting the new currentTempoSetting. This will allow the tempo to be defaulted back to an original tempo setting or current tempo setting if the currentTimerValue is very high or very low, as one example. Many modifications and variations to the previously described may be made, and will become apparent to those of ordinary skill in the art.

In one embodiment of the performance methods described herein, a CD or other storage device may be utilized for effecting a performance. Some or all of the performance information described herein, may be stored on an information track of the CD or storage device. A sound recording may also be included on the CD or storage device. This will allow a user to effect a given performance, such as the melody line of a song, along with and in sync to the sound recording. To accomplish this, a sync signal may be recorded on a track of the CD. The software then reads the sync signal during CD playback, and locks to it. The software must be locked using the sync signal provided by the CD. This will allow data representative of chord changes and/or scale changes stored in the sequencer, to be in sync with those of the sound recording track on the CD during lockup and playback. This may require the creation of a sequencer tempo map, known in the art. The performance information stored on the CD may be time-indexed and stored in such a way as to be in sync (during lockup and playback), with the performance information stored in the sequencer. It may also be stored according to preference. Optionally, the CD may contain only a sync signal, along with the sound recording. The sync signal is then read by the software, and all music processing will take place completely within the software as described herein. The data representative of chord changes and/or scale changes stored in the sequencer, will still need to be in sync and musically-correct (during lockup and playback), with the chord changes in the sound recording of the CD.

The setup configuration data described herein may also be stored on the CD or selected storage device. It is then read by the software on playback, to cause real-time selection of a setup configuration before the sound recording and given performance begins. Various needed performance data for each song may be recorded as a data dump on an information track of the CD. The data dump is then read by the software before re-performance begins. This allows all needed performance data for each song on the CD, to be loaded into memory and indexed. A song selection signal is then stored at the beginning of each song on the CD, on an information track. The song selection signal is then read by the software before a given performance of each song commences. This allows all corresponding data needed for each song, to be accessed from memory for proper performance. Each CD is then self-contained. All of the appropriate data needed for performance of each song on the CD is included.

It should be noted that data representative of indicator information, may also be recorded on a CD which includes a sound recording. The CD may also have a recorded information track containing data representative of chord and scale changes, known in the art. The original performance information may be merged with the data representative of chord and scale changes, and recorded on one track of the CD. Optionally, the various information may be recorded using more than one CD track. The chord and scale change data is recorded on the CD in such a way as to be in sync, and musically correct, with the chord and scale changes contained in the sound recording on the CD. The indicator information may then be recorded on an information track of the CD, so as to be in sync with the data representative of chord changes and scale changes. It is also recorded in sync with the sound recording on the CD. This allows a given performance as described herein to be effected using such known systems, without the need for the recorded synchronization track described herein to be present on the CD.

FIGS. 16A through 16F

Figure 16A:
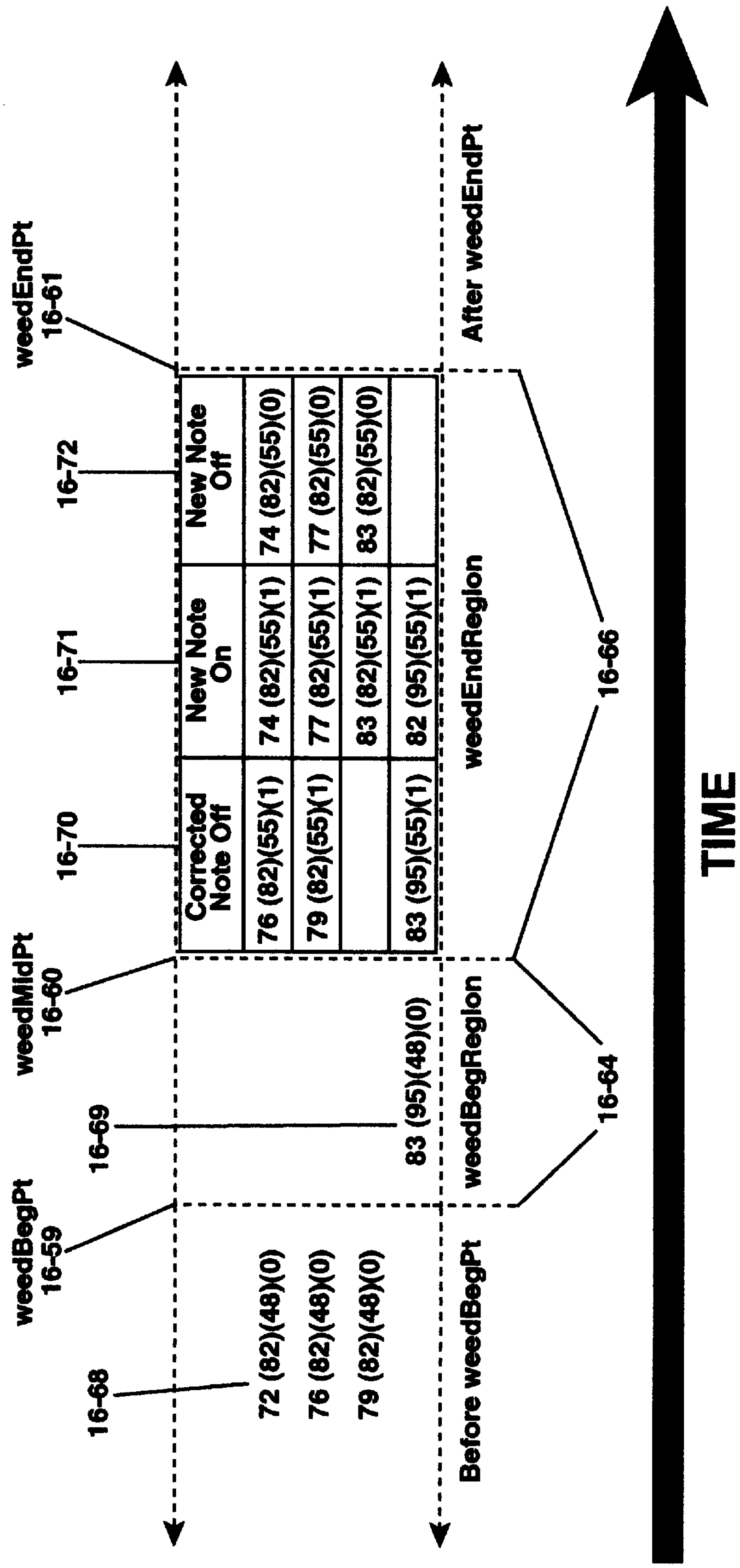
FIG. 16A is a general overview depicting the weedout function of the present invention.

FIG. 16A shows a general overview of one embodiment of the weedout function of the present invention. The selected embodiments of auto-correction described herein by the present invention, can allow one or more notes to play through a chord and/or scale change occurrence, while one or more other notes are turned off and/or turned on. The weedout function of the present invention can be used to modify one or more possibly undesirable notes, which correspond to real-time events representative of chord and/or scale changes. The chord and/or scale changes as described herein by the present invention, can be initiated in a variety of ways. When utilizing auto-correction, a specific real-time event representative of at least a chord and/or scale change will become apparent to a user during a given performance, as one or more notes are automatically corrected. Various embodiments of the weedout function described herein, can be performed automatically and/or on-the-fly, such as during or after a performance is recorded or stored. The weedout function can also be performed at a user's discretion, such as through a selection from a user interface, etc. It is usually performed either on a range of chord or scale changes, or only on specific chord or scale changes. As previously described herein, the service CorrectKey( ) is called in response to a change in the current chord or scale while the key is on (keyOnFlg=1). This enables the key to correct the notes it has sent out for the new chord or scale. The notes shown in FIG. 16A (without parenthesis), represent processed performance notes of a recorded or stored performance. In this example, a chord and scale change have occurred at 16-60. Various corrected note off events are then generated and stored at 16-70, which correspond to the corrected note on events shown by 16-68 and 16-69. Various new note on events are then generated and stored at 16-71, and various new note off events which correspond to the new note on events, have been provided and stored at 16-72, with each group being stored in the order shown. When utilizing this embodiment of the weedout function, three additional bytes (shown in parenthesis) are encoded into each processed note on event, and into each processed note off event generated by each key (absoluteKeyNumber). If a chord performance and melody performance are to be recorded or stored together, it is currently preferred to encode only processed note on/off events generated by the melodyKeys. Processed note on/off events generated by the chordkeys are ignored during the weedout process. The first byte shown is equal to absoluteKeyNumber (called absoluteWeedKey). The second byte is equal to the current chordkey being played (called chordKeyWeed). This chordkey value (0–127) is stored as chordKeyWeed when a chordkey is pressed (chordKeyWeed default at startup is a Major "1" chord, i.e. 48, assuming melody section also uses default of 48). The chordKeyWeed value is updated each time a new chordkey is pressed, and the chordKeyWeed value is encoded into each processed note on/off event produced by the melodyKeys (chordkeys optional), including input on multiple channels. Optionally, the chordKeyWeed value may also be encoded into all original performance events (absoluteKeyNumber) as well, for utilization in other embodiments of the present invention. On embodiments utilizing multiple key presses, a different chordkey value can be sent for each key press combination. This allows each key combination to have its own chordKeyWeed value. When the CorrectKey( ) service is called for a key, the chordKeyWeed value is encoded into each corrected note off event 16-70 (FIG. 16A), and into each new note on event 16-71 sent out, if any. The third byte is used to identify an event as either a non-corrected event (notCor=0), or a corrected event (isCor=1). The corrected event identifier isCor (=1), is encoded into any corrected note off event(s) 16-70 and/or new note on event(s) 16-71, sent out as a result of calling the service CorrectKey( ). Otherwise a non-corrected event identifier notCor (=0) is encoded into each processed note on/off event sent out. It should be noted that these three additional bytes are encoded only in data internal to the software. They are not included in data streams output to a sound source.

Figure 16C:
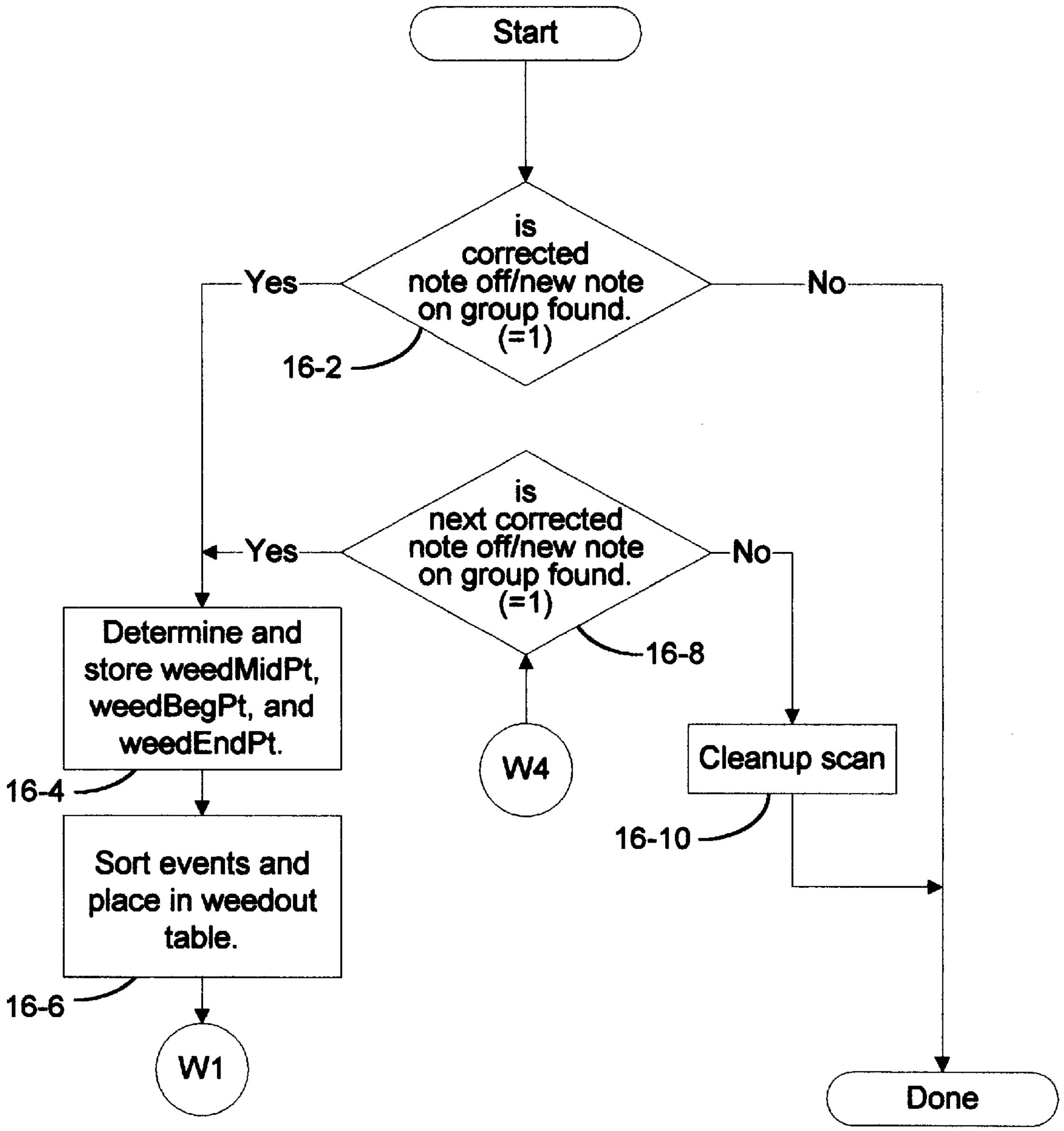
FIGS. 16C through 16F together are a logic flow diagram of the weedout function.

FIGS. 16C through 16F show a flow diagram for one embodiment of the weedout function of the present invention. The weedout process is normally performed on one selected storage area or "track" at a time. The routine is run more than once if there are additional selected storage areas or "tracks" requiring weedout. Referring first to FIG. 16C, step 16-2 traces forward through the selected storage area or "indexed event list" starting at the beginning. If no corrected note off event or new note on event (I) is found in the event list, then processing finishes (possibly proceeding to a next selected storage area). If a first corrected note off event or new note on event (1) is found in step 16-2, then its index is stored as currentWeedIndex. Step 16-4 then stores the indexed note event's chordKeyWeed value as currentWeedGroup. The location of the indexed note event is determined and stored as weedMidPt (FIG. 16A 16-60). The weedMidPt 16-60 location value is normally determined according to tick resolution, timing byte(s), time out message(s), measure marker(s), etc., all of which are well known in the art and apparent to those of ordinary skill. Step 16-4 (FIG. 16C), then determines and stores the weedBeginningPt (FIG. 16A 16-59), and the weedEndPt 16-61 (weedMidPt−weedBeginningRegion=weedBeginningPt, and weedMidPt+weedEndRegion=weedEndPt). Normally, the weedBeginningRegion 16-64, and weedEndRegion 16-66, can be set by a user from the user interface. For example, on a 480 tick-per-quarter note sequencer, an eighth note range (240 ticks), a sixteenth note range (120 ticks), etc. can each be used as values for the weedBeginningRegion 16-64, and the weedEndRegion 16-66. Optionally, the weedBeginningRegion 16-64, and the weedEndRegion 16-66, may be generated by calling a service (i.e. WeedRegionSettings()). This allows the weedBeginningRegion 16-64, and the weedEndRegion 16-66, to be based on a style of play occurring before a given chord or scale change, for example. One example of this is to determine the location(s) of a selected note on event or note on events occurring before a given chord or scale change occurrence (such as in a measure). Intervals between note on events, or between a selected note on event and the chord or scale change occurrence, then be calculated and averaged. This will give a good indication of a user's particular style of play before the occurrence of the chord or scale change. The weedBeginningRegion 16-64, and the weedEndRegion 16-66, may be set based on this style of play, etc. Also, these region values may be automatically adjusted based on an adjustment in the current tempo of a song. As the tempo is increased, the regions will increase by a specified amount, and vice versa It should be noted that the weedEndRegion 16-66 (FIG. 16A), should always be set to a value large enough so as to include at least all corrected note off events 16-70, and all new note on events 16-71, which are sent out as a result of a given chord or scale change 16-60. The size of the weedEndRegion 16-66 that is actually required, may vary depending on the system in which the weedout function of the present invention is utilized. Many variations of weedout range adjustment, and weedout range determination are possible, and will become apparent to those of ordinary skill in the art.

After completing step 16-4 (FIG. 16C), step 16-6 then copies into an array the indexed note event, as well as all other note events that reside in the area up to the weedEndPt 16-61 (shown as weedEndRegion 16-66, FIG. 16A). Each note event's location is also determined and stored in the array, along with its respective note event. Note events and their determined locations are then sorted and placed in a table as illustrated by FIG. 16B (determined locations and various other note event data are not shown). The array is sorted, and note event(s) and their respective location(s) are placed in the table as follows . . . Only note events with a chordKeyWeed value equal to the currentWeedGroup value, as well as a corrected status byte=1 are placed in the table, as shown in FIG. 16B. When the first note event meeting these first two criteria is found in the array, its absoluteWeedKey value is stored as tempWeedKey. Its absoluteWeedKey value is also placed in an array called tempWeedKeyArray[]. The note event and its determined location are then placed in column 16-82 if it is a note off event, and 16-84 if it is a note on event. Tracing commences for the next note event which meets the first two matching criteria, as well as a third criteria in which its absoluteWeedKey value must equal the current tempWeedKey value. If found, this next note event as well as its determined location, are placed as before in the table according to whether it is a note off event 16-82, or a note on event 16-84. This process repeats until no more note events are found in the array meeting these three criteria 16-86. Then, the array is scanned again from the beginning for a next note event meeting the first two previously said criteria, as well as one additional criteria . . . The note event's absoluteWeedKey value must not equal any of the absoluteWeedKey value(s) stored in tempWeedKeyArray[] 16-88. If a note event is found meeting the previously said criteria, then its absoluteWeedKey value is added to the tempWeedKeyArray[]. Its absoluteWeedKey value is also stored in tempWeedKey, replacing the previous value. Its note event and its determined location are placed in the next available empty row of the table 16-88, as well as in the appropriate column of the table, as described previously. As shown in FIG. 16B, this sometimes leaves empty spaces, wherein a corrected note off event may have no corresponding new note on event, or a new note on event may have no corresponding corrected note off event. Tracing commences for the next note event which meets the first two matching criteria, as well as a third criteria in which its absoluteWeedKey value must equal the current tempWeedKey value. If found, this next note event as well as its determined location, are placed as before in the table according to whether it is a note off event 16-82, or a note on event 16-84. The previously described process keeps repeating until all appropriate note events are placed in the table as shown. The table should never include note events with non-matching currentWeedGroup values 16-86 and 16-88. Also, all note events should be corrected note events (1). It should be noted that corrected note off events in the table 16-82, if any, may also be matched with a closest possible new note on event 16-84, if any (but only if they have matching absoluteWeedKeys). This allows for smoother playback after the weedout process is performed. The table previously created is referenced in order to perform editing in the current weedout region of the storage area (FIG. 16A). Processing now proceeds with W1 (FIG. 16D).

Figure 16D:
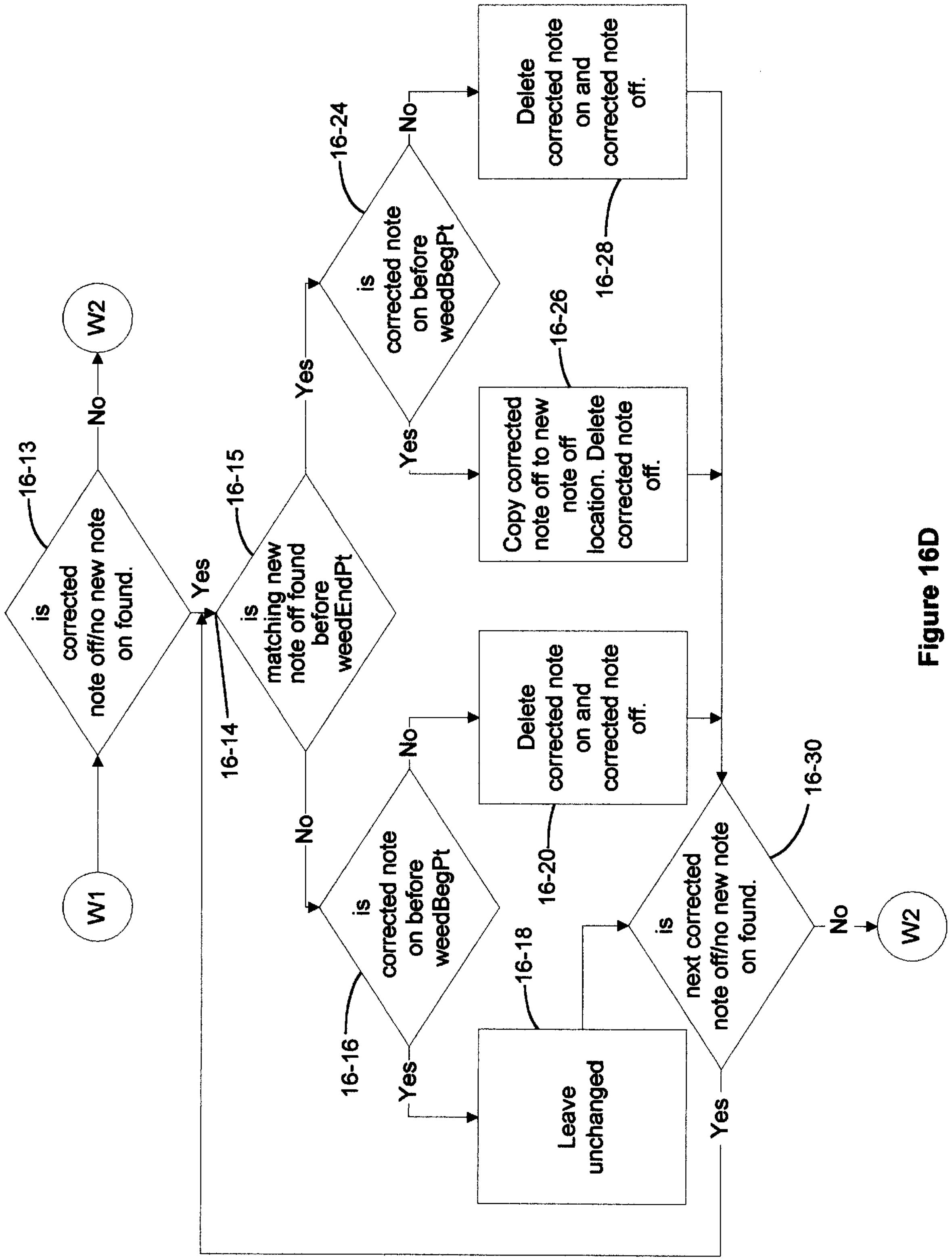
Figure 16E:
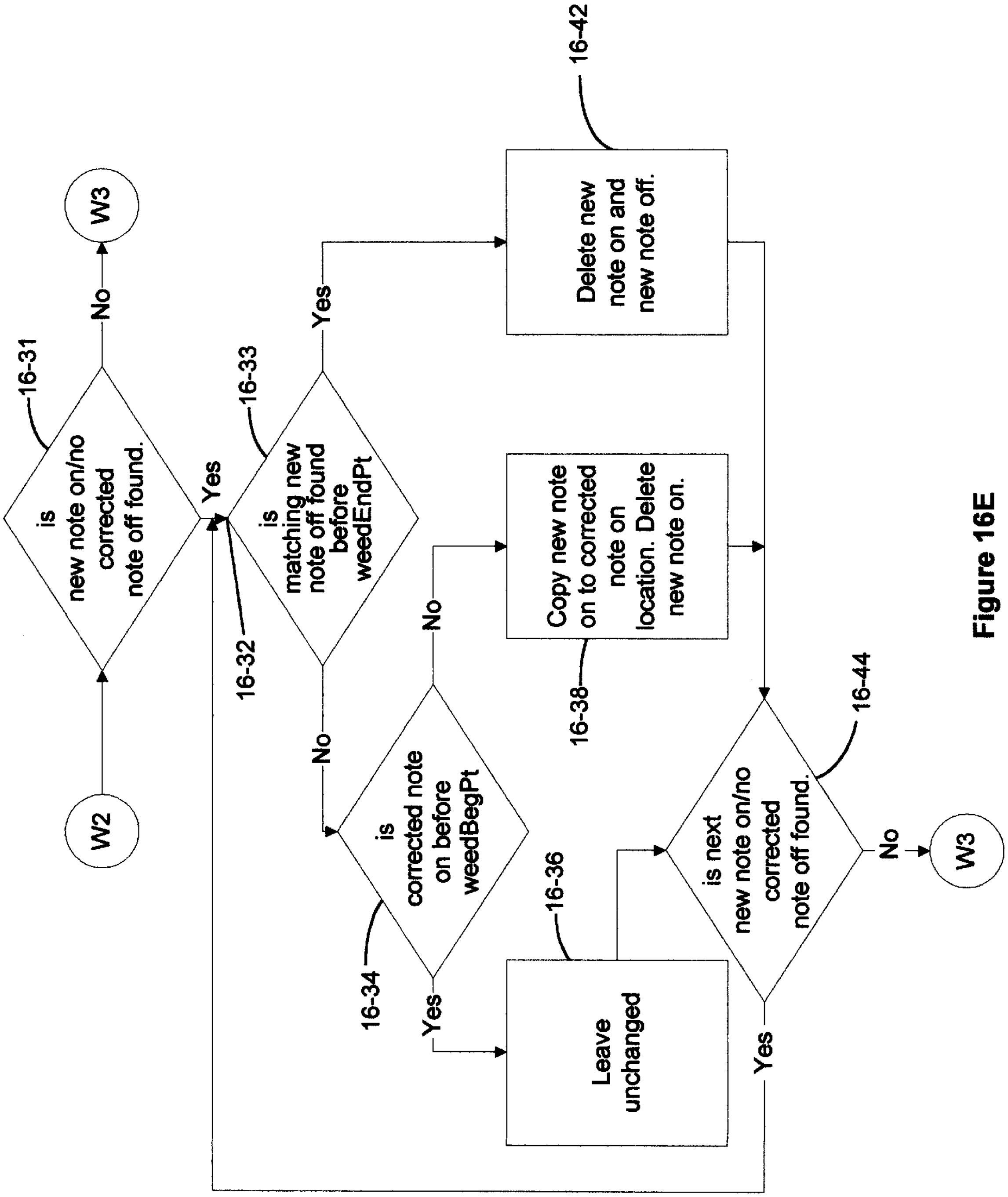

Step 16-13 of FIG. 16D, traces the previously created table on from the beginning, to determine if any row contains a corrected note off event with no corresponding new note on event. If this situation does not exist anywhere in the table, then processing continues to W2 (FIG. 16E). If a first row is found in which there is a corrected note off event and no corresponding new note on event, then this table index is stored and processing continues to step 16-14 (not shown in FIG. 16D). In step 16-14, the storage area is first scanned backwards from the indexed corrected note off event location, to find its corresponding corrected note on event and determined location. This corresponding corrected note on event and location, should always be found, and is stored as corrected note on event and location (correctedOnEventLocation[]). Next in step 16-14, the new note on event column 16-84 (FIG. 16B) is traced on from the beginning of the table to find any new note on event 16-84, having the same absoluteWeedKey value as the indexed corrected note off event. For each found new note on event 16-84, if any, scan the storage area forward from each found new note on event's determined location, to determine each's corresponding new note off event and location. A corresponding new note off event should always be found, and is determined by searching for the first note off event that has a matching note value (FIG. 16A, shown without parenthesis, i.e. 74 "on event" matches 74 "off event"). Copy each of these found corresponding new note off events, along with each's determined location into an array. Determine which new note off event in the array has the lowest location value or is in effect "closest" to its corresponding new note on event. Store this "closest" new note off event along with its location value in new note off event and location (newOffEventLocation[]). Note, if two or more lowest location values are equal, it does not matter which one of these new note off events and corresponding lowest location values is stored in newOffEventLocation[]. Processing then proceeds to step 16-15 (FIG. 16D).

If in step 16-14 (FIG. 16D), no corresponding new note on event was found having the same absoluteWeedKey value as that of the indexed corrected note off event, then no newOffEventLocation[] could be determined. If this is the case, the indexed corrected note off event should be processed as follows... If the location value stored in correctedOnEventLocation[] is greater than the weedBeginningPt value, then delete both the indexed corrected note off event and its corresponding corrected note on event from the storage area, and processing continues to step 16-30 (FIG. 16D). If the location value in correctedOnEventLocation[] is not greater than the weedBeginningPt value, then leave the indexed corrected note off event and its corresponding corrected note on event unchanged in the storage area, and processing continues to step 16-30 (FIG. 16D). It should be noted that some embodiments of the present invention can output and store original performance data (absoluteKeyNumber). Since absoluteKeyNumber is equal to absoluteWeedKey, this stored original performance data may optionally be scanned to determine a location value for newOffEventLocation[].

If processing has proceeded to step 16-15 (FIG. 16D), it is assumed that at least one matching new note on event was found, as described previously, for the indexed corrected note off event. The new note on events(s) that were found, were placed in an array, and a lowest new note off event location value was determined and stored (along with its new note off event) in newOffEventLocation[]. Step 16-15 then checks to see if the newOffEventLocation[] value, is less than the weedEndPt value. If the value is less, then step 16-24 checks to see if the location value in correctedOnEventLocation[], is less than the weedBeginningPt value. If the value is less, then step 16-26 copies the indexed corrected note off event to a storage area location that matches the location stored in newOffEventLocation[]. The original indexed corrected note off event is then deleted from the storage area. If the location value in correctedOnEventLocation[] is not less than the weedBeginningPt value, then step 16-28 deletes the indexed corrected note off event as well as its corresponding corrected note on event from the storage area Processing then proceeds to step 16-30 (FIG. 16D).

If in step 16-15 (FIG. 16D) the location value in newOffEventLocation[], is not less than the weedEndPt value, then step 16-16 checks to see if the location value in correctedOnEventLocation[] is less than the weedBeginningPt value. If the value is less, then step 16-18 leaves the indexed corrected note off event and its corresponding corrected note on event unchanged in the storage area. If the location value in correctedOnEventLocation[] is not less than the weedBeginningPt value, then step 16-20 deletes both the indexed corrected note off event, and its corresponding corrected note on event, from the storage area. Processing then proceeds to step 16-30 (FIG. 16D).

Step 16-30 of FIG. 16D, traces the table forward from the currently indexed corrected note off event. If a next row in the table is found containing a corrected note off event with no corresponding new note on event, then this new table index is stored, replacing the previous value, and processing loops back to 16-14 where the process repeats. If a next row in the table is not found containing a corrected note off event with no corresponding new note on event, then processing continues to W2 (FIG. 16E).

Figure 16F:
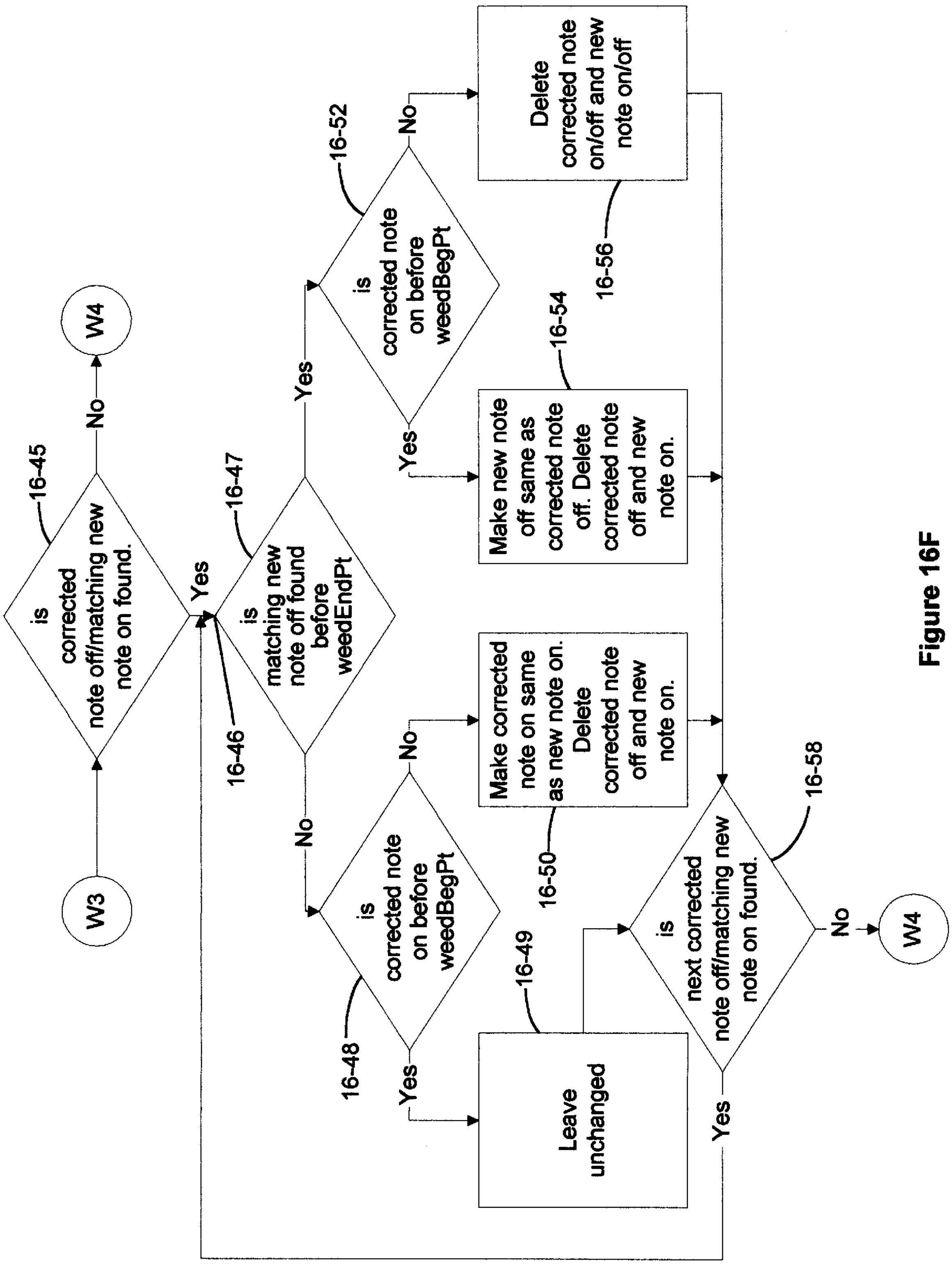

Step 16-31 of FIG. 16E, traces the table on from the beginning to determine if any row contains a new note on event and no corresponding corrected note off event. If this situation does not exist anywhere in the table, then processing continues to W3 (FIG. 16F). If a first row is found in which there is a new note on event with no corresponding corrected note off event, then this table index is stored, replacing any previous value, and processing continues to step 16-32 (not shown in FIG. 16E). In step 16-32, the storage area is first scanned forward from the indexed new note on event location, to determine its corresponding new note off event and location. This corresponding new note off event and determined location should always be found, and is stored as new note off event and location (newOffEventLocation[]), replacing any previously stored value. Next in step 16-32, the corrected note off event column 16-82 (FIG. 16B) is traced on from the beginning of the table to find any corrected note off event 16-82, having the same absoluteWeedKey value as that of the indexed new note on event. For each found corrected note off event 16-82, if any, scan the storage area backwards from each found corrected note off event's location, to determine each's corresponding corrected note on event and location. A corresponding corrected note on event should always be found. Copy each of these found corrected note on events, along with each's determined location into an array. Determine which corrected note on event in the array has the highest location value or is in effect "closest" to its corresponding corrected note off event. Store this "closest" corrected note on event and its location value in corrected note on event and location (correctedOnEventLocation[]), replacing any previously stored value. Note, if two or more highest location values are equal, it does not matter which one of these corrected note on events and corresponding highest location values is stored in correctedOnEventLocation[]. Processing then proceeds to step 16-33 (FIG. 16E).

If in step 16-32 (FIG. 16E), no corresponding corrected note off event was found having the same absoluteWeedKey value as that of the indexed new note on event, then no correctedOnEventLocation[] could be determined. If this is the case, the indexed new note on event should be processed as follows . . . If the location value in newOffEventLocation[] is less than the weedEndPt value, then delete both the indexed new note on event and its corresponding new note off event from the storage area, and processing continues to step 16-44 (FIG. 16E). If the location value in newOffEventLocation[] is not less than the weedEndPt value, then leave the indexed new note on event and its corresponding new note off event unchanged in the storage area, and processing continues to step 16-44 (FIG. 16E). Again, as described previously, stored original performance data may optionally be scanned to determine a location value for correctedOnEventLocation[].

If processing has proceeded to step 16-33 (FIG. 16E), it is assumed that there was at least one found corrected note off event, as described previously, for the indexed new note on event. The found corrected note off event(s) were then placed in an array. The highest corrected note on event location value was determined and stored (along with its corrected note on event) in correctedOnEventLocation[]. Step 16-33 then checks to see if the newOffEventLocation[] value, is less than the weedEndPt value. If the value is less, then step 16-42 deletes the indexed new note on event and its corresponding new note off event from the storage area. Processing then proceeds to step 16-44 (FIG. 16E).

If in step 16-33 (FIG. 16E) the location value in newOffEventLocation[], is not less than the weedEndPt value, then step 16-34 checks to see if the location value in correctedOnEventLocation[] is less than the weedBeginningPt value. If the value is less, then step 16-36 leaves the indexed new note on event and its corresponding new note off event unchanged in the storage area. If the location value in correctedOnEventLocation[] is not less than the weedBeginningPt value, then step 16-38 copies the indexed new note on event to a storage area location that matches the location stored in correctedOnEventLocation[]. The original indexed new note on event is then deleted from the storage area. Processing then proceeds to step 16-44 (FIG. 16E).

Step 16-44 of FIG. 16E, traces the table forward from the currently indexed new note on event. If a next row in the table is found containing a new note on event with no corresponding corrected note off event, then this new table index is stored, replacing the previous value, and processing loops back to 16-32 where the process repeats. If a next row in the table is not found which contains a new note on event and no corrected note off event, then processing continues to W3 (FIG. 16F).

Step 16-45 of FIG. 16F, traces the table on from the beginning to determine if any row contains both a corrected note off event and a new note on event. If this situation does not exist anywhere in the table, then processing continues to W4 (FIG. 16C). If a first row is found in which there is both a corrected note off event and a new note on event, then this table index is stored, replacing any previous value, and processing continues to step 16-46 (not shown).

Step 16-46 first scans the storage area forward from the indexed new note on event's location, to determine its corresponding new note off event and location. This corresponding new note off event and location, should always be found, and is stored as new note off event and location (newOffEventLocation[]), replacing any previously stored value. The storage area is then scanned backwards from the indexed corrected note off event's location, to determine its corresponding corrected note on event and location. This corresponding corrected note on event and location should always be found, and is stored as corrected note on event and location (correctedOnEventLocation[]), replacing any previously stored value. Step 16-47 then checks to see if the location value in newOffEventLocation[], is less than the weedEndPt value. If the value is less, then step 16-52 checks to see if the location value in correctedOnEventLocation[] is less than the weedBeginningPt value. If the value is less, then step 16-54 makes the new note off event in the storage area (corresponding to newOffEventLocation[]) the same as the indexed corrected note off event. The original indexed corrected note off event, and the indexed new note on event, are then deleted from the storage area If the location value in correctedOnEventLocation[], is not less than the weedBeginningPt value, then step 16-56 deletes the indexed corrected note off event, as well as its corresponding corrected note on event from the storage area. The indexed new note on event, as well as its corresponding new note off event are also deleted from the storage area Note, step 16-56 may optionally be handled in two other ways. The first method is to handle step 16-56 the same as step 16-54. When using this first method, step 16-28 (FIG. 16D) may optionally be handled by copying the indexed corrected note off event to the stored location of the new note off event, and then deleting the original indexed corrected note off event. The second method of handling step 16-56, is to make the corrected note on event in the storage area (corresponding to correctedOnEventLocation[]) the same as the indexed new note on event. Then delete the indexed corrected note off event and indexed new note on event from the storage area. Which method(s) to use is based on preference. The method to be used may be based on weedout region size of the current area being edited, for example. Processing then proceeds to step 16-58 (FIG. 16F).

If in step 16-47 (FIG. 16F) the location value in newOffEventLocation[], is not less than the weedEndPt value, then step 16-48 checks to see if the location value in correctedOnEventLocation[] is less than the weedBeginningPt value. If the value is less, then step 16-49 leaves the indexed corrected note off event and its corresponding indexed new note on event unchanged in the storage area If the location value in correctedOnEventLocation[] is not less than the weedBeginningPt value, then step 16-50 makes the corrected note on event in the storage area (corresponding to correctedOnEventLocation[]), the same as the indexed new note on event. The original indexed corrected note off event, and the original indexed new note on event, are then deleted from the storage area. Processing then proceeds to step 16-58 (FIG. 16F).

Step 16-58 of FIG. 16F, traces the table forward from the currently indexed corrected note off event and new note on event. If a next row in the table is found containing both a corrected note off event and a new note on event, then this new table index is stored, and processing loops back to 16-46 where the process repeats. If a next row in the table is not found containing both a corrected note off event and a corresponding new note on event, then processing continues to W4 (FIG. 16C).

Step 16-8 of FIG. 16C, traces forward from the currentWeedIndex searching for a next corrected note off event or new note on event (1) (with a chordKeyWeed value that is not equal to the currentWeedGroup value). If a next corrected note off event or new note on event is found meeting these criteria, then its index is stored as currentWeedIndex, replacing the previous value. Step 16-4 stores its chordKeyWeed value as currentWeedGroup, replacing the previous value. The weedMidPt, weedBeginningPt, and weedEndPt are then determined and stored as before (using the indexed note event's determined location), replacing all previous values. Step 16-6 places selected note events and their determined locations in a array, replacing all previous values, sorts them, and places them in a table as before, replacing the previous table. Processing then repeats until step 16-8 determines that no more corrected note off events or new note on events (1) (with a chordKeyWeed value that is not equal to the currentWeedGroup value) are found in the event list. The end of the event list has been reached. Step 16-10 then performs an optional cleanup scan. The storage area is first scanned for each note on event. When each note on event is found, the storage area is scanned forward from the location of the note on event to find its corresponding note off event. If no corresponding note off event is found, then the note on event is deleted. The storage area is then scanned for each note off event. When each note off event is found, the storage area is scanned backwards from the location of the note off event to find its corresponding note on event If no corresponding note on event is found, then the note off event is deleted. Processing then finishes (possibly proceeding to a next selected storage area).

When a recorded or copied current status message or trigger track is played back, it can be slid forward (or backwards) in time. This allows a chord and/or scale change to occur before or after the downbeat of a measure, for example. Sliding it forward will eliminate many of the on-the-fly note corrections heard during a performance. The fundamental note for a previous current chord may be allowed to play through the chord and/or scale change event, for example. On-the-fly note correction can also be improved by implementing the array lastKeyPressTime[] and the attribute currentRunningTime. The attribute currentRunningTime keeps the current running time location of the song, known in the art, and is continuously updated as the song is played back. The array lastKeyPressTime[] holds 128 keys for each of 16 input channels. As each melodyKey is pressed during a performance, its real-time note on location (as determined by the currentRunningTime) is stored in lastKeyPressTime[], updating any previous note on location value. When a chord or scale change is requested during the performance, the weedBeginningRegion setting (16-64 of FIG. 16A) is subtracted from the currentRunningTime on-the-fly, to determine the weedBeginningPt 16-59. If a key is on (1), then this determined weedBeginningPt value is compared with the key's lastKeyPressTime[] value. If the lastKeyPressTime[] value is greater than this determined weedBeginningPt value, then the service CorrectKey( ) is not called for the key. If the lastKeyPressTime[] value is less than this determined weedBeginningPt value, then the service CorrectKey( ) is called for the key. This allows autocorrection to be bypassed for a given chord or scale change event, based on real-time note on performance of a particular key. When a user is establishing a chord progression, "misfires" can also occur, in which chord triggers are recorded too closely together. These misfires can be weeded out before performing the weedout function, by deleting a current status message and/or trigger that exists too closely to another one. Its corresponding processed and/or original performance data is first modified appropriately (if needed) in the area of the misfire. The weedout method of the present invention can be implemented in a variety of ways and combinations, as will become apparent to those of ordinary skill in the art.

User Interface 3-2

There is one User Interface object 3-2. The user interface is responsible for getting user input from computer keyboard and other inputs such as foot switches, buttons, etc., and making the necessary calls to the other objects to configure the software as a user wishes. The user interface also monitors the current condition and updates the display(s) accordingly. The display(s) can be a computer monitor, alphanumeric displays, LEDs, etc.

In the present invention, the music administrator object 3-3 has priority for CPU time. The user interface 3-2 is allowed to run (have CPU time) only when there is no music input to process. This is probably not observable by the user on today's fast processors (CPUs). The user interface does not participate directly in music processing, and therefore no table of attributes or services is provided (except the Update() service called by the main object 3-1. The user interface on an embedded instrument will look quite different from a PC version. A PC using a window type operating system interface will be different from a non-window type operating system.

User interface scenarios.

The user tells the user interface to turn the system off. The user interface calls musicAdm.SetMode(0) 3-3 which causes subsequent music input to be directed, unprocessed, to the music output object 3-12.

The user sets the song key to D MAJOR. The user interface 3-2 calls songKey.SetSongKey(D MAJOR) (3-8). All subsequent music processing will be in D MAJOR.

A user assigns a minor chord to key 48. The user interface 3-2 calls config.AssignChord(minor, 48) 3-5. The next time pianoKey[48] responds to a key on, the current chord type will be set to minor.

As a user is performing, the current chord and scale are changed per new keys being played. The user interface monitors this activity by calling the various services of crntChord, crntscale etc. and updates the display(s) accordingly.

Figure 17A:
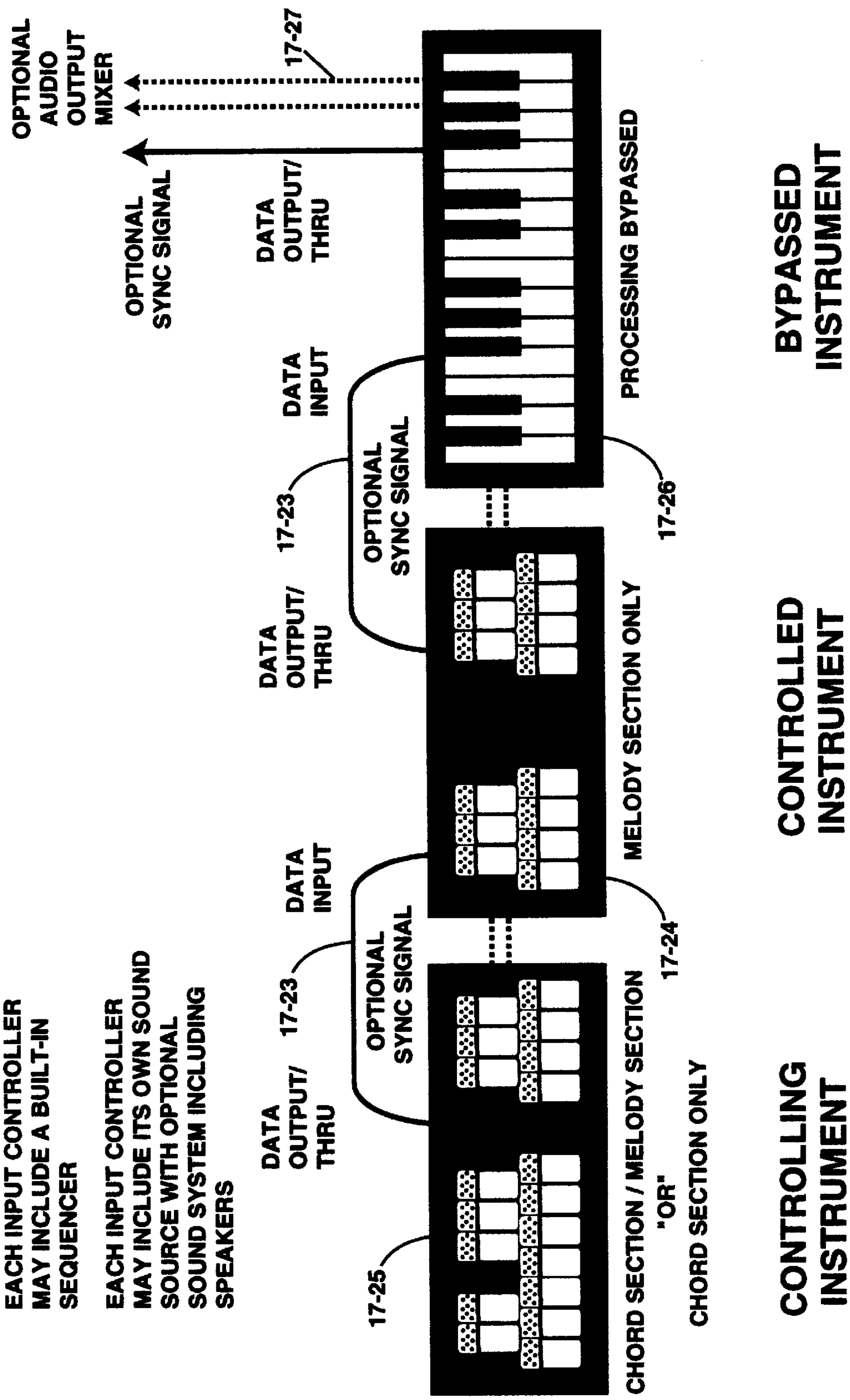
FIG. 17A is a general overview including multiple instruments of the present invention daisy-chained to one another for simultaneous composition and/or performance.

FIG. 17A depicts a general overview of one embodiment of the present invention utilizing multiple instruments. Shown are multiple instruments of the present invention synced or daisy-chained together, thus allowing simultaneous recording and/or playback. Each input device may include its own built-in sequencer, music processing software, sound source, sound system, and speakers. Two or more sequencers may be synced or locked together 17-23 during recording and/or playback. Common forms of synchronization such as MTC (MIDI time code), SMPTE, or other known forms of sync may be utilized. Methods of synchronization and music data recording are well known in the art, and are fully described in numerous MIDI-related textbooks, as well as in MIDI Specification 1.0, which is incorporated herein by reference. The configuration shown in FIG. 17A provides the advantage of allowing each user to record performance tracks and/or trigger tracks on the sequencer of their own instrument. The sequencers will stay locked 17-23 during both recording and/or playback. This will allow users to record additional performance tracks on the sequencer of their own instrument, while staying in sync with the other instruments. The controlled instruments 17-24 may be controlled by data representative of chord changes, scale changes, current song key, setup configuration, etc. being output from the controlling instrument(s) 17-25. This information may optionally be recorded by one or more controlled or bypassed instruments 17-26. This will allow a user to finish a work-in-progress later, possibly on their own, without requiring the recorded trigger track of the controlling instrument 17-25. Any one of the instruments shown in FIG. 17A may be designated as a controlling instrument 17-25, a controlled instrument 17-24, or a bypassed instrument 17-26 as described herein.

In FIG. 17A, if an instrument set for controlled operation 17-24 or bypassed operation 17-26 contains a recorded trigger track, the track may be ignored during performance if needed. The instrument may then be controlled by a controlling instrument 17-25 such as the one shown. An instrument set to controller mode 17-25 which already contains a recorded trigger track, may automatically become a controlled instrument 17-24 to its own trigger track. This will allow more input controllers on the instrument to be utilized for melody section performance. Processed and/or original performance data, as described herein, may also be output from any instrument of the present invention. This will allow selected performance data to be recorded into the sequencer of another instrument 17-23 if desired. It may also be output to a sound source 17-27. Selected performance data from one instrument may be merged with selected performance data from another instrument or instruments 17-23. This merged performance data 17-23 may then be output from a selected instrument or instruments 17-27. The merged performance data 17-23 may also be recorded into the sequencer of another instrument, if desired. The instruments shown in FIG. 17A may provide audio output by utilizing an internal sound source. Audio output from two or more instruments of the present invention may also be mixed, such as with a digital mixer. It may then be output 17-27 from a selected instrument or instruments utilizing a D/A converter or digital output.

Figure 17B:
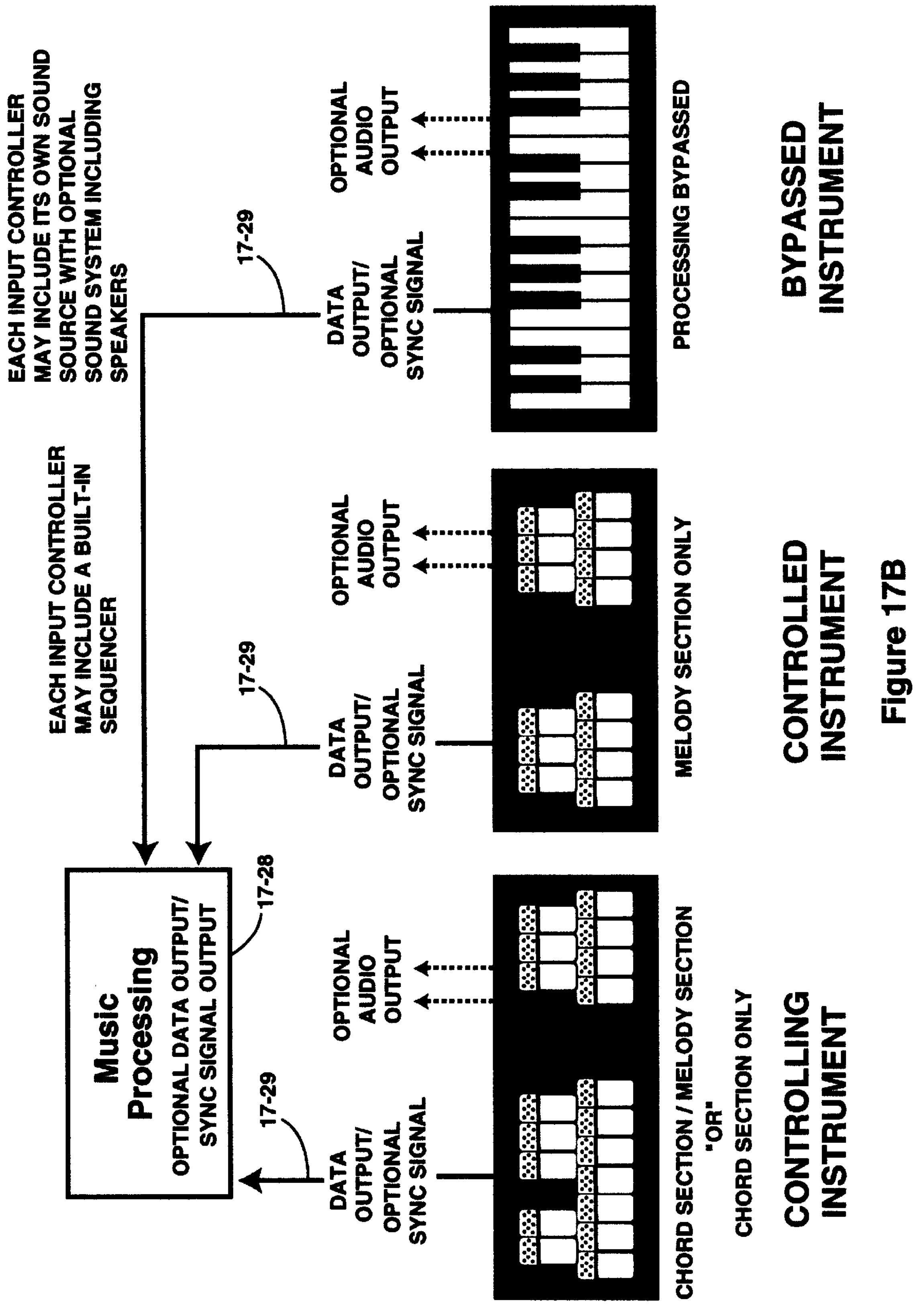
FIG. 17B is a general overview including multiple embodiments of the present invention being utilized simultaneously with an external processor.

FIG. 17B depicts a general overview of another embodiment of the present invention utilizing multiple instruments. Shown are multiple instruments of the present invention being utilized together with an external processor 17-28, thus allowing simultaneous recording and/or playback. Optional syncing, as described previously, may also be used to lock one or more of the instruments to the external processor 17-29 during recording and/or playback.

Figure 17C:
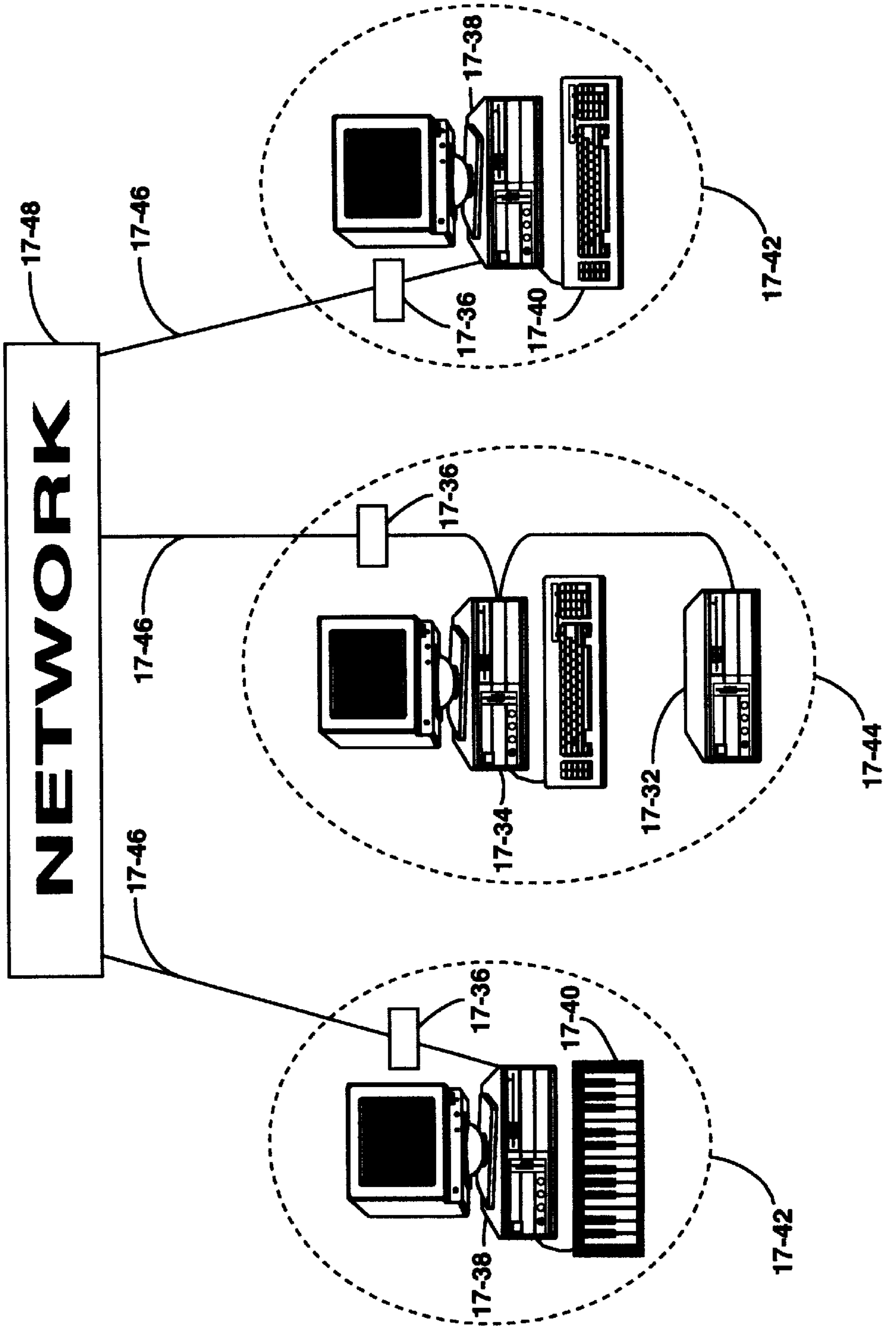
FIG. 17C is a general overview including multiple embodiments of the present invention being utilized together in a network.

FIG. 17C is an illustrative depiction of one embodiment of the present invention, for allowing multiple performers to interactively create music over a network. A performer terminal 17-38, is illustratively depicted as a common computer which includes a corresponding display. A performer terminal will commonly include a modem 17-36 (includes both internal and external modems), to permit various generated application data to be sent to remote locations over a network 17-48. An embodiment of a performer station 17-42, illustratively depicted, will typically include various hardware, an operating system, communications software, and at least a portion of the music software described herein (not shown). A performer station will include one or more input means 17-40 such as for entering data and/or for musical performance. The input means 17-40 may be located at some distance from the terminal 17-38. Inputs may also be provided using a computer monitor, such as by selectively clicking a mouse for example, or by utilizing touch-sensitive display screens, etc. A variety of input controller types as described herein may be used for musical performance in a network. A host station 17-44, illustratively depicted, is shown which may include one or more additional connected processing devices 17-32, in a manner known in the art. A performer at each of the stations illustrated by 17-42, may interact with each other as well as with a performer at another station (i.e. 17-44) over a network. The network of the present invention 17-48 can be any network known to the industry. The performers may be connected to the network using any known means, such as directly, via a dial up link, through wireless means, etc. An input controller device itself (i.e. 17-40) may include its own communication and connection means, applications, etc. for use in a network. By definition, two or more performers of the present invention will be non-localized (i.e. located remotely from one another), meaning that at least two performers will exist in residences, buildings, cities, countries, etc. separate from one another.

Various means of providing real-time communications over a network are known. Protocols such as Telnet and Internet Relay Chat (IRC), among others, are commonly used to provide continuously open connections in a network. A continuously open connection protocol may be used to provide communications over a network. Telnet and IRC are industry standards. The IRC protocol is fully defined in RFC 1459. These protocols, among others, are commonly used to provide real-time chat sessions over a network. Using an illustrative scenario, a real time markup (RTM) chat client application is installed on each computer 17-38 at each performer station 17-42. One performer may launch a chat and/or music session by running the RTM chat client software, possibly from a browser running on their computer. A TCP/IP two-way connection is then established between the respective computer 17-38 at the performer station which runs TCP/IP client software, and the computer 17-34 at the host station which runs TCP/IP host software. A real-time full duplex connection is also established between the RTM client and a real-time server application installed on the computer 17-34 at the host station. A Telnet server and a compatible chat server may be used on the host computer 17-34, when the chat client on 17-38 is a Telnet HTML chat client, for example. The IRC protocol and an IRC chat server may also be used, if preferred, as well as any other adequate communications protocols and/or means known in the art. Additional servers may also be hosted by the host computer 17-34, such as an FTP server (File Transfer Protocol server) for sending files to either FTP clients or Web browsers, which is known. It should be noted that other performers may join the chat and/or music session by establishing TCP/IP connections and launching their own RTM chat clients. Any station 17-42 and 17-44 may function as a performer station. Additionally, any station 17-42 and 17-44 may function as the host and one or more performers may be stationed at the host, as is well known in the art. For purposes of clarification, the words messages and data are used interchangeably herein to describe the present invention. Also, a "portion" of data is defined herein to include any combination(s) of messages, any portion(s) of a message, or any and all combinations of these.

Figure 17D:
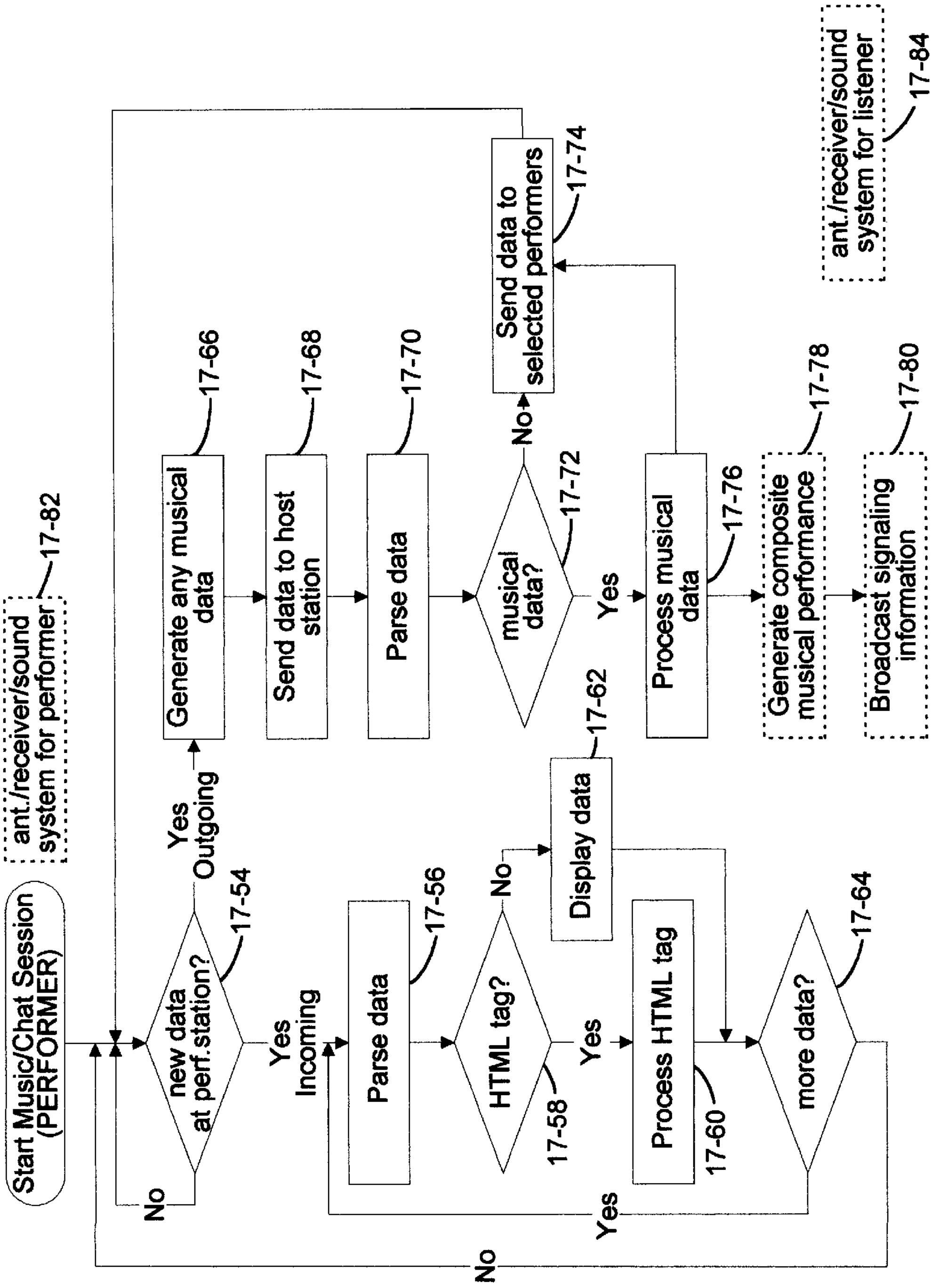
FIG. 17D is a flow diagram of a method for music creation over a network in accordance with the present invention.

FIG. 17D is a flow diagram of a method for interactive music creation over a network in accordance with the present invention. In step 17-54, after the previously said connections are established, the performer station begins receiving any data being sent by the host station. The performer may also send data to the host station. Inputs being generated by the performer (i.e. in response to selections and deselections of musical input controllers), are intercepted in step 17-66 to determine if any of the inputs are musical in nature. Any non-musical inputs are sent to the host station in step 17-68. Any musical inputs are first prepared for transmission to the host station, then sent to the host station in step 17-68. Some input controllers may be designated for functions such as typing, etc. (i.e. for chatting), and others for musical performance. Multiple input controller devices may also be used at a performer station (not shown). For example, one may be used primarily for typing and another primarily for musical performance. An input controller device may also be used efficiently by switching between various input controller modes. Various modes may be useful for providing musical inputs only, non-musical inputs only, or both musical inputs and non-musical inputs for example. It should be noted that although it provides increased user interaction and communication among performers, chat is not required in an embodiment of the present invention. As previously said, step 17-66 prepares musical inputs for transmission to the host station. In the illustrative example described herein, the musical data is defined using a markup language (i.e. HTML). The non-musical data is also defined using a markup language (i.e. HTML). HTML or HyperText Markup Language is a very popular language for formatting Web documents. An illustrative example of an original note on message is <ORIGNOTE CH=8 NUM=68 VEL=64></ORIGNOTE>. An illustrative example of a corresponding original note off message is <ORIGNOTE CH=8 NUM=68 VEL=0></ORIGNOTE>. The HTML tags <>. . . </> may be used to embed a variety of musical data. All musical data and settings described herein, as well as selected musical data described in MIDI Specification 1.0, may be utilized over a network. It should be noted that musical tags of this nature are not currently supported by HTML itself These illustrative examples are provided only in order to simplify the description. Any adequate means may be used for communicating the data in a network. Faster and more efficient means of communicating data in a network are known in the art. A means of communicating data in a network for real-time gaming, as well as a method for allowing performers of the present invention to receive data over a network substantially simultaneously, and regardless of station location, are described in U.S. Pat. No. 5,820,463, incorporated herein by reference. Step 17-68 then sends the generated musical data to the host station. It should be noted that IRC may require an automatic carriage return in order to send the musical data. The host parses the incoming data in real-time in step 17-70 by interpreting the embedded tags. If no musical data is found in step 17-72, then step 17-74 processes the data accordingly, possibly sending data to one or more selected performers. If in step 17-72 musical data is found, then the data is processed by the music software in step 17-76, possibly designating a specific channel number. The processed data may then be sent to one or more selected performers in step 17-74. Steps 17-76 and 17-74 are performed in any suitable manner. Sending musical data to performers may be determined in part by the particular musical data found in step 17-72. For example, original notes may be received, processed, and then sent to one or more performers as a processed performance. Other musical data may be used for remotely changing the song key setting of the music software, controlling a sequencer, synchronizing multiple sequencing means, etc. This type of musical data may not be sent to any or all performers, depending on the particular embodiment. The performer station is utilized to process incoming data sent via the host station by parsing the data in step 17-56. If an HTML tag is not detected in step 17-58, then step 17-62 displays the incoming data on the chat screen of the performer. If an HTML tag is detected, then step 17-60 processes the data accordingly. Detected musical data may be processed and provided to a sound source and sound system at the performer station. It should be noted that any sound source(s) and/or sound system(s), may be located at some distance from a given performer terminal (17-38, FIG. 17C). Step 17-64 determines if there is any more data to process. If not, processing loops to step 17-54. If there is, processing loops to step 17-56.

The optional steps in FIG. 17D (shown by dotted lines) may also be used in an embodiment of the present invention. The note-identifying information described herein may be utilized along with one or more sound sources, to broadcast signaling information representative of a "composite musical performance". A composite musical performance as defined herein, is generated at least in part, by providing note-identifying information to one or more sound sources (illustrated by step 17-78). The generated composite musical performance, which may also include other data such as various digital data, audio/visual data, etc. is then broadcast to one or more performers in step 17-80 as signaling information. The composite musical performance may be broadcast and received as signaling information using any adequate broadcasting and receiving means known in the art. Each of the stations in various embodiments of the present invention may include a broadcasting means and/or receiving means. Using an illustrative example, the composite musical performance is broadcast in step 17-80 to a performer station which includes an antenna, receiver (typically a channel selector), and a sound system 17-82. A performer is able to hear the composite musical performance without requiring a sound source at the performer station. Any listener in the broadcast range may also be allowed to tune in to the performance using an antenna, receiver, channel selector, and sound system 17-84. An interactive musical "radio station" may then be established for broadcasting live music sessions for example. As one example, a known musician, entertainer, or band may be asked to perform with selected individuals remotely. Listeners such as in their cars or elsewhere, may be allowed to tune in to the session. The broadcast may be multi-channel, which is known, possibly allowing an individual to select a channel containing the same performance but with different instrument sounds, combinations of musical parts, etc. An individual may also select a channel which contains a completely different performance. The "signaling information" as defined herein by the present invention, may be provided using any adequate broadcasting means known in the art. Signaling information as described herein, may include the streaming of digital data over a network as one example. Methods of streaming digital data over a network are well known. They normally involve a broadcasting and receiving means in the form of an application program that runs on the computer, and therefore no transmitter or antenna is required. A means of broadcasting and receiving signaling information of the type that can be used in an embodiment of the present invention is described in U.S. Pat. No. 5,822,324, incorporated herein by reference. As previously said, each performer station may include a broadcasting means and a receiving means. The previously said patent may be used for allowing a composite musical performance to be broadcast from each of plural performer stations 17-42. The composite musical performances may then be merged at a point via the host station 17-44, which includes a receiving means. A merged composite musical performance is then broadcast to plural performers 17-42 via the host station 17-44, which also includes a broadcasting means. A merged composite musical performance as defined herein is generated using composite musical performances broadcast from plural performers in the network. It should be noted that the methods of broadcasting composite musical performances of the present invention are cumbersome, and do not provide the improved efficiency, performance, and flexibility of the other network music methods described herein.

The following are illustrative scenarios of various implementations of the network music methods described herein. Selected stations 17-42 and 17-44 (FIG. 17C) may include a recording and/or storage means for storing various data which may include sequenced musical data. One illustrative scenario involves sequenced chord and scale change data, as described herein, stored at the host station 17-44. One or more performers 17-42, may send a start command to the host station 17-44 (i.e. <SEQ FUNCTION=1></SEQ>) for commencing playback or retrieval of the sequenced chord and scale change data. Original performance data sent by the performers 17-42 to the host station 17-44, will then be processed according to the chord and scale change data being played back at the host station, as described herein. The processed musical performance is then sent to selected performers 17-42 via the host station 17-44, where it may then be sounded using a sound source, amplifier, and speakers at the performer station(s). It should be noted that playback of the stored chord and scale change data may also be initiated via the host station itself, or by a performer at the host station. An improvement to the previously said scenario, allows a completely "live" music session to occur over the network. Previously stored chord and scale change data is not required. To accomplish this, one or more performers will lead the session by performing from the chord section of their instrument, as described herein. Original note data sent from the performers 17-42 to the host station 17-44 will be processed according to the firstMelodyKey attribute settings of the music software at the host station (see Table 16 for firstMldyKey attribute). The host station 17-44 will then send the processed musical performance to one or more selected performers 17-42, where it may then be sounded as described previously. This will allow one or more performers to effect chord and scale changes in the performance.

Another illustrative scenario involves the use of the music software on each of the performer stations 17-42. Chord section and melody section identifiers may be encoded into original performance data sent by the performers 17-42 to the host station 17-44 (i.e. <ORIGNOTECS CH=8 NUM=55 VEL=64></ORIGNOTECS>, and <ORIGNOTEMS CH=8 NUM=68 VEL=64></ORIGNOTEMS>). Original performance data sent by the performers 17-42 to the host station 17-44, is then simply posted by the host station to one or more selected performers. The music software of each performer station 17-42 will then be able to process each note appropriately as either a chord section performance note or a melody section performance note. It should be noted that this method may require music software settings at each performer station to match each other, as described later. Alternately, the music software at each performer station 17-42 may first process an outgoing original performance, then send a processed performance to the host station 17-44. This processed performance data is also simply posted by the host station 17-44 to one or more selected performers. It should be noted, however, that any current status messages generated by one or more performers must also be sent to the host station 17-44, and then posted to all performers (see table 17 for description of current status). The current status messages are received by the music software at each performer station 17-42 to effect chord and scale changes, as described herein. This will allow all performers to properly harmonize to any chord and scale changes that are being effected by one or more performers. Again, the previously described tags are illustrative only in nature and are provided in order to simplify the description. Any adequate means may be used for communicating the various data of the present invention in a network.

Using another illustrative scenario, a performer may participate in a performance or enter a specific "music room", based on the interest of the performer. An interest may be in that of a particular musical style for example (i.e. Room: ROCK). An interest may be in that of a particular instrument or instruments to perform (i.e. Room: ROCK—Needed: Drummer, Bassist, Fans). A room may be specifically designated for experienced performers or inexperienced performers. The fan example is just to illustrate that non-performers may also participate, such as to listen in or to communicate via chat messages for example. The chat messages of the present invention are normally used for chatting, stating opinions, critiquing, etc. A performer of the present invention may participate in a performance based on the formation of a musical group. Performers with little or no music training are not likely to know various details about creating particular music styles. For example, the number of performers used in an orchestra, or the sound types or styles used to play funk, etc. An embodiment of the present invention may limit the number of performers allowed in a given performance, thus allowing the formation of musical groups. Performers may be allowed to participate based on available instruments, sounds, or parts left to perform in order to form a musical group. For example, five percussionists or "drumers" in a group may be allowed to perform, where each drummer may play one or more different drum sounds. If a pad sound is also used, one or more performers in the group may each play a different pad sound or "part", such as for a layering effect, etc. Selected additional instruments, parts, etc. may also be used thus allowing the formation of a musical group. In systems which provide voice capability, known in the art, one or more "singers" may participate. An alternative to the previously said method, is to simply provide guidelines and/or information intended to educate the performers. This will be useful in maintaining order and structure during a performance by educating novices about the formation of various musical groups. Those of ordinary skill in the art will recognize that combinations and variations of the previously said methods may also be used so that a performer may participate in a performance based on the formation of a musical group. Also, as described herein, one or more performers may perform using a "bypassed instrument" thus allowing traditional keyboard play, drum or "percussion" play, etc. The host station 17-44 may automatically designate a specific channel to a performer based on the instrument which is chosen by the performer (i.e. Drummer=channel 10 when using General MIDI standard). An appropriate instrument voice may also be selected for the performer, such as for use with a particular music style for example. Performers may play along to pre-sequenced data, which is useful when a small number of performers wish to form a musical group, or sample a musical style for example. When a performer participates in a performance, various control data may be automatically sent via the host 17-44 to the performer 17-42. Control data may be sent, such as for setting the music software of the performer to match that of the other performers in the network. For example a current song key setting, chord setup, voice setting(s), mode setting(s), tempo setting, meter setting, stop/play/continue/pause/record commands, real-time sync data (i.e. song position pointer commands), or track designation commands, among others may each be sent. A variety of different commands may be sent to various stations in the network. Using another example, a start/stop/record/or sync command may be sent from a performer station 17-42 to the host station 17-44. The command may then be sent via the host station 17-44 to one or more selected performers 17-42, for the purpose of remotely controlling a music sequencing means at each performer station 17-42. Using the various musical data described herein, one or more fully functional sequencers may be controlled remotely as well as synchronized over the network. This will allow one or more performers to each record a multi-user performance using a sequencing means at each performer station 17-42, using one example. A performer may also remotely control a music sequencing means at the host 17-44. A variety of different types of music sequencing means are known in the art. A music sequencing means may be used by a performer for purposes such as recording a performance, saving the performance, editing the performance, adding to the performance later, etc.

The performance methods described herein (see FIGS. 15A through 15K) may also be used over a network. Using one illustrative scenario, a performer 17-42 may designate one or more stored performance parts at the host station 17-44 to perform, by sending a musical command to the host station 17-44. The designated stored performance parts are then used by the music software at the host station to process the performance, as described herein. Each performer in a given performance may then be provided with a respective set of indicators for indicating the particular designated performance part(s) of each performer. Selected performance data of the present invention may be stored in a given performance for a variety of useful purposes. For example one or more individuals, possibly those who performed the music, may be allowed remote access to at least a portion of the stored data over a network (i.e. using FTP as described previously or other known means). Data files may be e-mailed to selected individuals or stored in accessible storage locations in a manner known in the art, for example. The data may be allowed access for purposes such as song completion, editing, review, download, etc. As one example, a known entertainer or band may hold a live music session or concert over a network. Selected individuals may then be allowed to download data representative of the live music session or concert. Downloading may include downloading data as a file manually or automatically, streaming data for real-time recording, sending data from one location to another after a given performance has already taken place, etc. all of which are known in the art. Remote downloading over a network is defined herein to mean downloading or receiving data from a storage area located at a place other than the residence, building, etc. of the individual or individuals receiving the download. For purposes of clarification, a compiled musical performance is defined herein to mean musical data provided as a result of performance from two or more performers in the network, wherein at least two of the performers are located remotely from one another. Those of ordinary skill will recognize that an embodiment of the present invention may also include incorporating other data, such as for visual images or voice, which are known in the art. Also a variety of protocols and communication means, as well as station configurations and station implementations may be used, and will become apparent to those of ordinary skill.

Many modifications and variations may be made in the embodiments described herein and depicted in the accompanying drawings without departing from the concept and spirit of the present invention. Accordingly, it is clearly understood that the embodiments described and illustrated herein are illustrative only and are not intended as a limitation upon the scope of the present invention.

For example, utilizing the techniques described herein, the present invention may easily be modified to send and receive a variety of performance identifiers. Some of these may include current note group setup identifiers, current octave setting identifiers, shifting identifiers which indicate a current shifting position, link identifiers which identify one or more melody keys as being linked to the chord section during a given performance, relative chord position identifiers (i.e. 14-5), identifiers which indicate a performance as a melody section performance or a chord section performance, and identifiers which indicate a performance as being that of a bypassed performance. These identifiers may be sent and stored with each original and processed performance track, or may be derived if preferred, etc. An embodiment of the present invention may use these identifiers for system reconfiguration, routing, etc.

The performance methods of the present invention allow a user to effect a given performance using any number of input controllers. However, at least four to twelve is currently preferred in one embodiment of the present invention. This will allow a user to feel an interaction with the instrument. The indicators described herein may optionally be generated based on the processed performance input. The stored original performance input may be generated based on previously stored processed performance input and stored current status messages, mode settings, etc. The armedKey[] array may be armed with entire note on/off messages which are sent at the appropriate times, if preferred. Default keys may also include entire note on/off messages. This will allow the armedKey[] array to contain note events having a variety of different channels and velocities, each of which may be output to the music software. A variety of combinations may be utilized, and will become apparent to those of ordinary skill in the art. The previously said methods will however, lack the flexibility of the embodiments described herein. Those of ordinary skill will recognize that with minor modification chord setups, drum maps, performance mapping scenarios, modes, etc. may be changed dynamically throughout a given performance. Further, improvisational data as well as different harmony scenarios may each be utilized for enhancement of a given performance. The given performance as described herein will still be readily identifiable and apparent to a user regardless of the various improvisational scenarios and/or harmony scenarios utilized to effect the given performance. An improvisation identifier may be encoded into stored note data. This identifier may be encoded into note on/off messages sent as a result of pressing an "unarmed" live key for example. Improvisation identifiers may be used to provide indicators of a different color, type, etc. This will allow an improvised part to be distinguishable by a user during performance. A "driver key" identifier may also be encoded into stored original note data. A predetermined identifier will indicate that a particular note will be used to set the isArmedDriverKey attribute during the arming/disarming process. A different identifier is used to indicate that a particular note will not be used to set the isArmedDriverKey attribute during the arming/disarming process. This will allow flexibility in determining which indicated keys are to be driver keys, and which indicated keys are not to be driver keys.

The present invention may also use a different range or ranges than the 54-65 range described herein. A different range may be used for note generation, chord voicing scale voicing, etc. The preferred embodiment allows chords in the chord progression section to be shifted up or down by octaves with a footswitch, etc. This allows more chord types to be available to a user. Chords in the chord section may be made to sound in different octaves if preferred. This is done by simply following the procedures set forth herein for the melody section performance. Since current status messages and/or triggers described herein are used to initiate at least chord or scale changes, among a variety of other things, they may be referred to as data representative of at least a chord change and/or scale change. Those of ordinary skill in the art will recognize that the data representative of chord and scale changes as described herein may be provided in a variety of ways. As one example, current chord and/or current scale notes may be generated based on a note group such as a non-scale note group. Also, data representative of chord and scale changes may be provided in varying combinations from a recording device, live inputs by a user, utilizing a variety of identifers, etc. Those of ordinary skill will recognize that a variety of combinations may be used. Each individual component note of a chord may be performed from a separate input controller in the chord progression. This will allow a user to play individual component notes of the chord while establishing a chord progression. Scale notes, non-scale notes, chords, etc. will then be simultaneously made available in the melody section, as described herein. Selected individual input controllers may output the current status messages and/or triggers as described herein.

Any chord type or scale may be used in an embodiment including modified, altered, or partial scales. Any scale may also be assigned to any chord by a user if preferred. Multiple scales may be made available simultaneously. A variety of different chord inversions, voicings, etc. may be used in an embodiment of the present invention. Additional notes may be output for each chord to create fuller sound, known in the art. Although chord notes in the preferred embodiment are output with a shared common velocity, it is possible to independently allocate velocity data for each note to give chords a "humanized" feel. In addition to this velocity data allocation, other data such as different delay times, polyphonic key pressure, etc. may also be output. A variety of chord assignment methods may be used in the chord section. Different variations may be used so long as one or more notes to be performed from an input controller form a chord which is musically correct for the current song key, as described herein. A specific relative position indicator may be used to indicate an entire group of input controllers in the chord section if desired. Non-scale chords may also be indicated as a group, possibly without using specific relative position indicators. Any adequate means may be used, so long as a user is able to determine that a given input controller is designated for non-scale chord performance. The same applies to chords which represent Major chords and chords which represent relative minor chords. Each of these may also be indicated appropriately as a group. For example, an indicator representative of Major chords may be provided for a group of input controllers designated for playing Major chords. An indicator representative of relative minor chords may be provided for a group of input controllers designated for playing relative minor chords. An indicator may be provided for a given input controller using any adequate means, so long as Major chords and relative minor chords are distinguishable by a user. The indicators described herein, as well as various other inventive elements of the present invention, may also be used to improve other chord and scale change type systems known in the art. Key labels in the present invention use sharps (#) in order to simplify the description. These labels may easily be expanded using the Universal Table of Keys and the appropriate formulas, known in the art (i.e. 1-b3-5 etc.). It should be noted that all processed output may be shifted by semitones to explore various song keys, although all labels will need to be transposed accordingly. With minor modification output may also be shifted by chord steps, scale steps, and non-scale steps, depending on the particular note group to be shifted. An event representative of at least a chord change or scale change is defined herein to include dynamically making one or more chord notes, and/or one or more scale notes, available for playing from one or more fixed locations on the instrument. In some instances, chord notes may be included in the scale notes by default.

Duplicate chord notes and scales notes were utilized in the embodiment of the present invention described herein. This was done to allow a user to maintain a sense of octave. These duplicate notes may be eliminated if preferred Scales and chords may include more notes than those described herein, and notes may be arranged in any desired order. More than one scale may be made available simultaneously for performance. Scale notes may be arranged based on other groups of notes next to them. This is useful when scale notes and remaining non-scale notes are both made available to a user. Each scale and non-scale note is located in a position so as to be in closest proximity to one another. This will sometimes leave blank positions between notes which may then be filled with duplicates of the previous lower note or next highest note, etc. A note group may be located anywhere on the instrument, and note groups may be provided in a variety of combinations. The methods described herein may be used with a variety of input controller types, including those which may allow a chord progression performance to be sounded at a different time than actual note generation and/or assignments take place.

It may be useful to make the chord progression section and the first octave of the melody section function together and independently of the rest of the melody section. Functions such as octave shifting, full range chords, etc. may be applied to the chord progression section and first melody octave, independently of the functioning of the rest of the melody section. It may also be useful to make various modes and octaves available by switching between them on the same sets of keys. An example of this is to switch between the chord progression section and first melody octave on the same set of keys. Another example is to switch between scale and non-scale chord groups, etc. This will allow a reduction in the amount of keys needed to effectively implement the system. Separate channels may be assigned to a variety of different zones and/or note groups, known in the art. This allows a user to hear different sounds for each zone or note group. This may also apply to trigger output, original performance, and harmony note output as well.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A method for sounding notes on an electronic instrument, the instrument having a plurality of input controllers, the method comprising the steps of:

providing first musical data utilizing a first input controller, wherein said first musical data includes first note-identifying information identifying either one or more notes representative of specific chord notes or notes forming a chord, and wherein said first musical data is provided in response to a performance of said first input controller;

providing second musical data utilizing a second input controller, wherein said second musical data includes second note-identifying information identifying one or more notes representative of specific chord notes, and wherein said second musical data is provided in response to a performance of said second input controller; and providing additional musical data utilizing at least one additional input controller, wherein said additional musical data includes additional note-identifying information identifying one or more notes representative of either one or more chord notes, one or more scale notes, or one or more chord notes and one or more scale notes, and wherein at least a portion of said additional note-identifying information is provided according to an event representative of at least a chord change or scale change, said event initiated in response to said performance of said first input controller.

2. The method of claim 1, wherein said second input controller is designated for the performance of notes which represent alternate chord notes in a given performance, wherein a plurality of said notes which represent alternate chord notes in a given performance are different from one another in the given performance.

3. The method of claim 2, further comprising the step of providing for said second input controller an indicator corresponding to said second input controller representative of an alternate chord note.

4. The method of claim 1, wherein at least a portion of any note-identifying information provided utilizing said first input controller in a given performance and at least a portion of any note-identifying information provided utilizing said at least one additional input controller in the given performance can each be shifted independently of the other in the given performance according to user-selectable inputs.

5. The method of claim 1, wherein said input controllers are those on a standard MIDI keyboard, wherein at least a portion of input controllers in the note range of the MIDI keyboard are divided into a chord section and at least a portion of input controllers in the note range of the MIDI keyboard are divided into a melody section with at least said first input controller, said second input controller, and said at least one additional input controller each being included in either the chord section or the melody section.

6. A method for sounding notes on an electronic instrument, the instrument having a plurality of input controllers, the method comprising:

providing musical data utilizing at least one of said input controllers, wherein said musical data includes note-identifying information identifying one or more notes representative of either one or more chord notes, one or more scale notes, or one or more chord notes and one or more scale notes, and wherein at least a portion of said note-identifying information is provided according to an event representative of at least a chord change or scale change, said event initiated either according to user-selectable input or according to stored data representative of at least a chord change or scale change; and providing for said at least one of said input controllers an indicator which is representative of either a fundamental chord note or an alternate chord note, wherein said indicator representative of either a fundamental chord note or an alternate chord note is dynamically provided according to said event.

7. A method for sounding notes on an electronic instrument, wherein musical data is provided in response to a performance of at least one input controller on the instrument, said musical data including note-identifying information identifying one or more notes representative of alternate chord notes, wherein at least a portion of said note-identifying information is provided according to an event representative of at least a chord change or scale change, said event initiated either according to user-selectable input or according to stored data representative of at least a chord change or scale change, wherein said at least one input controller is designated for the performance of notes which represent alternate chord notes in a given performance, and wherein a plurality of said notes which represent alternate chord notes in a given performance are different from one another in the given performance.

8. The method of claim 7, further comprising the step of providing for said at least one input controller an indicator corresponding to said at least one input controller representative of an alternate chord note.

9. A method for sounding notes on an electronic instrument, the instrument having a plurality of input controllers, the method comprising:

designating at least a first input controller on the instrument for a performance representative of a chord section performance and designating at least one additional input controller on the instrument for a performance representative of a melody section performance;

providing first musical data utilizing said at least a first input controller, wherein said first musical data includes first note-identifying information identifying one or more notes, said first musical data being provided in response to a performance of said at least a first input controller;

providing additional musical data utilizing said at least one additional input controller, wherein said additional musical data includes additional note-identifying information identifying one or more notes representative of either one or more chord notes, one or more scale notes, or one or more chord notes and one or more scale notes, and wherein at least a portion of said additional note-identifying information is provided according to an event representative of at least a chord change or scale change, said event initiated either according to user-selectable input or in response to stored data representative of at least a chord change or scale change;

identifying at least a portion of any stored data representative of a musical performance originally effected utilizing said at least a first input controller as a performance representative of a chord section performance for re-performance purposes; and identifying at least a portion of any stored data representative of a musical performance originally effected utilizing said at least one additional input controller as a performance representative of a melody section performance for re-performance purposes.

10. The method of claim 9, wherein said event is initiated according to user-selectable input.

11. A method for sounding notes on an electronic instrument, the instrument having a plurality of input controllers, the method comprising the steps of:

dividing at least a portion of the input controllers into a chord section and at least a portion of the input controllers into a melody section with at least a first input controller being included in the chord section and at least one additional input controller being included in the melody section;

providing first musical data utilizing said first input controller, wherein said first musical data includes first note-identifying information identifying one or more notes representative of fundamental chord notes, said one or more notes representative of fundamental chord notes corresponding to a chord which corresponds to said first input controller, wherein said first musical data is provided in response to a performance of said first input controller; and providing additional musical data utilizing said at least one additional input controller, wherein said additional musical data includes additional note-identifying information identifying one or more notes representative of either one or more chord notes, one or more scale notes, or one or more chord notes and one or more scale notes, and wherein at least a portion of said additional note-identifying information is provided according to an event representative of at least a chord change or scale change, said event being in accordance with said chord and said event initiated according to user-selectable input.

12. The method of claim 11, further comprising the step of providing for said first input controller at least one indicator representative of a relative chord position indicator corresponding to said first input controller which indicates the relative position of said chord corresponding to said first input controller as defined by a song key which corresponds to said first input controller.

13. The method of claim 12, wherein said song key can be different than a scale currently corresponding to a plurality of input controllers included in said melody section.

14. The method of claim 13, wherein an additional input controller is included in said chord section and is utilized for providing musical data in response to a performance of said additional input controller included in said chord section, wherein said musical data provided in response to a performance of said additional input controller included in said chord section includes note-identifying information identifying notes forming said chord.

15. The method of claim 14, wherein said event is initiated in response to a performance of either said first input controller, said additional input controller included in said chord section, or said first input controller and said additional input controller included in said chord section, said event being in accordance with said chord.

16. A method for sounding notes on an electronic instrument, the instrument having a plurality of input controllers, the method comprising the steps of:

dividing at least a portion of the input controllers into a chord section and at least a portion of the input controllers into a melody section with at least a first input controller being included in the chord section and at least one additional input controller being included in the melody section;

providing first musical data utilizing said first input controller, wherein said first musical data includes first note-identifying information identifying one or more notes representative of alternate chord notes, said one or more notes representative of alternate chord notes corresponding to a chord which corresponds to said first input controller, wherein said first musical data is provided in response to a performance of said first input controller; and providing additional musical data utilizing said at least one additional input controller, wherein said additional musical data includes additional note-identifying information identifying one or more notes representative of either one or more chord notes, one or more scale notes, or one or more chord notes and one or more scale notes, and wherein at least a portion of said additional note-identifying information is provided according to an event representative of at least a chord change or scale change, said event being in accordance with said chord and said event initiated according to user-selectable input.

17. The method of claim 16, further comprising the step of providing for said first input controller at least one indicator representative of a relative chord position indicator corresponding to said first input controller which indicates the relative position of said chord corresponding to said first input controller as defined by a song key which corresponds to said first input controller.

18. The method of claim 17, wherein said song key can be different than a scale currently corresponding to a plurality of input controllers included in the melody section.

19. The method of claim 18, wherein an additional input controller is included in said chord section and is utilized for providing musical data in response to a performance of said additional input controller included in said chord section, wherein said musical data provided in response to a performance of said additional input controller included in said chord section includes note-identifying information identifying notes forming said chord.

20. The method of claim 19, wherein said event is initiated in response to a performance of either said first input controller, said additional input controller included in said chord section, or said first input controller and said additional input controller included in said chord section, said event being in accordance with said chord.

21. A method for sounding notes on an electronic instrument, the instrument having a plurality of input controllers, the method comprising the steps of:

dividing at least a portion of the input controllers into a chord section and at least a portion of the input controllers into a melody section with at least three or more input controllers being in a first group of input controllers included in the chord section and at least one additional input controller being included in the melody section;

providing respective musical data in response to a performance of each input controller in said first group, wherein said respective musical data for each input controller in said first group includes note-identifying information identifying one or more notes including a highest note, wherein cumulatively a highest note identified for each input controller in said first group defines a first chord, said first chord being a chord which is normally spread out across more input controllers than there are in said first group when said first chord is being performed using traditional performance techniques on a traditional music keyboard; and providing additional musical data utilizing said at least one additional input controller, wherein said additional musical data includes additional note-identifying information identifying one or more notes representative of either one or more chord notes, one or more scale notes, or one or more chord notes and one or more scale notes, and wherein at least a portion of said additional note-identifying information is provided according to an event representative of at least a chord change or scale change, said event being in accordance with said first chord and said event initiated in response to a performance of at least one input controller in said first group.

22. The method of claim 21, wherein a performance of each input controller in said first group is utilized at least once in a given performance to initiate an event representative of at least a chord change or scale change, wherein each of said events are in accordance with said first chord.

23. The method of claim 21, wherein a second group of input controllers is included in the chord section, wherein a respective performance of each input controller in said second group sounds one or more notes including a highest note, wherein cumulatively a highest note sounded for each input controller in said second group defines an additional chord, said additional chord representing a different relative chord position than said first chord as defined by a song key which corresponds to said first group and to said second group, said additional chord being a chord which is normally spread out across more input controllers than there are in said second group when said additional chord is being performed using traditional performance techniques on a traditional music keyboard.

24. The method of claim 23, further comprising the step of providing for at least one input controller in said second group at least one indicator representative of a relative chord position indicator corresponding to said at least one input controller in said second group which indicates the relative position of said additional chord as defined by said song key.

25. The method of claim 21, wherein the number of input controllers in said first group is either three input controllers, four input controllers, or five input controllers.

26. The method of claim 21, wherein each input controller in said first group sounds only one or more notes representative of a specific chord note.

27. A method for sounding notes on an electronic instrument, the instrument having a plurality of input controllers, the method comprising the steps of:

dividing at least a portion of the input controllers into a chord section and at least a portion of the input controllers into a melody section with at least three or more input controllers being in a first group of input controllers included in the chord section and at least one additional input controller being included in the melody section;

providing respective musical data in response to a performance of each input controller in said first group, wherein said respective musical data for each input controller in said first group includes note-identifying information identifying one or more notes including a highest note, wherein cumulatively a highest note identified for each input controller in said first group defines a first chord, said first chord being a chord which is normally spread out across more input controllers than there are in said first group when said first chord is being performed using traditional performance techniques on a traditional music keyboard;

providing additional musical data utilizing said at least one additional input controller, wherein said additional musical data includes additional note-identifying information identifying one or more notes representative of either one or more chord notes, one or more scale notes, or one or more chord notes and one or more scale notes, and wherein at least a portion of said additional note-identifying information is provided according to an event representative of at least a chord change or scale change, said event being in accordance with said first chord and said event initiated in response to a performance of at least one input controller in said first group; and providing for at least a first input controller in said first group at least one indicator representative of a relative chord position indicator corresponding to said at least a first input controller in said first group which indicates the relative position of said first chord as defined by a song key which corresponds to said first group.

28. The method of claim 27, wherein a performance of each input controller in said first group is utilized at least once in a given performance to initiate an event representative of at least a chord change or scale change, wherein each of said events are in accordance with said first chord.

29. The method of claim 27, further comprising the step of changing said first chord to a chord with a different chord root, said change being made according to selection of a new song key corresponding to said first group, wherein said selection of a new song key is made according to user-selectable input.

30. The method of claim 29, wherein said a highest note for at least one input controller in said first group is representative of a fundamental chord note regardless of any of said changes made.

31. The method of claim 30, further comprising the step of providing for said at least one input controller in said first group an indicator corresponding to said at least one input controller in said first group representative of a fundamental chord note.

32. The method of claim 29, wherein said a highest note for at least one input controller in said first group is representative of an alternate chord note regardless of any of said changes made.

33. The method of claim 32, further comprising the step of providing for said at least one input controller in said first group an indicator corresponding to said at least one input controller in said first group representative of an alternate chord note.

34. The method of claim 27, wherein a second group of input controllers is included in the chord section, wherein a respective performance of each input controller in said second group sounds one or more notes including a highest note, wherein cumulatively a highest note sounded for each input controller in said second group defines an additional chord, said additional chord representing a different relative chord position than said first chord as defined by said song key, said additional chord being a chord which is normally spread out across more input controllers than there are in said second group when said additional chord is being performed using traditional performance techniques on a traditional music keyboard.

35. The method of claim 34, further comprising the step of providing for at least one input controller in said second group at least one indicator representative of a relative chord position indicator corresponding to said at least one input controller in said second group which indicates the relative position of said additional chord as defined by said song key.

36. The method of claim 27, wherein the number of input controllers in said first group is either three input controllers, four input controllers, or five input controllers.

37. A method for sounding notes on an electronic instrument, the instrument having a plurality of input controllers, the method comprising the steps of:

providing first musical data utilizing a first input controller, wherein said first musical data includes first note-identifying information identifying either one or more notes representative of specific chord notes corresponding to a first chord or notes forming said first chord, and wherein said first musical data is provided in response to a performance of said first input controller;

providing second musical data utilizing a second input controller, wherein said second musical data includes second note-identifying information identifying either one or more notes representative of specific chord notes corresponding to a second chord or notes forming said second chord, and wherein said second musical data is provided in response to a performance of said second input controller;

providing additional musical data utilizing at least one additional input controller, wherein said additional musical data includes additional note-identifying information identifying one or more notes representative of either one or more chord notes, one or more scale notes, or one or more chord notes and one or more scale notes, and wherein at least a portion of said additional note-identifying information is provided according to an event representative of at least a chord change or scale change, said event initiated either in response to a performance of said first input controller, in response to a performance of said second input controller, or according to user-selectable input;

providing for said first input controller an indicator corresponding to said first input controller representative of a relative chord position of a major song key chord as defined by a song key corresponding to either said first input controller, said second input controller, or said first input controller and said second input controller; and providing for said second input controller an indicator corresponding to said second input controller representative of a relative chord position of a relative minor song key chord as defined by said song key.

38. The method of claim 37, wherein a performance of said first input controller and a performance of said second input controller are each utilized at least once in a given performance to initiate an event representative of at least a chord change or scale change, wherein an event representative of at least a chord change or scale change initiated utilizing a performance of said first input controller is in accordance with said first chord, and wherein an event representative of at least a chord change or scale change initiated utilizing a performance of said second input controller is in accordance with said second chord.

39. The method of claim 37, wherein a third input controller is designated for the performance of one or more notes, wherein a performance of said third input controller identifies one or more notes including a note representative of the root note of a non-scale chord corresponding to said third input controller, said non-scale chord being defined as such by said song key.

40. The method of claim 39, further comprising the step of providing for said third input controller an indicator corresponding to said third input controller either representative of a non-scale chord, representative of a relative non-scale chord position as defined by said song key, or representative of a non-scale chord and representative of a relative non-scale chord position as defined by said song key.

41. The method of claim 40, further comprising the step of utilizing a performance of said third input controller at least once in a given performance to initiate an event representative of at least a chord change or scale change, wherein an event representative of at least a chord change or scale change initiated utilizing a performance of said third input controller is in accordance with said non-scale chord.

* * * * *